US006553476B1

(12) United States Patent
Ayaki et al.

(10) Patent No.: US 6,553,476 B1
(45) Date of Patent: Apr. 22, 2003

(54) STORAGE MANAGEMENT BASED ON PREDICTED I/O EXECUTION TIMES

(75) Inventors: Yasushi Ayaki, Neyagawa (JP); Junichi Komeno, Osaka (JP); Toshiharu Koshino, Kadoma (JP); Yoshitaka Yaguchi, Osaka (JP); Tsukasa Yoshiura, Hirakata (JP); Yuji Nagaishi, Daitou (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/020,929

(22) Filed: Feb. 9, 1998

(30) Foreign Application Priority Data

| Feb. 10, 1997 | (JP) | 9-026755 |
| Feb. 28, 1997 | (JP) | 9-045585 |
| May 30, 1997 | (JP) | 9-141926 |

(51) Int. Cl.[7] .......................... G06F 9/38; G06F 13/14
(52) U.S. Cl. ................. 711/204; 711/213; 711/167; 711/173; 710/36; 710/58
(58) Field of Search ................ 711/117, 204, 711/213, 173, 1, 167, 171; 348/405; 710/30, 33, 34, 58, 60, 36, 74, 25, 43

(56) References Cited

U.S. PATENT DOCUMENTS

| 4,926,324 A | | 5/1990 | Yamamoto et al. | |
| 5,034,914 A | | 7/1991 | Osterlund | |
| 5,146,578 A | | 9/1992 | Zangenehpour | |
| 5,212,798 A | | 5/1993 | Kanda | |
| 5,247,646 A | | 9/1993 | Osterlund | |
| 5,287,466 A | * | 2/1994 | Kodama | 712/206 |
| 5,353,430 A | * | 10/1994 | Lautzenheiser | 711/117 |
| 5,493,667 A | * | 2/1996 | Huck et al. | 711/125 |
| 5,539,660 A | | 7/1996 | Blair et al. | |
| 5,543,844 A | * | 8/1996 | Mita et al. | 348/405 |
| 5,671,386 A | | 9/1997 | Blair et al. | |
| 5,715,457 A | * | 2/1998 | Wakatani | 709/105 |
| 5,740,447 A | * | 4/1998 | Kurahashi | 395/709 |
| 5,768,592 A | * | 6/1998 | Chang | 395/704 |
| 5,822,004 A | * | 10/1998 | Crocitti et al. | 348/405 |
| 6,047,351 A | * | 4/2000 | Cheng | 710/266 |

FOREIGN PATENT DOCUMENTS

| EP | 0 093 239 A2 | 11/1983 |
| EP | 0 471 434 A2 | 2/1992 |
| EP | 0 653 699 A1 | 5/1995 |
| EP | 0 712 082 A1 | 5/1996 |
| EP | 0 757 310 A2 | 5/1997 |
| FR | 2 728 364 A1 | 12/1995 |
| GB | 2 270 791 A | 3/1994 |

(List continued on next page.)

OTHER PUBLICATIONS

A.L. Narasimha et al., "*I/O Issues in a Multimedia System*" Computer, US, IEEE Computer Society, vol. 27, No. 3, p. 69–74 (Mar. 1994).

Robert K. Abbott et al., "*Scheduling I/O Requests with Deadlines: a Performance Evaluation*", Proceedings of the Real Time Systems Symposium, US, Wahsington, IEEE. Comp. Soc. Press,, vol. SYMP. 11, p. 113–124 (1991).

*Primary Examiner*—B. James Peikari
(74) *Attorney, Agent, or Firm*—Akin Gump Strauss Hauer & Feld, L.L.P.

(57) ABSTRACT

A storage apparatus has input means for inputting an input/output execution time prediction request from an external system and determining means for predicting the execution time of the input/output request in response to the input/output execution time prediction request. The storage apparatus predicts the execution time of the input/output request and provides a response to the external system in response to the input/output execution time prediction request input from the external system.

5 Claims, 40 Drawing Sheets

FOREIGN PATENT DOCUMENTS

| | | |
|---|---|---|
| JP | 01171045 A | 7/1989 |
| JP | 03230215 A | 10/1991 |
| JP | 05019973 A | 1/1993 |
| JP | 05210468 A | 8/1993 |
| JP | 07203339 | 4/1995 |
| JP | 08171456 | 2/1996 |
| JP | 08171526 A | 7/1996 |
| WO | WO 93/03438 | 2/1993 |

* cited by examiner

FIG. 16

PREREAD DATA MANAGEMENT TABLE

| IDENTIFIER | HEAD ADDRESS | DATA AMOUNT |
|---|---|---|
| 1 | a1 | b1 |
| 2 | a2 | b2 |
| 3 | a3 | b3 |
| ... | ... | ... |

FILE MANAGEMENT INFORMATION

| FRAME NO. | HEAD ADDRESS | DATA AMOUNT |
|---|---|---|
| 1 | a1 | b1 |
| 2 | a2 | b2 |
| 3 | a3 | b3 |
| ... | ... | ... |

Figure 25:
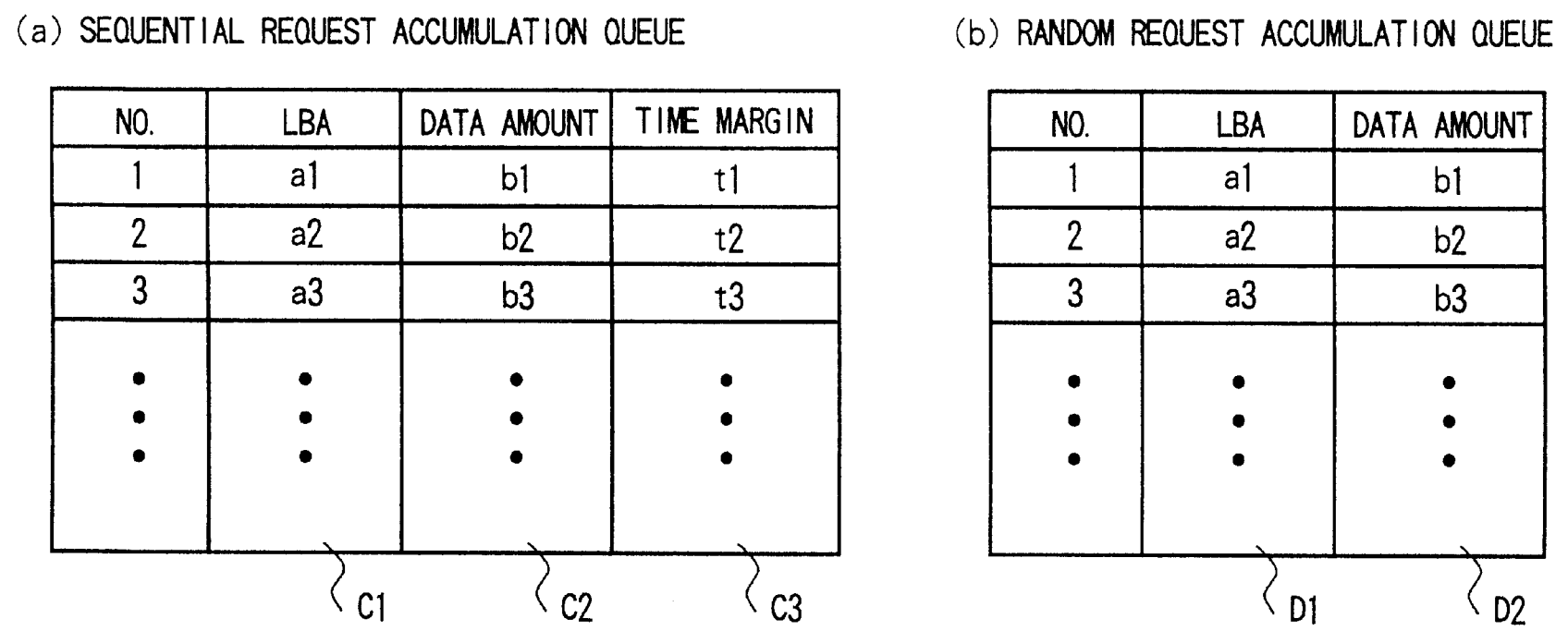

(a) SEQUENTIAL REQUEST ACCUMULATION QUEUE

| NO. | LBA | DATA AMOUNT | TIME MARGIN |
|-----|-----|-------------|-------------|
| 1 | a1 | b1 | t1 |
| 2 | a2 | b2 | t2 |
| 3 | a3 | b3 | t3 |
| ... | ... | ... | ... |

C1, C2, C3

(b) RANDOM REQUEST ACCUMULATION QUEUE

| NO. | LBA | DATA AMOUNT |
|-----|-----|-------------|
| 1 | a1 | b1 |
| 2 | a2 | b2 |
| 3 | a3 | b3 |
| ... | ... | ... |

(a) BEFORE EXECUTION OF SEGMENT SETTING COMMAND

| ADDRESS (IN UNITS OF BYTES) | |
|---|---|
| 7FFF – 6000 | AVAILABLE AREA (32kB) |
| 5FFF – 4000 | SEGMENT#4 (32kB) |
| 3FFF – 3000 | SEGMENT#3 (16kB) |
| 2FFF – 2000 | SEGMENT#2 (16kB) |
| 1FFF – 0000 | SEGMENT#1 (32kB) |

(128 kB IN TOTAL)

(b) AFTER EXECUTION OF SEGMENT SETTING COMMAND

| ADDRESS (IN UNITS OF BYTES) | |
|---|---|
| 7FFF – 7000 | AVAILABLE AREA (16kB) |
| 6FFF – 5000 | SEGMENT#4 (32kB) |
| 4FFF – 3000 | SEGMENT#3 (32kB) |
| 2FFF – 2000 | SEGMENT#2 (16kB) |
| 1FFF – 0000 | SEGMENT#1 (32kB) |

(128 kB IN TOTAL)

(a) ADAPTIVE SEGMENT DIVISION METHOD (b) FIXED SEGMENT DIVISION METHOD

STORAGE MANAGEMENT BASED ON PREDICTED I/O EXECUTION TIMES

BACKGROUND OF THE INVENTION

The present invention relates to a storage apparatus such as a magnetic disk apparatus etc. and in particular to a storage apparatus for recording and reproducing real-time data such as a image data by controlling a temporary memory circuit built into the storage apparatus and an input/output (I/O) control method for such a storage apparatus.

In recent years, the recording density and the data transfer rate in storage apparatus, such as magnetic disk apparatus, have been ever on the increase. These disk apparatuses are used also for recording and reproducing multi-channel image data.

For image data to be continuously recorded or reproduced at a predetermined rate in a disk apparatus, it is necessary to process an I/O request within a predetermined time in the disk apparatus. Processing a plurality of I/O requests requires accurate time management of each I/O request.

The time management of the I/O requests can be executed by software processing of a host computer for controlling the disk apparatus. Managing I/O requests in real time, however, produces the problem of a heavy load imposed on the CPU. In view of this, as disclosed in unexamined Japanese publication Hei 8-171526, a dedicated interface unit is connected between the disk apparatus and the host computer for time management of I/O requests.

Further, in recording or reproducing multi-channel image data, a temporary memory unit is required to buffer data that would otherwise be lost due to the suspension of data transfer mechanical operations such as the disk apparatus seek operation.

Conventional disk apparatuses, as disclosed in U.S. patent Ser. No. 5,465,343, for example, comprise a temporary memory circuit for improving the storage performance, in which a temporary memory circuit is used as a buffer memory or a cache memory. The temporary memory circuit is used also for prefetching. The prefetching is a process for reading a succeeding data after reading data corresponding to an output request, and storing the succeeding data in the temporary memory unit with the aim of improving the performance of processing sequential data I/O requests.

The conventional storage apparatus using the above-mentioned interface unit and disk apparatus will now be explained with reference to the accompanying drawings.

FIG. 39 is a block diagram showing a general system configuration of the storage apparatus using the above-mentioned interface unit and the conventional disk apparatus. As shown in FIG. 39, a host computer 71, a reference clock generating section 72 and an interface unit 73 are connected to an I/O bus 75. A disk apparatus 74 is connected to the interface unit 73 through a data bus 76.

The interface unit 73 includes a bus interface control section 82 (hereinafter called "the bus I/F control section 82"), an I/O control section 84, a schedule management section 81 and a queue-with-priority management section 83. In the interface unit 73, the schedule management section 81 controls the sequence of execution of I/O requests.

The host computer 71 issues a data I/O request to the interface unit 73. The I/O request is received through the I/O bus 75 by the I/F control section 82 of the interface unit 73, and stored in the queue-with-priority management section 83 through a command bus 73. The queue-with-priority management section 83 manages a queue with priority, a pending queue and an I/O execution queue.

The reference clock information generated in the reference clock generating section 72 passes on the I/O bus 75, and is stored in the schedule management section 81 through the bus I/F control section 82.

The schedule management section 81 transfers an I/O request to the queue with priority in the queue-with-priority management section 83. Upon receipt of the request, the schedule management section 81 determines whether the queue with priority contains an I/O request.

In the case where the queue with priority contains an I/O request, the schedule management section 81 fetches the particular I/O request and determines whether the request has a high order of priority with a specified processing time. In the case where the request has a high priority, the schedule management section 81 transfers the particular I/O request to the I/O control section 84, while in the case where the priority of the request is low, the schedule management section 81 adds the request to the pending queue.

In the case where no I/O request is contained in the queue with priority, in contrast, the pending queue is checked. In the presence of any I/O request contained in the pending queue, the particular I/O request is fetched and, when it is before the lapse of a set processing time, the fetched I/O request is executed. In the case where the I/O request has passed the set processing time and has timed out, on the other hand, the request is discarded or returned to the pending queue.

The I/O control section 84 controls the disk apparatus 74, accesses an instruction on data I/O, and executes the data write or read operation.

FIG. 40 is a diagram showing a method for dividing and controlling the buffer memory making up the temporary memory unit of the disk apparatus 314.

A portion (a) in FIG. 40 shows an adaptive segmentation method. As shown in the portion (a) of FIG. 40, the buffer memory is divided into a plurality of segments which can be assigned to a write buffer and a cache for read data. Also, each segment size can be changed in accordance with the data size to be transferred in response to a write/read command.

A portion (b) in FIG. 40 shows a fixed segmentation method. In response to a set command from an external system, the buffer memory can be divided into a plurality of segments of fixed size. With the disk apparatus conforming to the SCSI-3 (SCSI: Small Computer System Interface) specification, for example, the number of segments and the size of each segment of the buffer memory can be set appropriately. Each segment size is identical and fixed.

In the above-mentioned conventional control method, the disk apparatus 74 uses the buffer memory divided into segments. As a result, the conventional storage apparatus meets the multi-task requirement in the recording and reproduction of multi-channel image data, and improves storage performance.

Explanation will be made below about certain problems encountered in the conventional storage apparatus configured as described above.

A first problem of the conventional storage apparatus lies in the management of the execution time of an I/O request.

The time for executing an I/O request in the disk apparatus of the conventional storage apparatus is sometimes considerably variable depending on the variations in the time for access to a target area, i.e., the seek time or the waiting time for rotation and the operating conditions of the temporary memory circuit. In the conventional storage apparatus having the above-mentioned configuration, the interface unit and the external system lack means for obtaining information on the time for accessing the disk apparatus and the operating conditions of the temporary memory circuit, and therefore the execution time cannot be accurately predicted. As a result, a time management assuming an excessively long execution time is required for meeting a time limit to ensure that data is not lost, thereby leading to the problem of a deteriorated processing efficiency.

A second problem of the conventional storage apparatus is that the response to an I/O request is occasionally delayed because of deteriorated performance.

In the conventional storage apparatus, an I/O request with high-priority having a time limit is executed preferentially, while an I/O request low in priority is set in pending. In this way, the image data having high-priority are continuously recorded and reproduced. In the case where a high-priority I/O request is not contained in the queue but only low-priority I/O requests are pending, the I/O requests of low priority are executed unconditionally.

Consequently, even in the case where a high-priority I/O request is applied from an external system such as a host computer during the execution of a low-priority I/O request, the high-priority I/O request cannot be executed before complete execution of the low-priority I/O request. In such a case, the external system is not informed of the reason that the high-priority I/O request therefrom is not executed immediately and is required to wait until complete execution of the low-priority I/O request.

In other words, in the conventional storage apparatus, the time management does not take the execution time of I/O requests into consideration. As a result, when a high-priority I/O request is input, the high-priority I/O request is sometimes required to wait for execution.

Assume, on the other hand, that an I/O request of an image high in priority with a time limit for execution is input in the presence of an I/O request for random data, low in priority, without any time limit for waiting in queue. In such a case, the I/O request for an image is executed in priority even in the case where a time margin exists, sometimes considerably delaying the response to the I/O request for the random data.

Still another problem of the conventional disk apparatuses is that of inefficient use of the temporary memory circuit.

For continuous recording and reproduction to be assured in the disk apparatus for the image data, high in transfer rate, a number of temporary memory circuits are required. Image data or program data low in transfer rate, however, can be processed in a smaller number of memory circuits. Generally, the image data are continuous and sequential, while the program data are discrete. The method of controlling the buffer memory/cache memory varies depending on properties of the data.

The method of using the temporary memory circuit for the conventional disk apparatus is configured to meet the requirements of arbitrary data. The conventional method, however, is not suitable for assuring continuous recording and reproduction, or improving the storage performance of image data. In the case of repeat play of image data, for example, a wasteful prefetch operation occurs, and thereby the response is sometimes delayed and the performance is deteriorated.

In recording or reproducing multi-channel data containing image data, the size and the control method of the temporary memory circuit is required to be determined in accordance with the transfer rate, the real-time requirement, the continuity, etc. of each channel. Nevertheless, the conventional disk apparatus, of which the buffer memory can be divided into a plurality of segments or of which the segment size can be changed, cannot set the multi-channel data to correspond with each segment, for each channel, and therefore cannot set the segment size and the control method for each channel in accordance with different transfer rates, the real-time requirement or the continuity.

SUMMARY OF THE INVENTION

An object of the present invention is to provide a storage apparatus which, in order to solve the problem of delay in processing an I/O request, predicts the execution time of each I/O request from an external system and thereby assures an accurate processing of the I/O request. Another object of the present invention is to provide a storage apparatus and an I/O control method which can assure an accurate continuous recording and reproduction of image data or other data of high priority and which can efficiently process I/O requests of low priority. Still another object of the present invention is to provide a storage apparatus which can selectively execute an I/O request for random data, low in priority, which has a time limit for processing.

In order to achieve the above-mentioned objects, according to one aspect of the present invention, there is provided a storage apparatus comprising input means supplied with a request for predicting the I/O execution time from an external system, and a determining means for predicting the execution time of an I/O request in response to the request for the I/O execution time prediction.

With the above-mentioned configuration, the storage apparatus according to the present invention can correctly predict the execution time in response to an I/O request and can secure the execution time for the I/O request in response to an external system.

According to another aspect of the present invention, there is provided a storage apparatus comprising determining means for predicting the execution time in response to an I/O request from an external system and determining whether the predicted execution time can be realized within a time limit set by the external system, and an I/O request processing means for executing the I/O request in the case where the I/O request is determined to be executable by the determining means and for terminating the processing in the case where the I/O request is determined as not to be executable, thereby giving a response to the external system based on the result of the determination.

According to still another aspect of the invention, there is provided a storage apparatus further comprising determining means for giving a response to an I/O data transfer amount request from the external system including a data size for which the storage apparatus is capable of transferring within a time limit preset by the external system.

With the above-mentioned configuration, the storage apparatus according to the present invention can predict and respond to a data size capable of being input or output within a time limit, so that the apparatus can assure the execution time for a high-priority request while providing a maximum transfer rate for a low-priority request, thereby improving the processing efficiency. Also, the storage apparatus according to the present invention permits an external system such as a host computer to determine whether or not an I/O request can be executed within a time limit, and therefore can assure the execution completion time for each data I/O operation and can thus easily execute the real-time management of I/O requests.

According to a further aspect of the present invention, there is provided a storage apparatus comprising a temporary memory circuit capable of being divided into a plurality of segments according to the type of I/O request, wherein the determining means gives an available size of a corresponding segment as a writable data size in response to a write size request from an external system.

According to a still further aspect of the present invention, there is provided a storage apparatus comprising a temporary memory circuit capable of being divided into a plurality of segments in accordance with the type of I/O request, and a preread means for reading data from a designated area of a recording medium and storing the data temporarily in a corresponding segment, wherein an available size of a corresponding segment is offered as a data size capable of being preread in response to a preread size request, and a preread data size of a corresponding segment is offered as a readable data size in response to a read size request.

With the above-mentioned configuration, the storage apparatus according to the present invention offers an available size of a corresponding segment in response to a write data transfer amount request, offers a preread data size in response to a read data transfer amount request, and offers an available size of a corresponding segment in response to a preread data transfer amount request, wherein the I/O data can always be transferred in bursts and the time management of I/O requests can be accurately facilitated. Also, the present invention has the effect of shortening the time during which an I/O bus is occupied.

According to a yet further aspect of the present invention, there is provided an I/O control method for a storage apparatus comprising notification means for notifying the continuously-transferable amount of data to an external system in response to a data transfer amount request from the external system, in which a method of data transfer between the external system and the storage apparatus is selected in accordance with the transferable data amount. With this configuration, the I/O control method according to the present invention can always continuously transfer the I/O data.

According to still another aspect of the present invention, there is provided a storage apparatus, which identifies the type of I/O requests accumulated, and in the case where an I/O request is one with a time limit, the apparatus executes a type of an I/O request selectively in accordance with the time length remaining before a deadline which is calculated based on the time limit.

According to a further aspect of the present invention, there is provided a storage apparatus which calculates the time remaining before a deadline based on the time limit for accumulated I/O requests and selects the I/O request with the minimum remaining time among the accumulated I/O requests. In the case where the remaining time of the data request is smaller than a predetermined value, the apparatus executes the particular I/O request while in the case where the above-mentioned condition fails to be met, the apparatus executes the accumulated I/O requests by selecting the sequence of execution in accordance with a data recording position corresponding to each I/O request.

With the above-mentioned configuration, the storage apparatus according to the present invention, in which an I/O request is selected for execution based on the time remaining before a deadline, the apparatus can first assure the continuous recording and reproduction of image data or the like and then can assign the processing time to the recording and reproduction of random data, thereby improving the storage performance.

Another object of the present invention is to provide a storage apparatus for recording and reproducing image data by a method of controlling a temporary memory circuit suitable for image data in order to solve the above-mentioned problem of efficient use of the temporary memory circuit. Still another object of the present invention is to provide a storage apparatus in which a temporary memory circuit can be divided into a plurality of segments in accordance with a required number of channels, and in which the size and the method of controlling the temporary memory circuit can be set in accordance with a transfer rate and a real-time processing requirement of each channel.

In order to achieve the above-mentioned objects, according to one aspect of the present invention, there is provided a storage apparatus comprising a management information memory means for storing the file management information corresponding to the data recorded in a recording medium, wherein the management information is reproduced in response to an auto read request from an external system, and wherein the position on the recording medium where the location of a data block to be transferred to the external system is stored is determined, and the data block is preread.

According to another aspect of the present invention, there is provided a storage apparatus comprising a preread means for reproducing data blocks from a recording medium in response to a plurality of preread requests having an identifier from external system and transferring the data blocks to a temporary memory circuit, wherein in the case where an I/O request with an identifier is received from an external system, a data block is selected from among those preread in accordance with the identifier and transferred to the external system.

According to still another aspect of the present invention, there is provided a storage apparatus, in which the type of accumulated write data requests is identified and the data amount to be recorded continuously in a recording medium is selected and recorded, and in which the number of requests to be accumulated is selected by identifying the types of the accumulated read data requests thereby reproducing the data continuously from the recording medium in accordance with the number of the accumulated requests.

According to yet another aspect of the present invention, there is provided a storage apparatus comprising a prefetch means for transferring the data reproduced from a recording medium to a temporary memory circuit, wherein the type of each I/O request from the external system is identified, and one of a plurality of prefetch methods having different data amounts to be prefetched and different time lengths required for the prefetch processing is selected and executed in accordance with the type of a particular I/O request.

With this configuration, the storage apparatus according to the present invention can realize a method of controlling the temporary memory circuit suitable for transfer of image data, and a significant effect of an improved performance is attained as a result of a reduced load of transfer processing of the external system and an improved efficiency of the data recording and reproducing operation of the storage apparatus.

In order to achieve the above-mentioned objects, according to one aspect of the present invention, there is provided a storage apparatus comprising a temporary memory circuit divisible into a plurality of segments, and a temporary memory circuit control means for selecting a segment based on the information for identifying the write/read request from an external system and causing the write/read data to be temporarily stored in the selected segment.

According to another aspect of the present invention, there is provided a storage apparatus comprising a temporary memory circuit divisible into a plurality of segments, and a temporary memory circuit control means for determining a segment size, a method of data transfer from an external system and a method of data transfer to a recording medium for each segment based on the setting information supplied from the external system, selecting a segment based on the information for identifying the write/read request from the external system, and controlling the data transfer from the external system and the data transfer to the recording medium by the transfer method thus determined.

According to still another aspect of the present invention, there is provided a storage apparatus wherein the conditions for starting and stopping the data transfer between an external system and a corresponding segment, the conditions for starting and stopping the data transfer to and from the recording medium, the order of priority of data transfer to and from the recording medium and the unit of access from the external system, are determined on the basis of the setting information supplied from the external system.

According to yet another aspect of the present invention, there is provided a storage apparatus, wherein a recording/reproducing area for writing a data of a corresponding segment in a recording medium or for reading a data stored in a corresponding segment from a recording medium is set on the basis of the setting information supplied from the external system.

With this configuration of the storage apparatus according to the present invention, a data size and a transfer method are set for each segment based on the setting information from the external system, and the data transfer from and to the external system and from and to the recording medium are controlled by the transfer method thus set, making it possible to set different memory sizes and different control methods corresponding to different transfer rates, image data having real-time processing requirement, or the requirement of data other than the image data.

According to a further aspect of the present invention, there is provided a storage apparatus, wherein the unit of access to the segments from an external system is set by the setting information from an external system thereby to permit the external system to access the segments with smaller than a normal access unit for an improved random access efficiency.

According to a still further aspect of the present invention, there is provided a storage apparatus, wherein different storage areas are set for different segments based on the setting information supplied from an external system, and in this way one-to-one correspondence can be established between the storage areas and the segments, thereby guaranteeing the identity between the data in each segment and the data on the disk.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF SEVERAL VIEWS OF THE DRAWING

FIG. 16 is a diagram for explaining a preread data management table according to the fourth embodiment;

FIG. 19 is a diagram for explaining the file management information according to the fourth embodiment;

FIG. 25 is a diagram for explaining a request accumulation queue according to the sixth embodiment of the invention;

FIG. 30 is a diagram showing an example of changing a segment setting in response to a segment setting command according to the seventh embodiment;

It will be recognized that some or all of the figures are schematic representations for purposes of illustration and do not necessarily depict the actual relative sizes or locations of the elements shown.

DESCRIPTION OF THE PREFERRED EMBODIMENTS

A disk apparatus of a storage apparatus according to preferred embodiments of the present invention will be explained below with reference to the accompanying drawings.

Embodiment 1

Figure 1:
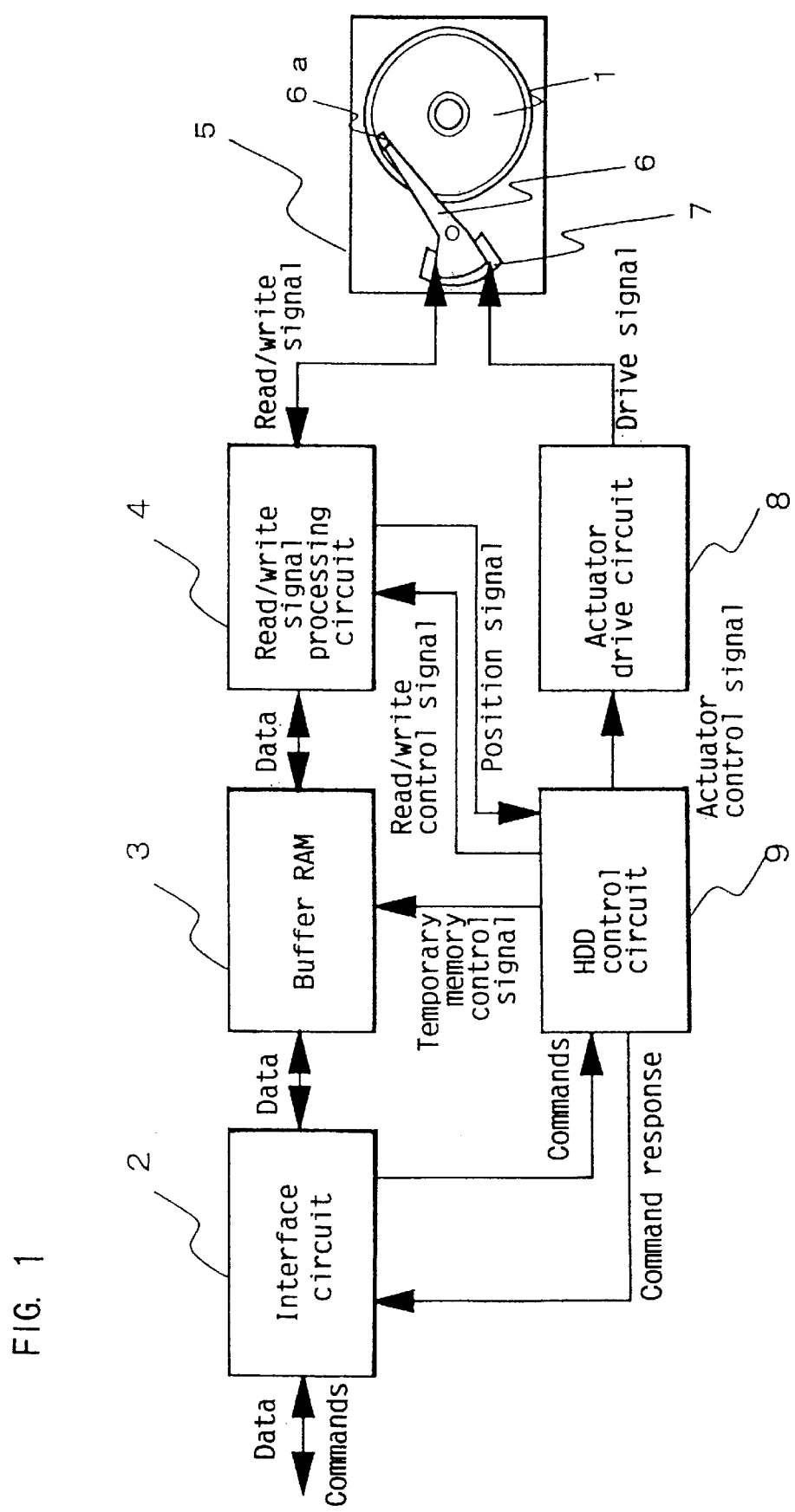
FIG. 1 is a block diagram showing a configuration of a disk apparatus according to a first embodiment of the invention.

FIG. 1 is a block diagram showing a configuration of a disk apparatus according to a first embodiment.

In FIG. 1, a disk apparatus is connected to an external system (not shown) such as a host computer through an I/O bus. Data are received and transmitted between the disk apparatus and the external system by an interface circuit 2. As shown in FIG. 1, in addition to the interface circuit 2, the disk apparatus according to the first embodiment comprises a buffer RAM 3 which is a temporary memory circuit for temporarily storing data, a read/write signal processing circuit 4 for encoding and decoding the data, a head-disk assembly 5, an actuator drive circuit 8 and a HDD control circuit 9. The RAM is an abbreviation of a random access memory, and HDD an abbreviation of a hard disk drive.

The head-disk assembly 5 includes a disk 1, a head assembly 6 and an actuator 7. The actuator 7 is driven by an actuator drive circuit 8. The HDD control circuit 9 is for controlling the buffer RAM 3, the read/write signal processing circuit 4 and the actuator drive circuit 8 based on various commands supplied from the external system.

The interface circuit 2 issues data and commands, received from the external system. The interface circuit 2 also outputs data received from the buffer RAM 3 and the command response from the HDD control circuit 9 to the external system.

The read/write signal processing circuit 4 encodes write data from the buffer RAM 3 and outputs the write data as a write signal to a head 6a. Also, the read/write signal processing circuit 4 decodes the read signal read by the head 6a from a track of the disk 1 and outputs it as read data to the buffer RAM 3.

The HDD control circuit 9 receives a command from the external system through the interface circuit 2 and interprets the command. The HDD control circuit 9 that interprets the command, controls the buffer RAM 3, the read/write signal processing circuit 4 and the actuator drive circuit 8 thereby to perform the data write and read operation. Also, when the command requests a response, the HDD control circuit 9 transmits a command response to the external system through the interface circuit 2.

The actuator drive circuit 8 outputs a drive signal to the actuator 7 based on an actuator control signal from the HDD control circuit 9. The actuator drive circuit 8 controls the operation of the actuator 7 and positions the head 6a through movement of the head assembly 6.

[Operation of HDD Control Circuit]

The operation of the HDD control circuit 9 of the disk apparatus according to the first embodiment configured as described above will be explained with reference to FIGS. 2 and 3.

Figure 2:
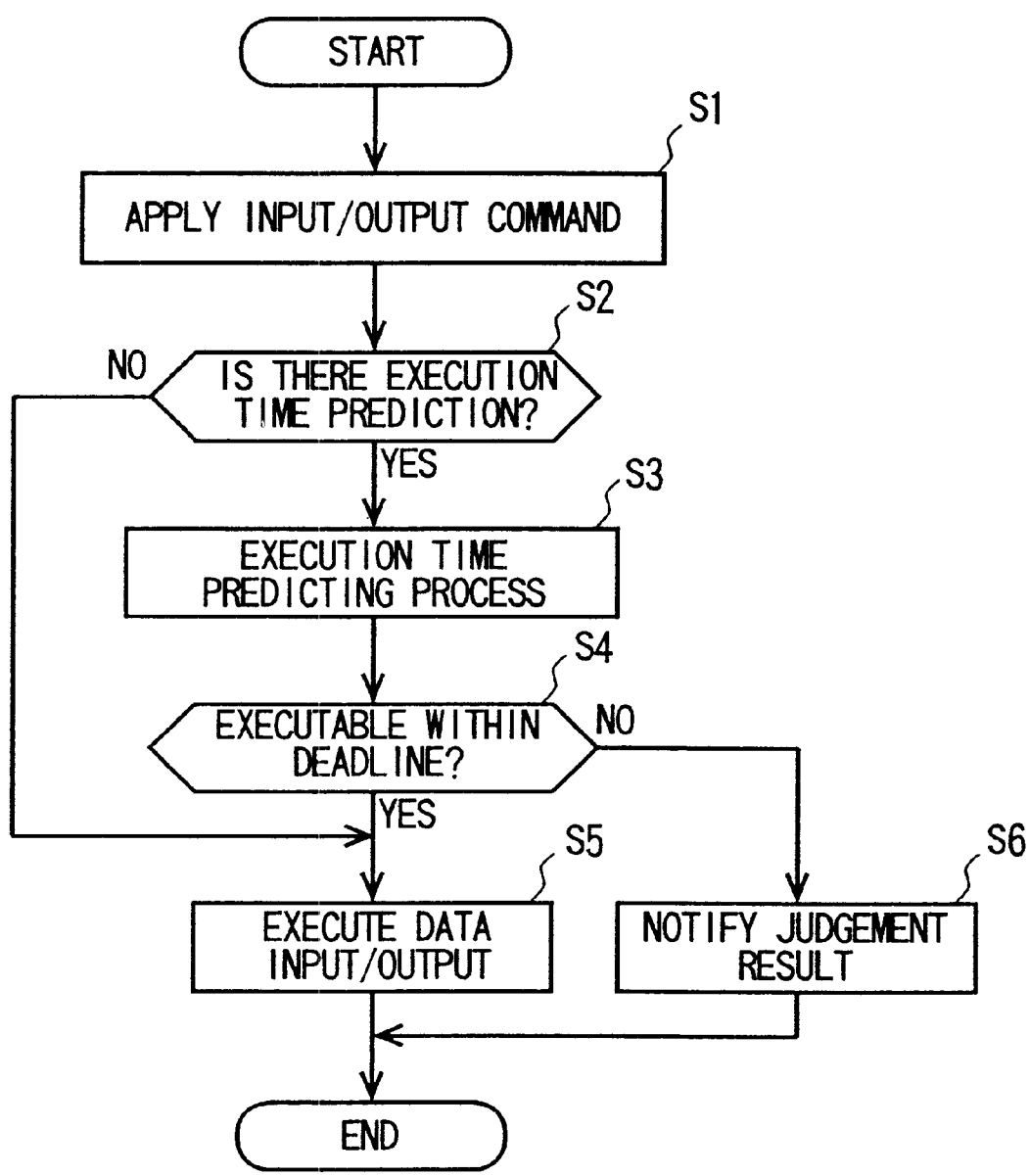
FIG. 2 is a flowchart showing the flow of processing an I/O command according to the first embodiment.

FIG. 2 is a flowchart showing the operation for processing the I/O command by the HDD control circuit 9 according to the first embodiment.

In FIG. 2, upon application of an I/O command from the external system to the HDD control circuit 9 through the interface circuit 2 (step S1), the HDD control circuit 9 determines whether the applied I/O command is one requiring the prediction of the execution time or not (step S2).

In the case where the applied I/O command is one requiring the prediction of the execution time (execution time prediction command), the execution time of the I/O command is predicted according to: (1) the parameters of the I/O operation delivered as command parameters, and (2) the internal state of the HDD (step S3). Then, the predicted execution time is compared with a deadline providing a maximum tolerable execution time delivered as a command parameter (step S4). When the execution time is not longer than the deadline, the data I/O is executed (step S5). When the execution time is longer than the deadline, the I/O is not executed, and the result is transmitted to the external system as an error termination process (step S6).

In the case where step S2 determines that the applied I/O command is not the one requiring prediction of the execution time, the data I/O operation is immediately executed {step S5}.

Figure 3:
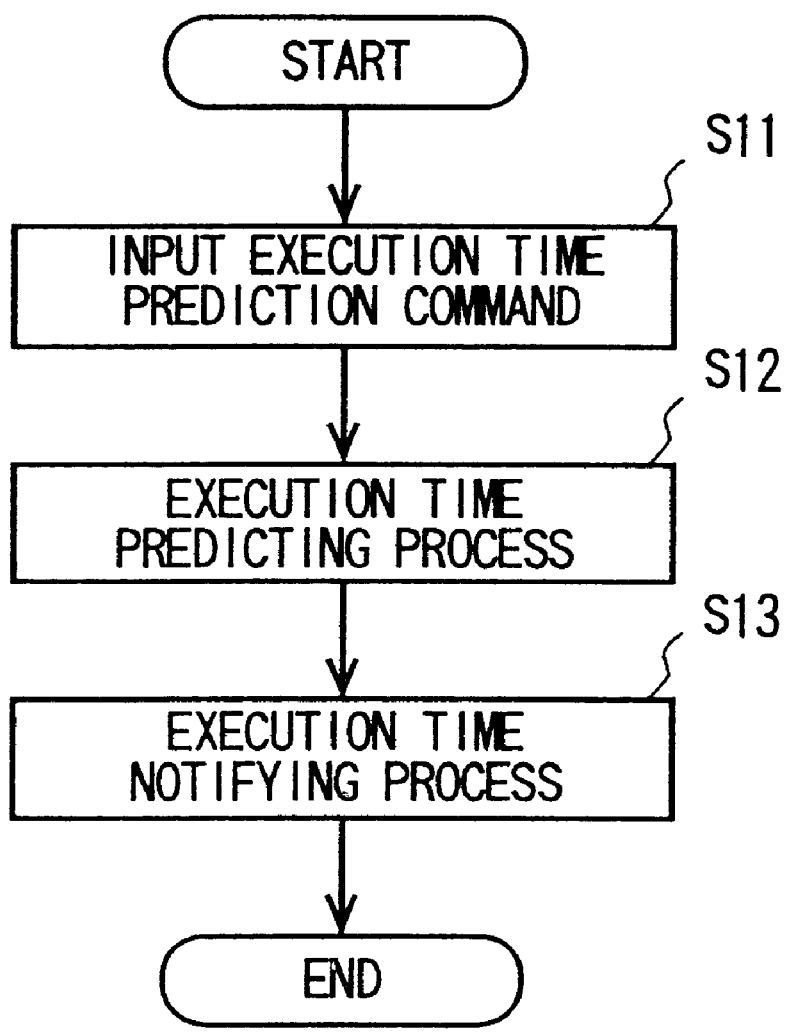
FIG. 3 is a flowchart showing the flow of processing an execution time prediction command according to the first embodiment.

FIG. 3 is a flowchart showing the operation for processing the execution time prediction command by the HDD control circuit 9 according to the first embodiment.

In FIG. 3, upon application of an execution time prediction command from the external system to the HDD control circuit 9 (step S11), the HDD control circuit 9 predicts the execution time of the I/O command according to: (1) the parameters delivered thereto as command parameters for I/O operation and (2) the internal state of the HDD (step S12). The execution time thus predicted is processed for notification of the external system.(step S13).

[Execution Time Prediction Process]

Now, the detailed operation of step S12 in the execution time prediction process shown in FIG. 3 will be explained with reference to FIGS. 4 to 7.

Figure 4:
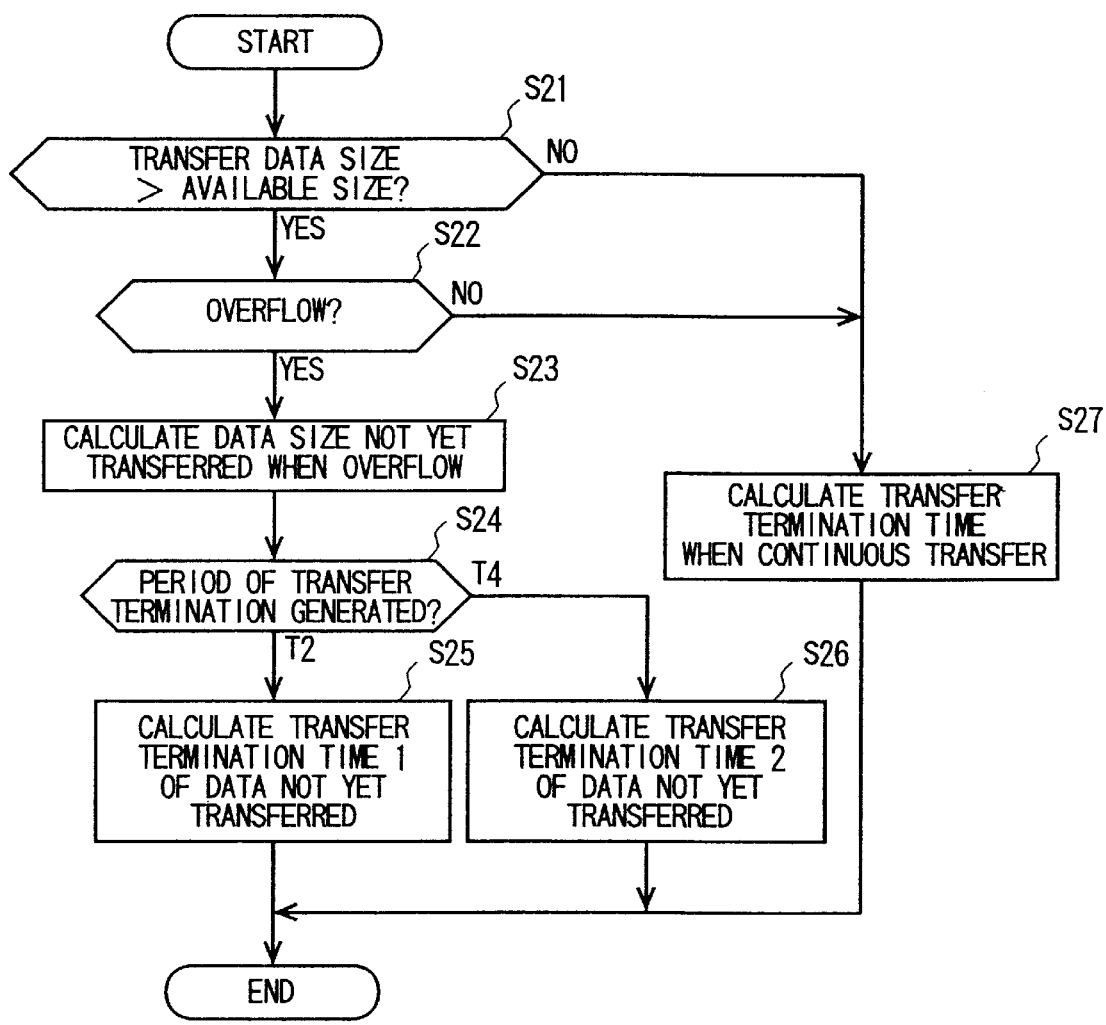
FIG. 4 is a flowchart showing the flow of the process for predicting the execution time of a write command according to the first embodiment.

FIG. 4 is a flowchart showing the flow of the process for predicting the execution time of a write command, i.e, the time when the data transfer to the buffer RAM 3 from the external system is completed.

As shown in FIG. 4, the HDD control circuit 9 first compares an available segment size with the size of the write data to be transferred (transfer data size) (step S21). In the case where the available segment size is larger than or equal to the size of the write data in step S21, the time when the continuous transfer would be terminated is calculated from the I/O bus transfer rate and the transfer data size (step S27).

In the case where the transfer data size is larger than the available segment size, on the other hand, the occurrence or non-occurrence of an overflow is determined (step S22).

In the case where no overflow occurs, the transfer termination time is calculated from the I/O bus transfer rate and the transfer data size (step S27). In the case where an overflow occurs, on the other hand, the size of the data not transferred as of the time of overflow occurrence is calculated (step S23). Then, the period during which the transfer is terminated is determined from the calculated size of the data not yet transferred (step S24), and the situation is evaluated according to the period during which the transfer is terminated (step S25 or S26).

Now, each processing step of execution time prediction will be explained in detail with reference to FIGS. 5 and 6.

Figure 5:
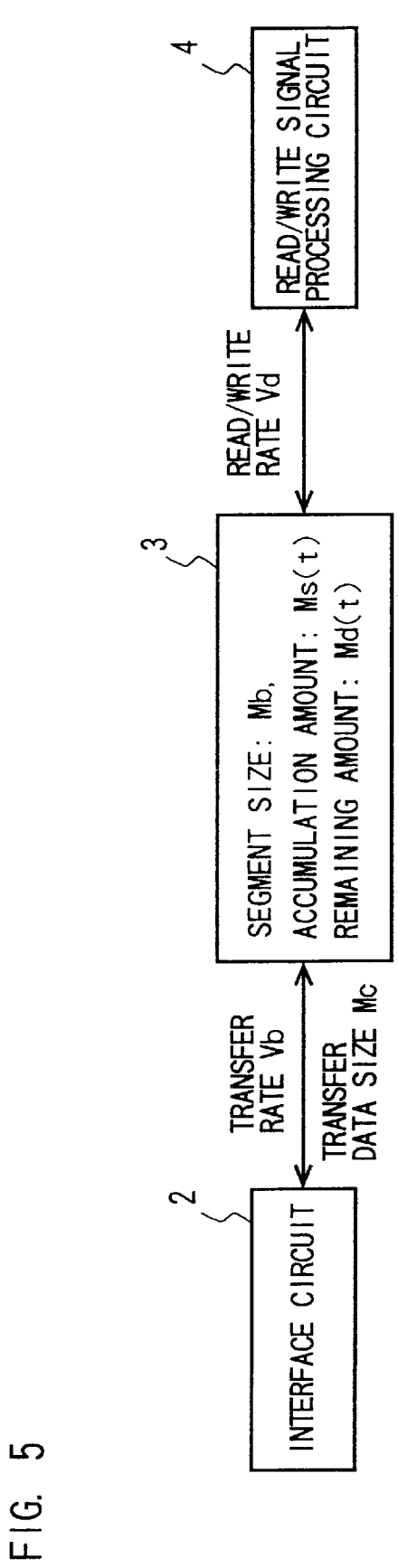
FIG. 5 is a diagram showing various parameters of a buffer RAM according to the first embodiment.

FIG. 5 is a diagram showing various parameters of the buffer RAM 3 according to the first embodiment. As shown in FIG. 5, according to the first embodiment, each parameter for the buffer RAM 3 is defined as follows:

The transfer rate from the external system to the buffer RAM 3 is defined as Vb (in units of MB/s), the write rate from the buffer RAM 3 to the disk 1 is defined as Vd (in units of MB/s), the size of segments formed in buffer RAM 3 and assigned to the write command is defined as Mb (in units of kB), and the write data size to be transferred is defined as Mc (in units of kB).

Also, as a function of time t (in units of ms), the segment accumulation amount at time point t is defined as Ms (t) (in units of kB), the amount of the data transferred to the segment from the external system by a command at or before time point t and remaining in the segment is defined as Md (t) (in units of kB), and the amount of the data to be transferred by a newly-issued command but not yet transferred as of the overflow time Tovf is defined as Mu (Tovf) (in units of kB).

Figure 6:
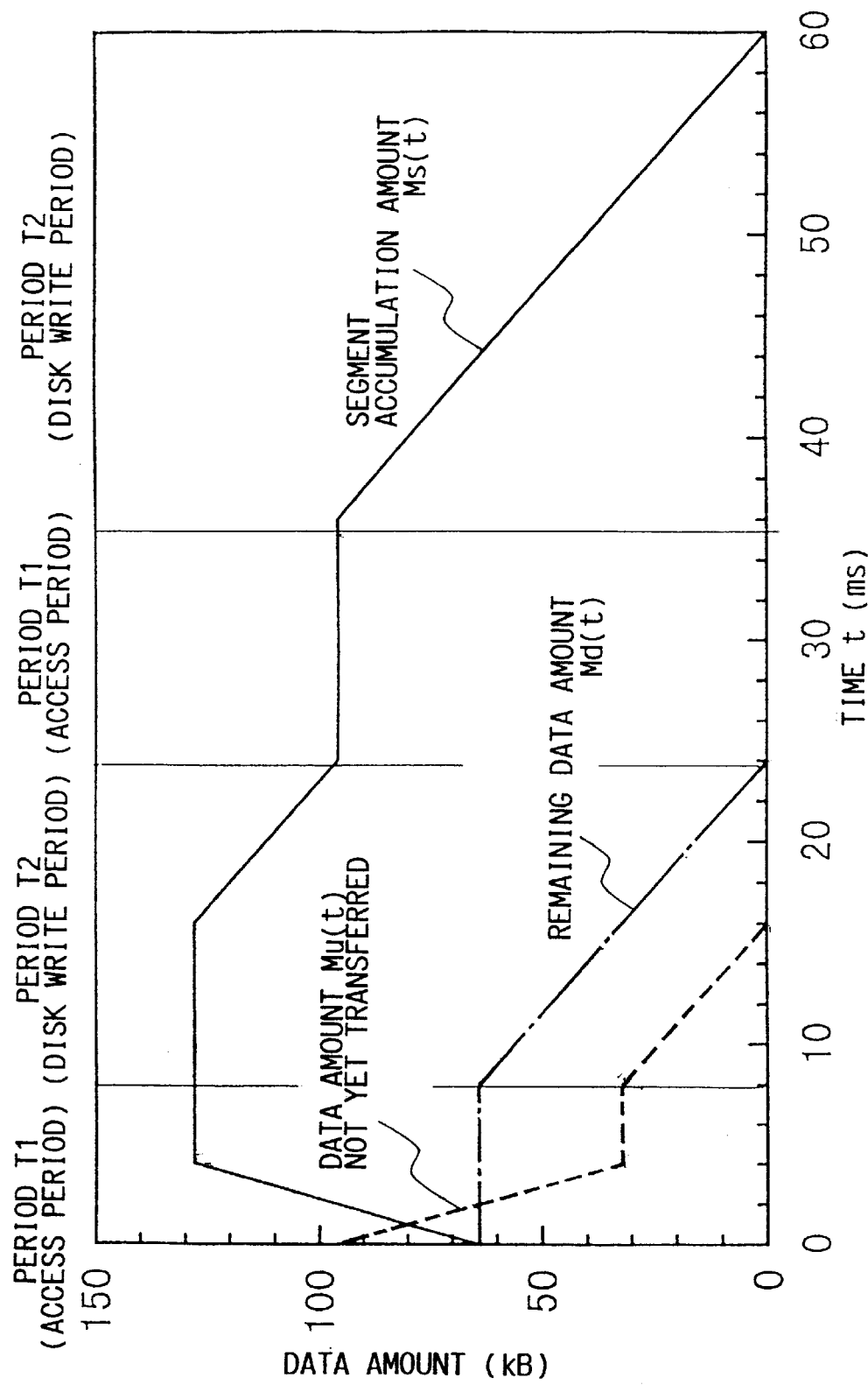
FIG. 6 is a graph showing an example of the accumulated segment amount, the remaining data amount and the untransferred data amount according to the first embodiment.

FIG. 6 is a graph showing an example of the change with time of the segment accumulation amount Ms (t), the amount Md (t) of the remaining data transferred by the previous command, and the amount of data Mu (t) not yet transferred by a newly-issued command as of time point t.

In the graph of FIG. 6, the parameters include Vb set to 16 (MB/s), Vd set to 4 (MB/s), Mb set to 128 (kB), Mc set to 96 (kB), and Md (0) set to Ms (0) equal to 64 (kB). Also, an access period Tw1 due to the previous command is set to 8 (ms), an access period Tw2 due to a newly-issued command is set to 12 (ms), a disk write period Td1 due to the previous command is set to 16 (ms), and a disk write period Td2 due to a newly-issued command is set to 24 (ms).

As shown in FIG. 6, the time period during which the transferred data is finally written to the disk 1 is divided into below-mentioned four time zones respectively having the periods T1, T2, T3, and T4 to calculate the segment accumulation amount Ms (t), etc. T1 is determined from:

$$0 < T1 \leq Tw1$$

The T1 period is the head seek and the rotational latency time due to the previous command issued before a predicted time.

The access period Tw1 is calculated from the head position at the predicted time point and a target head position, the speed profile at head seek time and the disk rotational speed. In the case where the head seek and the rotational latency are over, the access period Tw1=0. T2 is determined from:

$$Tw1 < T2 \leq Tw1 + Td1$$

The T2 period represents the period during which the data is written in the disk in response to the command issued before the predicted time point.

The disk write period Td1 is calculated from the data amount Md (0) remaining at the predicted time pint and the disk write speed Vd according to equation (1). T3 is determined from:

$$Td1 = Md(0)/Vd \tag{1}$$

$$Tw1 + Td1 < T3 \leq Tw1 + Td1 + Tw2$$

The T3 period represents the head seek and the rotational latency time due to a new command to be issued.

The access period Tw2 is calculated from the head position as of the time point of T2 period termination, the target head position, the speed profile at the head seek time and the disk rotational speed. T4 is determined from:

$$Tw1 + Td1 + Tw2 < T4 \leq Tw1 + Td1 + Tw2 + Td2$$

The T4 period represents the period of time during which the data is written in the disk in response to a new command to be issued.

The disk write period Td2 is calculated from the data size Mc to be transferred and the disk write speed Vd according to equation (2).

$$Td2 = Mc/Vd \tag{2}$$

Now, each step of the execution time prediction process for the write command, shown in FIG. 4, will be described in detail.

Step S21: The available segment size is compared with the transfer data size

The available segment size (Mb−Ms (0)) is compared with the transfer data size Mc at the predicted time point.

Step S22: Determines whether an overflow has occurred

In the case where the transfer data size is larger than the available segment size (Mb−Ms (0)<Mc), the segment is likely to overflow during data transfer, and therefore the segment accumulation amount is calculated to determine whether an overflow has occurred.

The remaining data amount Md (t) transferred by the previous I/O command is given by the equation below.

T1 period:

$$Md(t)=Md(0) \qquad (3)$$

T2 period:

$$Md(t)=Md(0)-Vd\times(t-Tw1) \qquad (4)$$

The data amount due to the previous command decreases according to this equation, while the write data is transferred to the buffer RAM 3 from the external system, so that the segment accumulation amount Ms (t) before occurrence of an overflow is given by the following equation (6):

$$Ms(t)=Md(t)+Vb\times t \qquad (5)$$

In view of the fact that the segment accumulation amount Ms (t) exceeds the segment size Mb before continuous transfer of the data amount Mc to the buffer RAM 3, the condition under which an overflow occurs is given by the equation below. In the equation below, Tovf designates the time point of overflow, and Md (Tovf) the data amount remaining at the time point of overflow.

$$Md(Tovf)+Vb\times Tovf=Mb \text{ and } Tovf \leq Mc/Vb \qquad (6)$$

Equations (3) and (4) are substituted into Md (t) in equation (6) to determine the overflow time point Tovf and thereby determines whether an overflow has occurred or not.

Step S23: Calculation of transferred data size not yet transferred as of time point of overflow.

The data size transferred to the buffer RAM 3 before occurrence of an overflow is given as Vb×Tovf, and therefore the data size Mu (Tovf) not yet transferred as of the time of occurrence of an overflow is given by equation (7).

$$Mu(Tovf)=Mc-Vb\times Tovf \qquad (7)$$

Step S24: Determination of transfer termination period.

After overflow, data can be transferred to the buffer RAM 3 by the amount written from the buffer RAM 3 to the disk 1. Therefore, the data transfer is terminated at the time point when the data size Mu (Tovf) not yet transferred as of the time of overflow is has been written from the buffer RAM 3 into the disk 1.

In the case where a head seek or rotational latency occurs during transfer, the disk write operation is suspended and so is the transfer to the buffer RAM 3. Consequently, the transfer is not completed during the head seek period T1 or the rotational latency period T3. The transfer thus is completed during T2 period or T4 period. Also, in the case where the head seek or the rotational latency due to a new command does not occur during the transfer, the transfer is completed during T2 period. Otherwise, the transfer is completed during T4 period.

Whether the head seek and the rotational latency occurs due to a new command can be determined by comparing the amount of data Mu (Tovf) not yet transferred as of the time of overflow with the remaining amount of data Md (Tovf) due to the previous command.

Assume that the amount of data Mu (Tovf) not yet transferred is smaller than the remaining amount of data Md (Tovf) due to the previous command.

The data write operation due to the previous command continues until the completion of the data transfer to the buffer RAM 3. Therefore, the transfer is not suspended by the head seek or the rotational latency due to receiving a new command. In such a case, the completion time of the transfer of the data not yet transferred is calculated in step S25.

Assume that the amount of data Mu (Tovf) not yet transferred is not less than the remaining amount of data Md (Tovf) due to the previous command.

The data write operation due to the previous command is completed before the transfer to the buffer RAM 3 is completed. And the transfer to the buffer RAM 3 is suspended by the head seek or the rotational latency due to a new command. In such a case, the time of complete transfer of the data not yet transferred is calculated in step S26.

Step S25: Calculation of the transfer completion time of the data not yet transferred (transfer completed during T2 period)

In this case, the transfer is completed during T2 period, and therefore the overflow occurs during the T1 or T2 period. Depending on the time point of overflow occurrence, the transfer suspension period due to the head seek or rotational latency may be included in the period of transfer of the data not yet transferred. The equation for calculation of the transfer completion time Td, therefore, is different for different overflow time:

(1) In the case where overflow occurs during T1 period:

The transfer suspension period (Tw1−Tovf) is included in the transfer period of the data not yet transferred. The transfer completion time Td (in ms) is the sum of the time before overflow, the transfer suspension time and the time during which the data transferred before the overflow time point is written in the disk. This transfer completion time Td is calculated from equation (8).

$$Td=Tovf+(Tw1-Tovf)+(Mc-Vb\flat Tovf)/Vd=Tw1+(Mc-Vb\times Tovf)/Vd \qquad (8)$$

(2) In the case where an overflow occurs during T2 period:

The transfer suspension period is not included in the transfer period of the data not yet transferred. The transfer completion time Td is calculated from equation (9).

$$Td=Tovf+(Mc-Vb\times Tovf)/Vd \qquad (9)$$

Step S26: Calculation 2 of transfer completion time of the data not yet transferred (transfer completed during T4 period):

In this case, the transfer is completed during the T4 period, and therefore it is possible that an overflow occurs in any of the T1 to T4 periods.

(1) In the case where overflow occurs during T1 period:

$$Td=Tovf+(Tw1-Tovf)+Tw2+(Mc-Vb\times \flat Tovf)/Vd=Tw1+Tw2+(Mc-Vb\times Tovf)/Vd \qquad (10)$$

(2) In the case where overflow occurs during T2 period:

$$Td=Tovf+Tw2+(Mc-Vb\times Tovf)/Vd \qquad (11)$$

(3) In the case where overflow occurs during T3 period:

$$Td=Tovf+(Tw1+Td1+Tw2-Tovf)+(Mc-Vb\times Tovf)/Vd=Tw1+Td1+Tw2+(Mc-Vb\times Tovf)/Vd \qquad (12)$$

(4) In the case where overflow occurs during T4 period:

$$Td=Tovf+(Mc-Vb\times Tovf)/Vd \qquad (13)$$

Step S27: Calculation of completion time of continuous transfer

In the case where all the data can be continuously transferred from an external system to the buffer RAM 3, the transfer completion time Td is calculated from equation (14).

$$Td=Mc/Vb \tag{14}$$

An example of determining a specific total execution time in each step of the execution time prediction process for the write command described above follows:

Step S21: Size of vacant segment at predicted time $(Mb-Ms(0))=64$ (kB)

Transfer data size (Mc)=96 (kB)

Since Mb−Ms(0)<Mc, an overflow may occur.

Step S22: The remaining amount Md (t) of the data transferred to the segment in response to the previous command is calculated from equations (3) and (4).

$0 \leq t < 8$ (T1 period): $Md(t)=64$(kB)

$8 \leq t < 24$ (T2 period): $Md(t)=64-Vd\mathsf{P}(t-8)$(kB)

From these equations and equation (6) concerning the conditions for overflow occurrence, $Md(Tovf)+16 \times Tovf=128$ and $Tovf \times 6$ Substituting Md(t)=64 for T1 period into Md(Tovf) of this equation determines Tovf=4. In the case where Md(t) for T2 period=64−Vd×(t−8), there is no solution.

Step S23: The size of the data not yet transferred is given by equation (15)

$$Mc - Vb \times Tovf = 32 \tag{15}$$

Step S24: The amount of data not yet transferred as of the time of overflow is 32, and the remaining amount of the data due to the command previous to overflow is 64. Then the transfer is then completed during the T2 period.

Step S25: The overflow occurs during the T1 period, and therefore the transfer completion time Td of the data not yet transferred is calculated from the below-mentioned equation (16):

$$Td=Tw1+(Mc-Vbovf)/Vd=8+(96-16\times 4)/4=16 (\text{ms}) \tag{16}$$

The above-mentioned process calculates the execution time of a write command, i.e., the transfer completion time. Also in combination with other parameters, the transfer completion time can be similarly determined.

Figure 7:
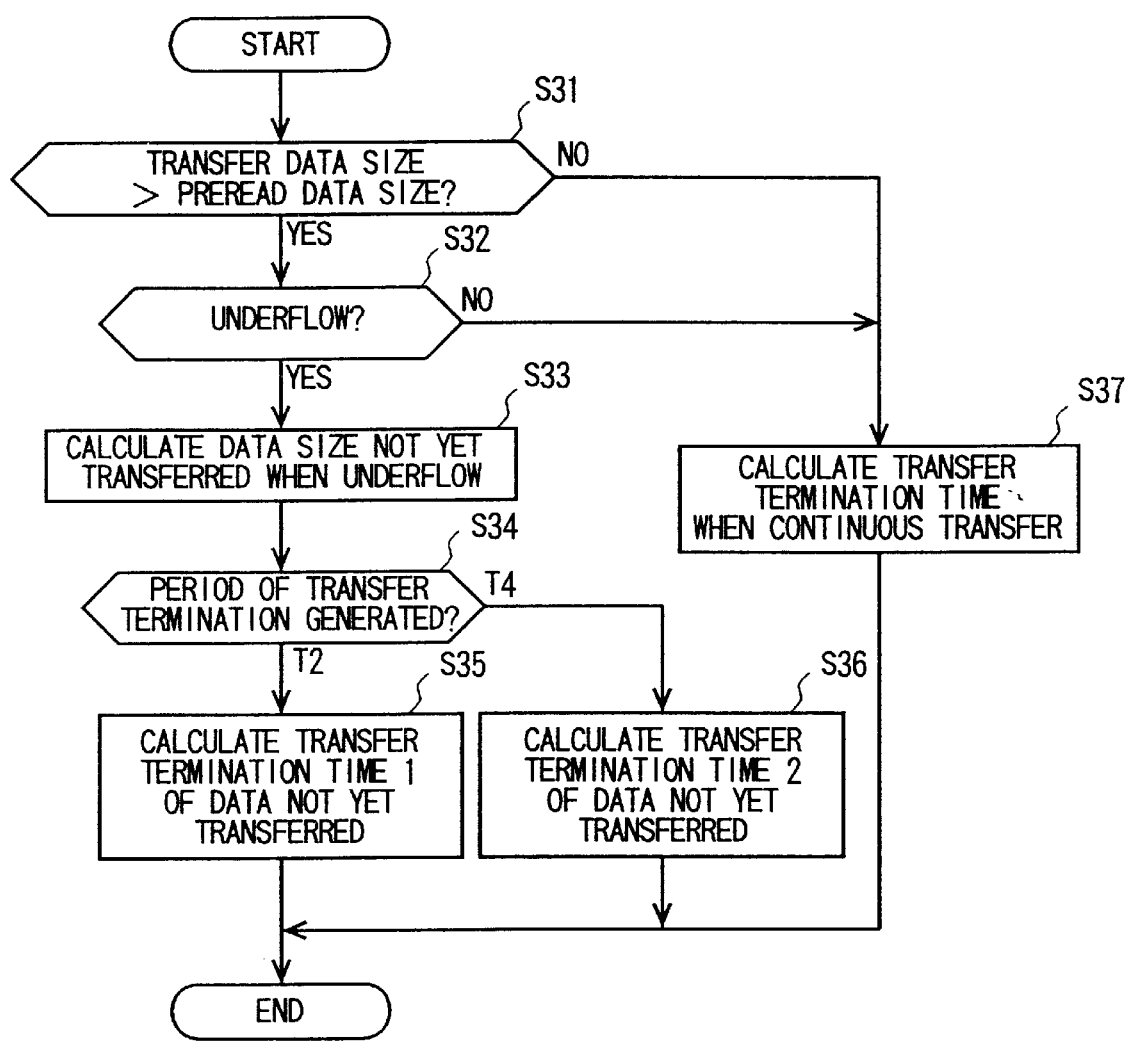
FIG. 7 is a flowchart showing the flow of the process for predicting the execution time of a read command according to the first embodiment.

FIG. 7 is a flowchart showing the flow of the process for predicting the execution time of a read command, i.e., the completion time of the data transfer from the buffer RAM 3.

As shown in FIG. 7, the HDD control circuit 9 first compares the amount of the preread data in the buffer RAM 3 with the amount of the transferred data (step S31). In the first embodiment, the preread amount data is defined as the amount of the data provisionally stored in the temporary memory circuit.

In the case where the size of the preread data is larger than the size of the transfer data in step S31, the transfer completion time for continuous transfer is calculated from the I/O bus transfer rate and the transfer data size (step S37).

In the case where the transfer data size is larger than the size of the preread data in step S31, the occurrence or non-occurrence of an underflow is determined (step S32).

In step S32, when the HDD control circuit 9 determines that there has occurred no underflow, the completion time of a continuous transfer is calculated from the I/O bus transfer rate and the transfer data size (step S37).

In the case where an underflow occurs, in contrast, the size of the data not yet transferred as of the time of the overflow is calculated (step S33), and the period during which the transfer is completed is determined from the calculated size of the data not yet transferred (step S34). In step S34, the situation is evaluated according to the period during which the transfer is completed, and the transfer completion time is calculated (step S35 or S36).

The steps of the process for predicting the execution time of a read command is similar in detail to the aforementioned steps of the process for predicting the execution time of a write command, and will not be described any further.

As described above, the disk apparatus according to the first embodiment internally executes the prediction process, and thus can accurately predict the execution time of an I/O command. Also, execution of an I/O command is determined by comparing the predicted execution time with the maximum tolerable execution time constituting a deadline. In this way, the disk apparatus executes the process for time management of I/O commands by itself and thus can accurately define a deadline.

As a result, the disk apparatus according to the first embodiment can perform accurate time management taking the execution time into account and can execute the process in real time while avoiding a situation in which a high-priority request most wait for execution.

Embodiment 2

Now, a disk apparatus according to the second embodiment of the present invention will be explained. The configuration of a disk apparatus according to the second embodiment is substantially similar to that of the disk apparatus according to the first embodiment shown in FIG. 1.

Figure 8:
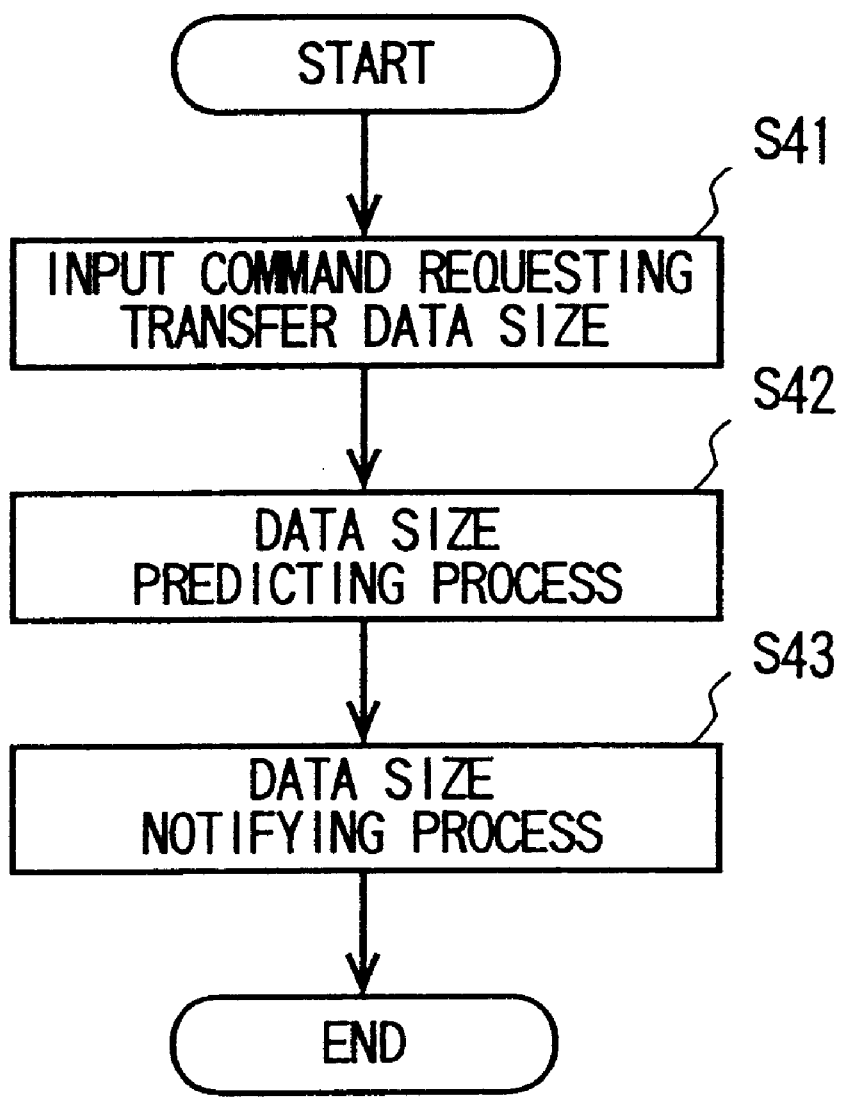
FIG. 8 is a flowchart showing the flow of processing a transfer data amount request command according to a second embodiment.

The operation of the HDD control circuit 9 according to the second embodiment will be explained with reference to FIG. 8. FIG. 8 is a flowchart showing the operation of the HDD control circuit 9 of the disk apparatus according to the second embodiment for processing a command requesting to be transferred.

As shown in FIG. 8, upon application of a command requesting the transfer data of an amount of from the external system to the HDD control circuit 9 (step S41), the HDD control circuit 9 predicts the size of the data that can be input or output within a deadline delivered as a command parameter, on the basis of: (1) the information about the target address; (2) the prevailing operation of the buffer RAM 3 and (3) the head position delivered thereto as command parameters (step S42). Then, the external system is notified of the predicted data size such as a host computer (step S43).

[Data Size Prediction Process]

The process of data size prediction in the HDD control circuit 9 according to the second embodiment will be described in detail below with reference to FIGS. 9 and 10 attached hereto.

Figure 9:
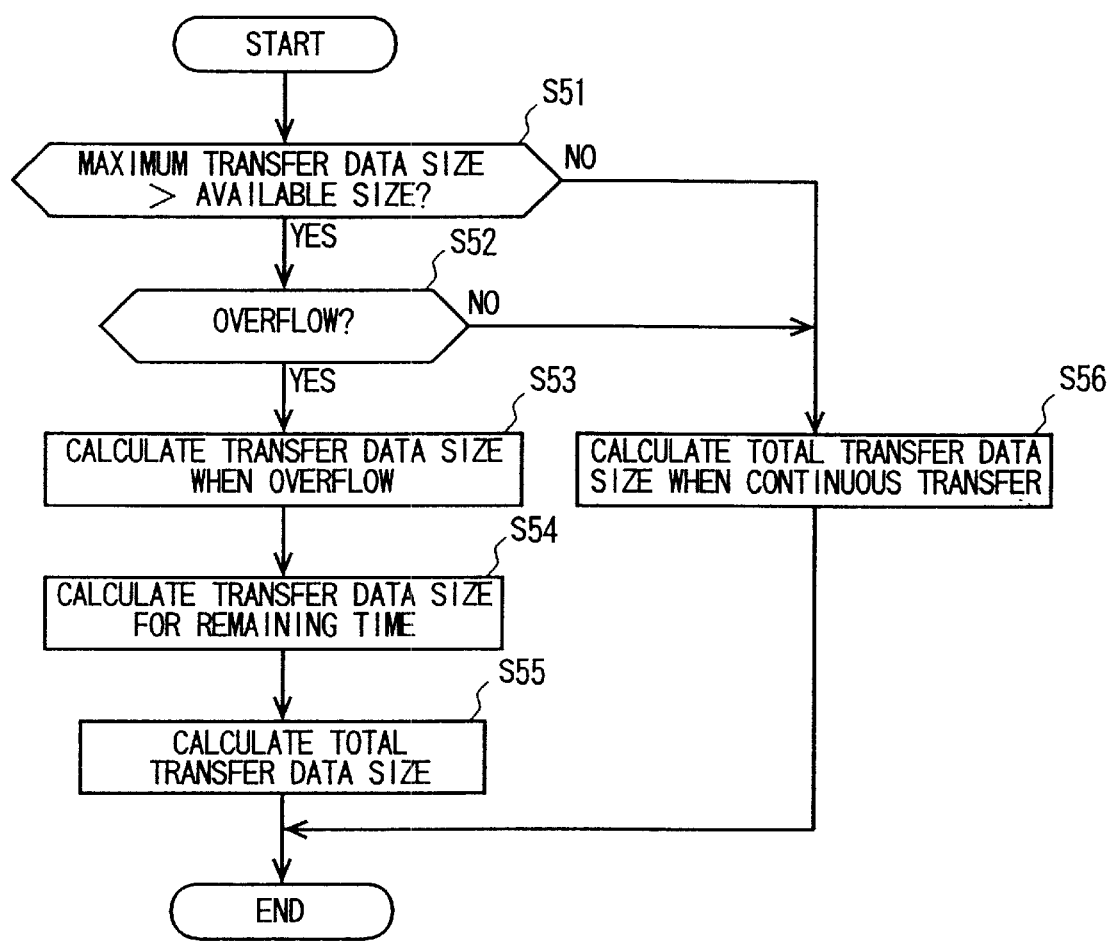
FIG. 9 is a flowchart showing the flow of the process for predicting a writable data size according to the second embodiment.

FIG. 9 is a flowchart showing the flow of the process for predicting the data size that can be written before the deadline.

As shown in FIG. 9, the HDD control circuit 9 first compares the available segment size with the maximum size of the transfer data, i.e., the amount of data that can be continuously transferred to the buffer RAM 3 before the deadline (step S51).

In the case where the available segment size is equal to or larger than the maximum size of the transfer data in step S51, the maximum size of the transfer data is defined as the size of the data that can be input or output (step S56).

In the case where the maximum size of the transfer data is larger than the available segment size in step S51, on the other hand, whether an overflow will occur during transfer is determined (step S52). In the case where step S52 determines that no overflow will occur, the maximum size of the transferred data is determined as the data size that can be input or output (step S56). Conversely, in the case where it is determined that an overflow will occur, the size of the transfer data at the time that the overflow occurs is calculated (step S53). At the same time the size of the data transferable during the time length remaining before the deadline is calculated (S54). In step S55, the size of the transfer data at the time of overflow and the size of the transfer data during the remaining time are added to each other to calculate the total size of the transfer data.

Now, explanation will be made in detail about each step of the data size prediction process in the HDD control circuit 9. First, each parameter for the data size prediction process is defined as follows.

The transfer rate from the external system to the buffer RAM 3 is defined as Vb, the write speed into the disk 1 from the buffer RAM 3 as Vd (in units of MB/s), the segment size assigned to the write command as Mb, the size of the transfer data for the write command as Mc (in units of kB), and the deadline as Tmax (in units of ms).

Also, as a function of time t (in units of ms), the segment accumulation amount at time point t is defined as Ms(t) (in units of kB), and the change in the remaining data transferred to the segment in response to the previous command as of time point t as Md(t) (in units of kB).

As in the process according to the first embodiment described above, the period before the transfer data are written finally in the disk is divided into four time zones described below for calculation of the segment accumulation amount, etc.

$$T1 \text{ period: } 0 < t \leq Tw1 \tag{1}$$

The T1 period provides the head seek and rotational latency time due to the command issued before the predicted time point.

$$T2 \text{ period: } Tw1 < t \leq Tw1 + Td1 \tag{2}$$

During the T2 period, data is written into the disk in response to a command issued before the predicted time point.

$$Td1 = Md(0)/Vd$$

$$T3 \text{ period: } Tw1 + Td1 < t / Tw1 + Td1 + Tw2 \tag{3}$$

The T3 period provides the head seek and rotational latency time due to a new command issued in the future.

$$T4 \text{ period: } Tw1 + Td1 + Tw2 < t \leq Tw1 + Td1 + Tw2 + Td2 \tag{4}$$

During the T4 period, data are written into the disk in response to a new command issued in the future.

The periods T1 to T3 remain unchanged by the size of the transfer data, but the T4 period is variable with the size of the transfer data.

Now, explanation will be made in detail about the steps of the process for predicting whether the data has a size that can be written within the deadline providing the maximum tolerable execution time.

Step S51: Comparison between available segment size and maximum size of transfer data The available segment size (Mb−Ms(0)) as of the predicted time point and the maximum size Mmax of the transfer data are compared with each other. Mmax is the size of the data that can be transferred continuously to the buffer RAM before deadline, and is given by equation (17).

$$M\max = Vb \times T\max \tag{17}$$

Step S52: Determines the occurrence of overflow.

Assume that the available segment size is not more than the maximum size of the transfer data.

In view of the possibility of segment overflow occurring during the data transfer, it is necessary to calculate the memory accumulation amount during the data transfer and to determine whether an overflow occurs or not.

The condition for occurrence of an overflow is that the segment accumulation amount Ms(t) outgrows the segment size Mb before the data amount Mmax is continuously transferred to the buffer RAM 3, and therefore is expressed by equation (18).

$$Md(Tovf) + Vb \times Tovf = Mb \text{ and } Tovf \leq M\max/Vb \tag{18}$$

Substituting equations (3) and (4) into equation (18) gives the overflow time Tovf, thus making it possible to determine whether an overflow occurs or not.

Step S53: Calculation of the transfer data size as to whether an overflow occurs.

The size Movf of the transfer data at the time of overflow occurrence is given by equation (19).

$$Movf = Vb \times Tovf \tag{19}$$

Step S54: Calculation of the data size transferred during the remaining time

During the remaining time from an overflow to the deadline, as much data as was written from the buffer RAM 3 to the disk 1 can be transferred from the external system to the buffer RAM 3.

The situation is classified according to which of the T1 to T4 periods includes the deadline and the overflow time point. The time is calculated during which data can be written into the disk 1 from the buffer RAM 3 between the overflow and the deadline. The data size Md transferable during the remaining time is calculated on the basis of the calculated writable time and the write speed Vd.

(1) In the case where the deadline is included in T1 period:

No data is written from the buffer RAM 3 to the disk 1 during the remaining time between the overflow and the deadline. Therefore, the buffer RAM 3 continues to overflow and therefore data cannot be transferred thereto. The size Md (in units of kB) of the data transferred during the remaining time is zero.

$$Md = 0 \tag{20}$$

(2) In the case where the deadline is included in T2 period:

Depending on whether an overflow occurs during T1 or T2 period, the size Md (in units of kB) of the data transferred during the remaining time is given by the following two equations.

In the case where an overflow occurs during T1 period:

$$Md = Vd \times (T\max - Tw1) \tag{21}$$

In the case where an overflow occurs during T2 period:

$$Md = Vd \times (T\max - Tovf) \tag{22}$$

(3) In the case where the deadline is included in T3 period:

Depending on whether an overflow occurs during in the time period T1 to T3, the size Md of the data transferred during the remaining time is given one of the following three equations (23), (24) and (25).

In the case where an overflow occurs during T1 period:

$$Md = Vd \times Td1 \qquad (23)$$

In the case where an overflow occurs during T2 period:

$$Md = Vd \times (Tw1 + Td1 - Tovf) \qquad (24)$$

In the case where an overflow occurs during T3 period:

$$Md = 0 \qquad (25)$$

(4) In the case where the deadline is included in T4 period:

Depending on whether an overflow occurs during the period T1 to T4, the size Md of the data transferred during the remaining time is given one of the following four equations (26), (27), (28) and (29).

In the case where an overflow occurs during T1 period:

$$Md = Vd \times (Td1 + Tmax - Tw1 - Td1 - Tw2) \qquad (26)$$

In the case where an overflow occurs during T2 period:

$$Md = Vd \times (Tmax - Tovf - Tw2) \qquad (27)$$

In the case where an overflow occurs during T3 period:

$$Md = Vd \times (Tmax - Tw1 - Td1 - Tw2) \qquad (28)$$

In the case where an overflow occurs during T4 period:

$$Md = Vd \times (Tmax - Tovf) \qquad (29)$$

Step 55: Calculation of the total size of the transfer data.

The total size Ma (in units of kB) of the transfer data is calculated as the sum of Movf determined from the above-mentioned equation (19) and Md determined from equations (20) to (29)

$$Ma = Movf + Md \qquad (30)$$

Step 56: Calculation of the total size of the continuously transferred data.

In the case where Mb−Ms(0)þ, Mc, all the data can be continuously transferred from the external system to the buffer RAM 3, and therefore the total size Ma of all the transferred data is calculated from the following equation.

$$Ma = Vb \times Tmax \qquad (31)$$

Figure 10:
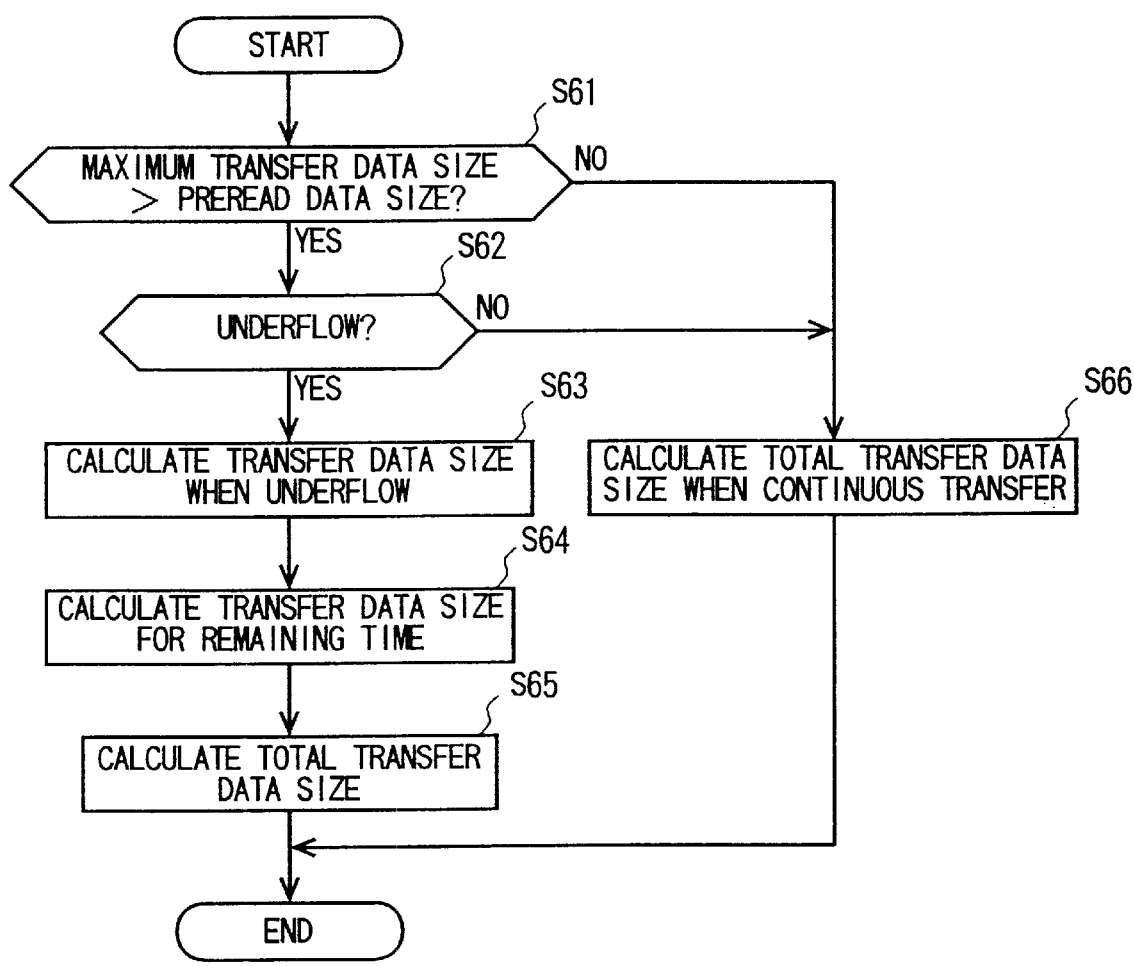
FIG. 10 is a flowchart showing the flow of the process for predicting a readable data size according to the second embodiment.

FIG. 10 is a flowchart showing the flow of the process for predicting the data size readable before the deadline.

As shown in FIG. 10, the HDD control circuit 9 first compares the preread data size in the segment with the maximum transfer data size, i.e., the size of the data transferred and continuously read from the buffer RAM 3 before the deadline (step S61).

In the case where the size of the preread data is larger than the maximum transfer data size in step S61, the maximum transferred data size is defined as the data size that can be input or output (step S66).

In the case where the maximum transfer data size is larger than or equal to the size of the preread data, on the other hand, the possibility of an underflow occurring during transfer is determined (step S62). In the case where the determination in step S62 is that no underflow occurs, the maximum transfer data size is defined as the data size that can be input or output (step S66). Conversely, in the case where the determination is that an underflow occurs, the calculation of the transfer data size as of the time of an underflow (step S63) and the calculation of the data size that can be transferred during the remaining time before the deadline (step S64) are carried out. The transfer data size as of the time point of underflow and the transferred data size during the remaining time are added to each other thereby to calculate the total size of the transfer data (step S65).

The process of predicting the readable data size is similar in detail to that of the writable data size described above, and will not be explained any further.

As described above, the disk apparatus according to the second embodiment can accurately predict the data size that can be input or output within the deadline by predicting the data size that can be input or output within the deadline in the disk apparatus.

Consequently, the disk apparatus according to the second embodiment can carry out time management taking the execution time into account and thus can process data in real time while preventing a high-priority request from waiting for execution. Further, this disk apparatus can transfer the maximum data size that can be transferred while guaranteeing meeting the deadline. Therefore, in addition to guaranteeing the execution time of a high-priority request, a maximum transfer rate is granted for a low-priority request, resulting in an improved processing efficiency.

The segments, which are assigned to write and read commands separately according to the first and second embodiments described above, can alternatively be assigned in accordance with the order of priority.

Also, unlike in the first and the second embodiments explained with reference to the case where only one previously-issued command exists in the segments as of the time of prediction processing, the execution time and the transferable data size can be calculated in a similar manner in the case where there exist data due to two or more commands.

Further, apart from the first and the second embodiments in which the deadline is sent to the HDD as a command parameter each time of prediction processing, the deadline can alternatively be set in advance by another command.

Embodiment 3

Now, explanation will be made about a disk apparatus according to a third embodiment of the present invention. The configuration of the disk apparatus according to the third embodiment is substantially similar to that of the disk apparatus according to the first and second embodiments shown in FIG. 1.

The operation of the HDD control circuit 9 according to the third embodiment will be explained with reference to FIG. 11 attached hereto.

Figure 11:
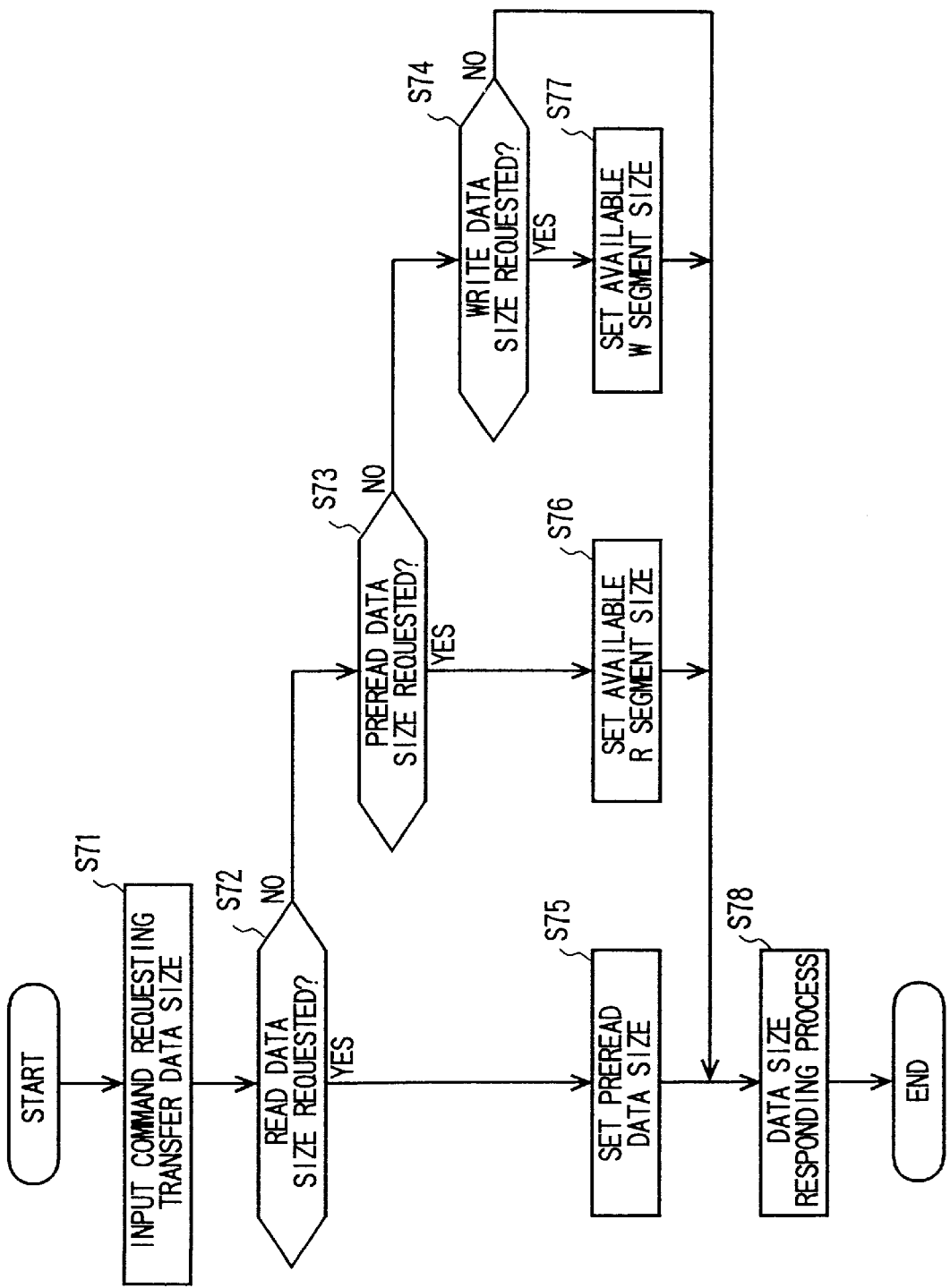
FIG. 11 is a flowchart showing the flow of processing a transfer data amount request command according to a third embodiment.

FIG. 11 is a flowchart showing the operation for processing a command requesting a transfer data amount by the HDD control circuit 9 according to the third embodiment.

As shown in FIG. 11, upon application of a command requesting a transfer data amount from an external system to the HDD control circuit 9 (step S71), the HDD control circuit 9 determines whether the input command represents a request for the read data size, a request for the preread data size or a request for the write data size (steps S72, S73, and S74). The preread data size is defined as the data size stored in the temporary memory circuit from the disk.

In the case where the input command represents a request for the read data size, the preread data size of a corresponding segment is set as the transfer data size (step S75). In the case where the input command represents a request for the preread data size, on the other hand, the size of the corresponding available segment is set as the size of the preread data (step S76). Also, in the case where the input command represents a request for the write data size, the size of the corresponding vacant segment is set as the transferred data size (step S77).

Finally, the external system is notified of each data size thus set (step S78).

As described above, in the disk apparatus according to the third embodiment, the buffer RAM 3 of the disk apparatus is checked for the transferable data size, and the external system is notified of the size of an available size of a corresponding segment or the size of the preread data. As a result, data can be transferred continuously between the external system and the disk apparatus in bursts, and the execution time of an I/O request can be calculated from the size of the data to be transferred and the bus transfer rate alone. In this way, in the disk apparatus according to the third embodiment, the execution time of an I/O request can be accurately and easily calculated, thereby facilitating the time management. Also, the disk apparatus according to the third embodiment can produce the effect of reducing the occupied time of the I/O bus since the data I/O can always be accomplished by transfer in bursts.

Embodiment 4

Now, an explanation will given of a disk apparatus and an I/O control method according to a fourth embodiment of the present invention. The configuration of the disk apparatus according to the fourth embodiment is substantially similar to that of the disk apparatus according to the first embodiment shown in FIG. 1. The disk apparatus 31 according to the fourth embodiment is different from that of other embodiments in the control method of the HDD control circuit 9. Specifically, commands are processed differently with added processing steps.

Figure 12:
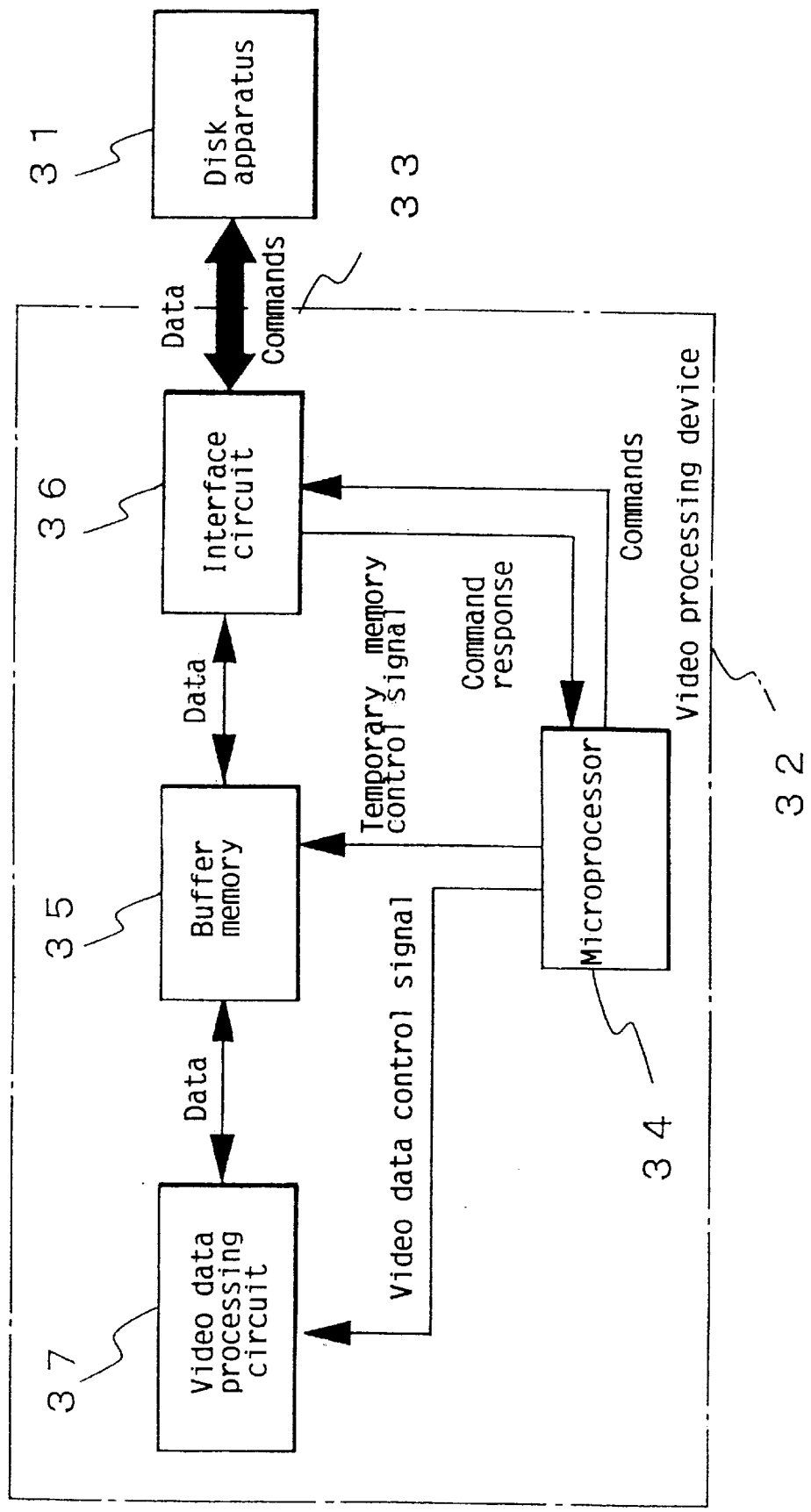
FIG. 12 is a block diagram showing a general configuration of a video processing unit according to a fourth embodiment.

FIG. 12 is a block diagram showing a configuration of a video processing apparatus as an external system for recording and reproducing the video signal using the I/O control method according to the fourth embodiment.

In FIG. 12, a video processing apparatus 32 is connected to the disk apparatus 31 through an interface bus 33. The video processing apparatus 32 includes a microprocessor 34, a buffer memory 35 which is a temporary memory circuit, an interface circuit 36 for controlling the input and output to and from the interface bus 33 and a video data processing circuit 37 for compressing or expanding the video data.

Figure 13:
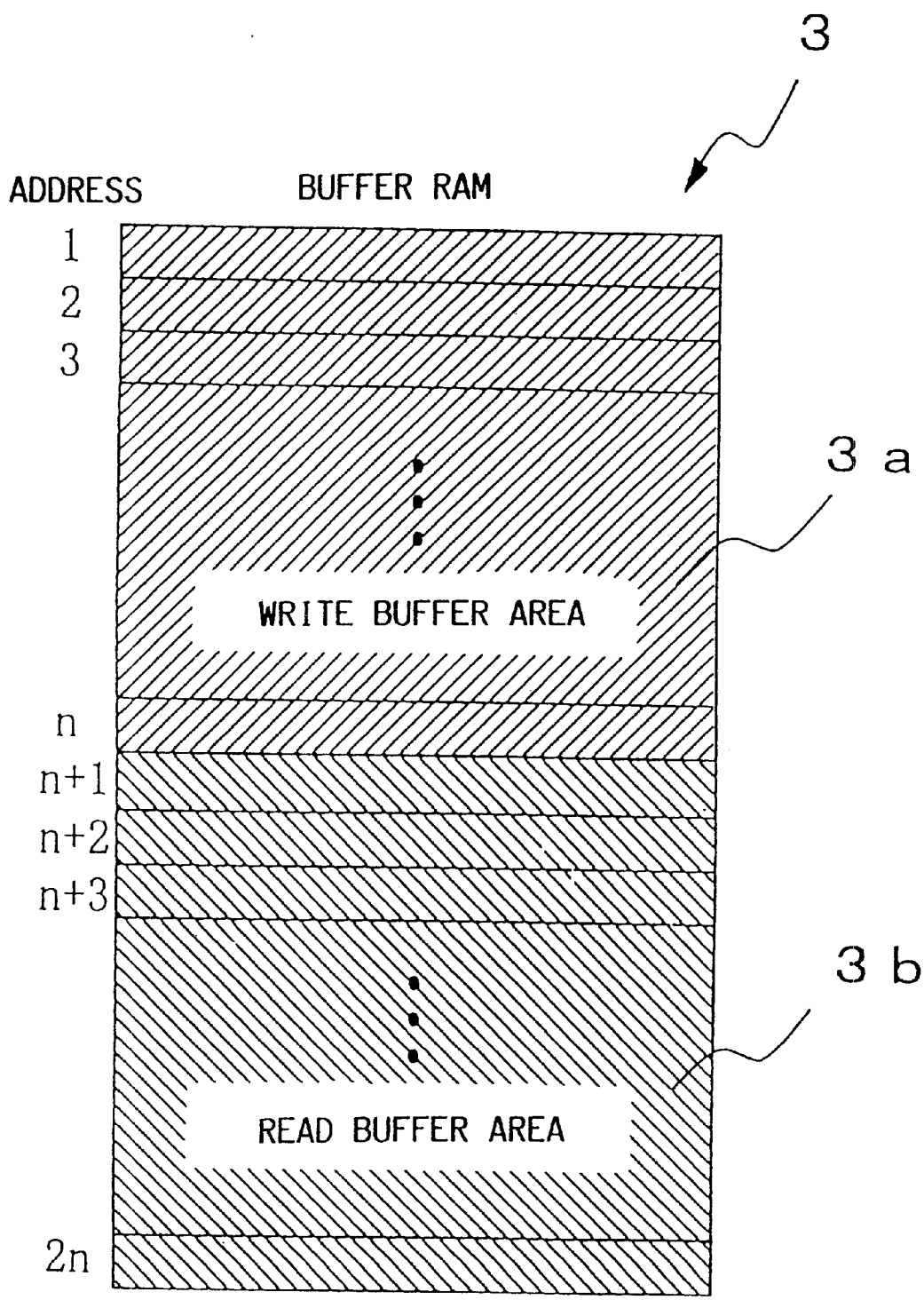
FIG. 13 is a diagram for explaining a method of segmenting the areas of the buffer RAM according to the fourth embodiment.

FIG. 13 is a diagram showing a method of segmenting the buffer RAM 3 of the disk apparatus 31 according to the fourth embodiment. The buffer RAM 3 is segmented into a write buffer area 3a and a read buffer area 3b.

The video processing apparatus 32 configured as described above issues various requests, i.e., various commands to the disk apparatus 31. Commands requiring data transfer include a write command making up a request for writing data, a preread command making up a request for prereading a single data block, a read command making up a request for reading data, and an auto read command for requesting an automatic reading operation by the disk apparatus 31.

Also, the disk apparatus 31 corresponds to the transfer size request command. Upon issue of a command requesting a transfer size from the video processing apparatus 32, therefore, the disk apparatus 31 notifies the video processing apparatus of a data size that can be continuously transferred.

In the case of issuing a write command or a read command, the command type, the transfer data amount, the data recording position, etc. are sent to the disk apparatus 31 as data parameters. The data recording position is designated using a logical address logically assigned to the disk 1.

The command requesting the transfer data size is issued to the disk apparatus 31 together with the type of the transfer data size requested. The disk apparatus 31 notifies the video processing apparatus of the data size that can be transferred continuously based on the accumulated condition of the buffer RAM 3. The operation for processing the command requesting the transfer size in the disk apparatus 31 is similar to the process described above with reference to FIG. 11 showing the third embodiment.

The auto read command, on the other hand, is issued periodically, prior to reading the video data. The file management information table used for the auto read command is generated by the video processing apparatus 32, transferred to the disk apparatus 31 and recorded in the disk 1.

The recording format of the file management information table according to the fourth embodiment is shown in FIG. 19. FIG. 19 is a diagram for explaining the file management information according to the fourth embodiment. Columns A1, A2 and A3 represent regions for storing such parameters as the frame number, the logic address and the data amount of the frame data making up the video file recorded in the disk 1. These parameters are recorded for all the frames making up the video file. The operation of the video processing apparatus 32 and the disk apparatus 31 according to the fourth embodiment having the above-mentioned configuration will be explained below with reference to each command.

[Write Command]

First, explanation will be made about the procedure in which the video processing apparatus 32 issues a write command.

In response to a periodic request of the microprocessor 34, a video data processing circuit 37 generates a data block by compressing the video data for each display unit, and stores it temporarily in a buffer memory 35.

Figure 14:
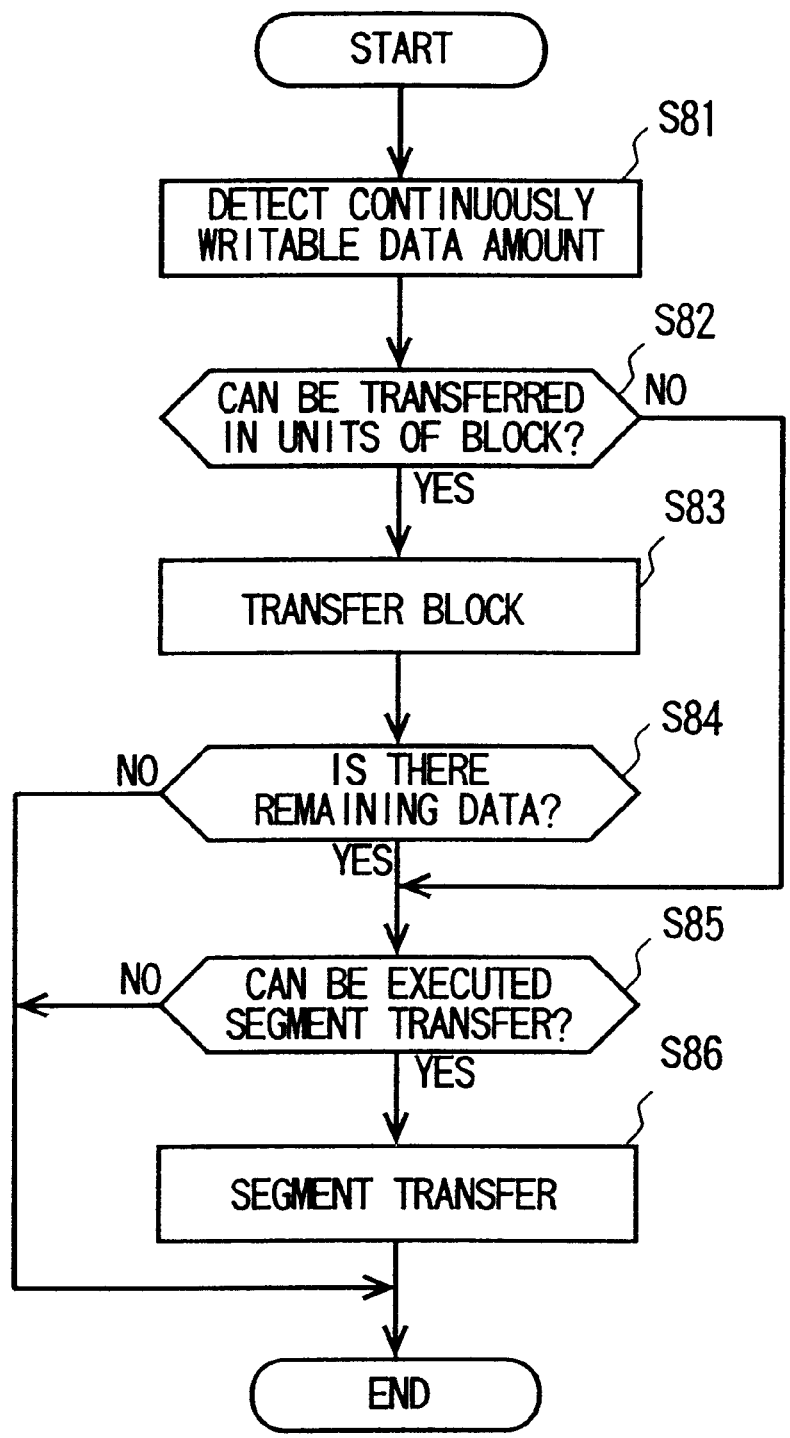
FIG. 14 is a flowchart showing the flow of operation of the video processing unit according to the fourth embodiment.

Then, an I/O control method executed by the microprocessor 34 will be explained with reference to FIG. 14. FIG. 14 is a flowchart showing the I/O control operation performed in the microprocessor 34.

First, step S81 issues a command requesting a transfer data size to the disk apparatus 31 and receives the amount of the continuously writable data.

Step S82 compares the continuously writable data amount with the amount of data to be transferred, and determines whether or not the block transfer (continuous transfer of each data block) is possible. If the block transfer is possible, the process proceeds to step S83, while if the block transfer is impossible, the process proceeds to step S85 for a determination.

Step S83 issues a write command corresponding to the data block, and executes the block transfer in a predetermined procedure. In the case where a plurality of data blocks are stored in the buffer memory 35, the above-mentioned block transfer process is repeated a plurality of times.

Step S84 determines whether data remains in the buffer memory 35. In the case where data remains, the process proceeds to step S85, while if no data remains, the process is terminated.

In step S85, the amount of continuously writable data is compared with a preset minimum data amount for starting the write operation thereby to determine whether the amount of the continuously writable data is not less than the minimum data amount for starting the write operation. In the case where the amount of continuously writable data is not less than the minimum data amount for starting the write operation, the data block is segmented in step S86. In step S86, a write command for the data thus segmented is issued, and the data transfer is executed.

In the case where the above-mentioned condition is not fulfilled, in contrast, the process is terminated as it is. The minimum data amount for starting the write operation can be appropriately set to a predetermined value such as one half of the size of the data block in advance.

Now, the operation of processing the write command from the video processing apparatus 32 in the disk apparatus 31 will be explained with reference to FIG. 1.

The data corresponding to the write command is stored in the buffer data RAM 3 by the interface circuit 2. The HDD control circuit 9 determines a corresponding available segment size from the data amount stored in the buffer RAM 3 and changes the amount of continuously writable data. The data temporarily stored in the buffer RAM 3 is sequentially recorded in the disk 1.

[Preread Command with Command ID]

Now, explanation will be made about the procedure in which the video processing apparatus 32 shown in FIG. 12 issues a preread command.

In response to a periodic request from the microprocessor 34, the interface circuit 36 issues a preread command with a command ID. The command ID is an identifier of a preread command and is set as a different value for each command.

Figure 15:
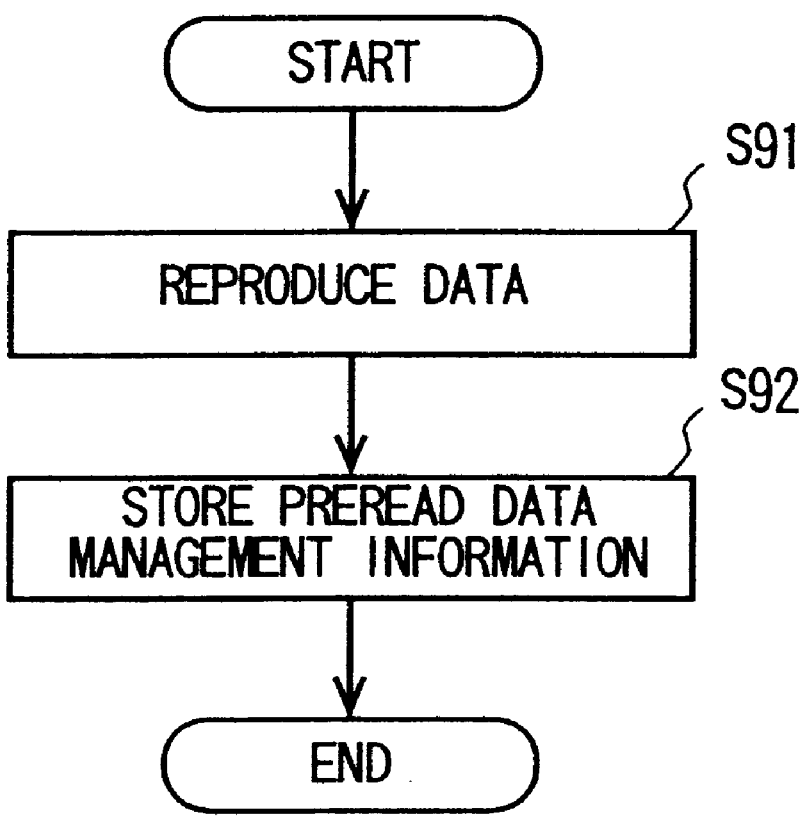
FIG. 15 is a flowchart for explaining the flow of the recording operation of a storage apparatus according to the fourth embodiment.

Now, the operation of processing the preread command with command ID in the disk apparatus 31 will be explained with reference to FIGS. 1 and 15. FIG. 15 is a flowchart showing the operation of processing the preread command with a command ID.

In step S91 shown in FIG. 15, a series of processes described below are executed.

First, the HDD control circuit 9 shown in FIG. 1 reproduces the data based on the logic address notified from the video processing apparatus 32, and stores in the buffer RAM 3 as preread data. Further, the HDD control circuit 9 changes the amount of continuously readable data in accordance with the amount of the preread data stored in the buffer RAM 3.

In step S92, the management information for the preread data is stored in a preread data management table as shown in FIG. 16. FIG. 16 is a diagram an example of the preread data management table. In FIG. 16, columns B1, B2 and B3 represent regions for storing such parameters as a command ID (identifiers), a storage position (start address) in the buffer RAM 3 and a data amount, respectively. These regions store each data preread in response to a preread command with a preread ID.

[Read Command with Command ID]

Figure 17:
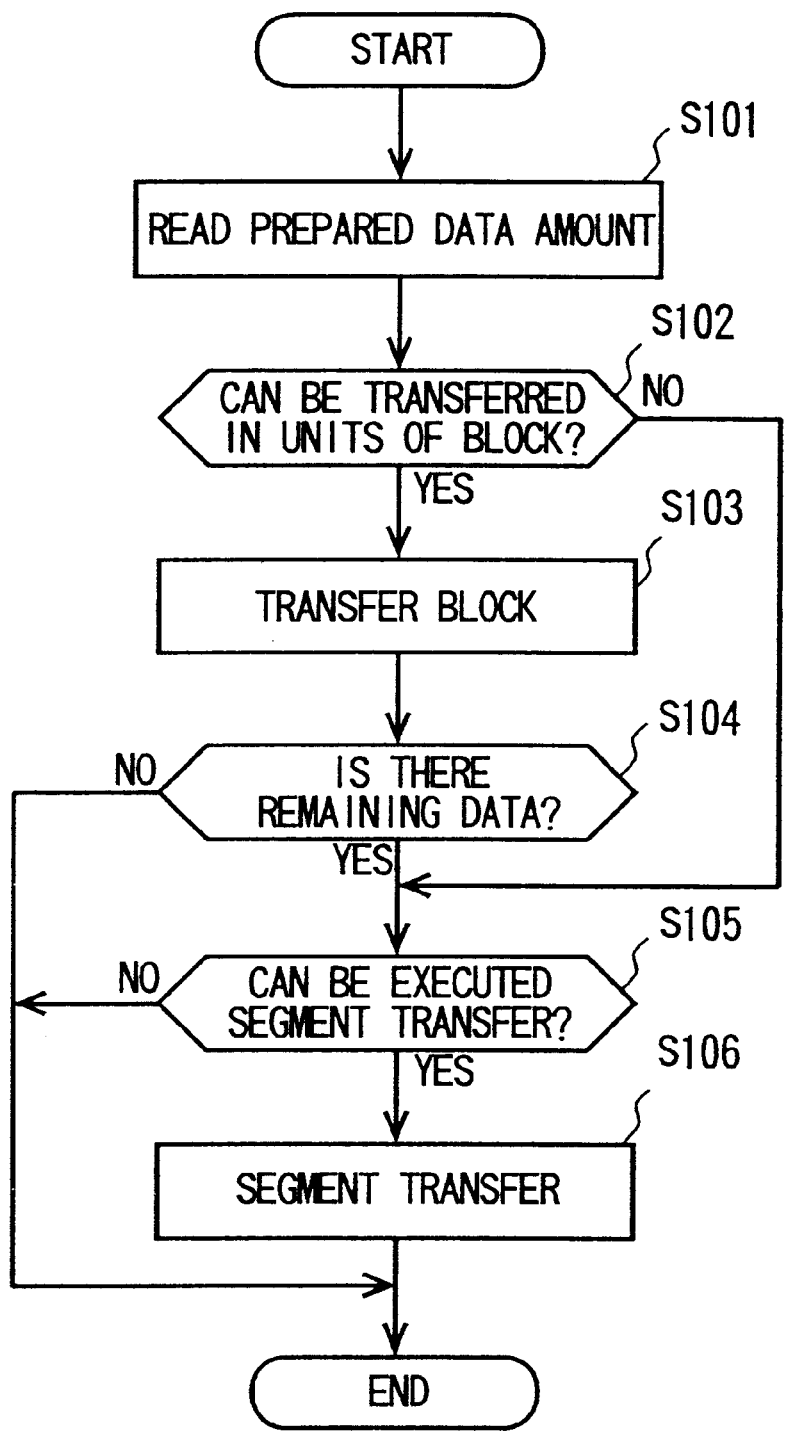
FIG. 17 is a flowchart for explaining the reproducing operation of a storage apparatus according to the fourth embodiment.

Now, the procedure in which a read command with a command ID is issued by the video processing apparatus 32 will be explained with reference to FIG. 17. FIG. 17 is a flowchart showing the process of issuing a read command with a command ID. The read command is issued after the preread command for the same data. Also, the read command is assigned the same command ID as the preread command and issued to the disk apparatus 31.

In step S101, a command requesting the transfer data size is issued to the disk apparatus 31, and receives the amount of continuously readable data, i.e., a preread data amount.

Step S102 determines whether data can be read by block based on the amount of continuously readable data. In the case where the data can be read by block, step S103 is executed, otherwise the process proceeds to step S105.

In step S103, a read command with a command ID with command ID corresponding to a data block is issued and data blocks are read out continuously in a predetermined procedure. In the case where a plurality of data blocks are stored in the buffer RAM 3, the above-mentioned block transfer process is repeated a plurality of times.

Step S104 determines whether data remains in the buffer RAM 3. In the case where data remains so, the process proceeds to step SI105. Otherwise, the process is terminated.

In step S105, the amount of continuously readable data is compared with a preset minimum data amount for starting the read operation thereby to determine whether the amount of continuously readable data is not less than the minimum data amount for starting the read operation. In the case where the condition is fulfilled that the amount of continuously readable data is not less than the minimum data amount for starting the read operation, step S106 is executed. In the case where the above-mentioned condition fails to be fulfilled, the process is terminated immediately. The minimum data amount for starting the write operation is set appropriately to a predetermined value such as one half the data amount of a data block.

In step S106, the data block is segmented, and a read command with command ID corresponding to the segmented data is issued. In step S106, the segmented data are continuously read out.

Figure 18:
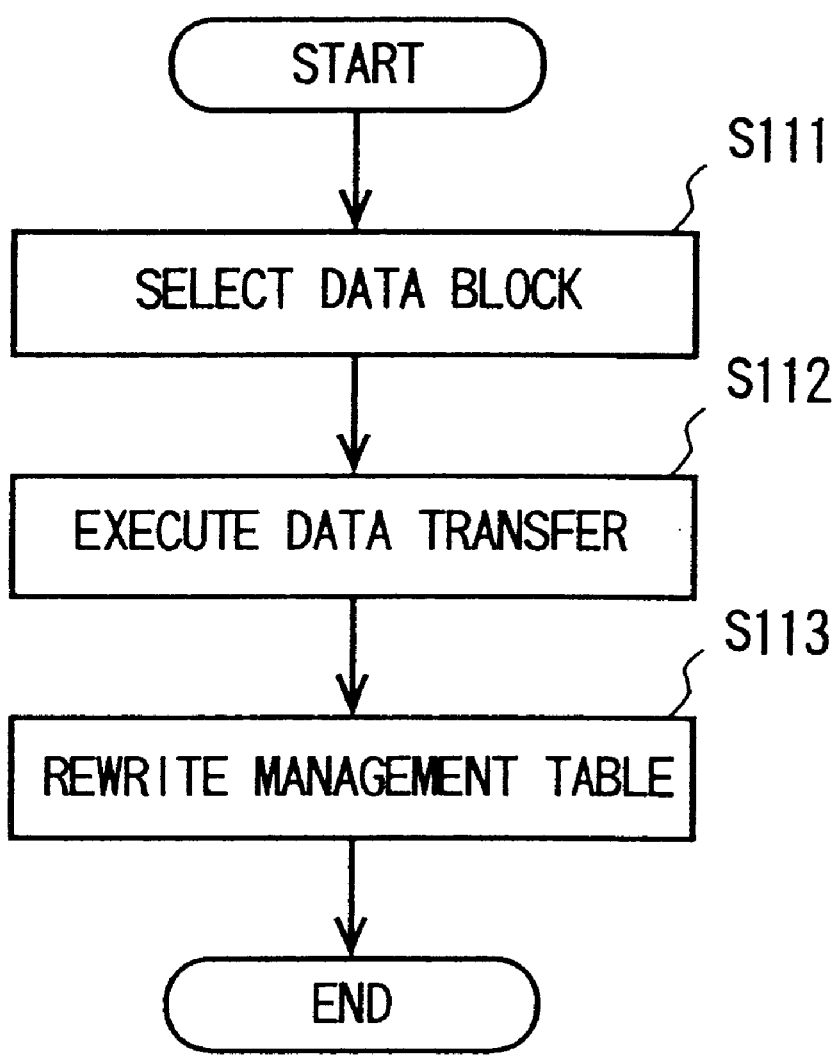
FIG. 18 is a flowchart for explaining the data retrieval operation of a storage apparatus according to the fourth embodiment.

Now, in the disk apparatus, the operation of processing the read command with command ID described above issued from the video processing apparatus 32 will be explained with reference to FIG. 18. FIG. 18 is a flowchart showing the operation of processing a read command a in the disk apparatus 31 with command ID.

In step S111, data corresponding to the command ID of the read command is retrieved and selected from the preread data management table.

In step S112, the selected data is output to the video processing apparatus 32. In step S113, the disk apparatus deletes the items of data which have been completely transferred from the preread data management table shown in FIG. 16.

[Auto Read Command]

Now, explanation will be made about the process for issuing an auto read command by the video processing apparatus 32.

The video processing apparatus 32 determines the preread parameters including the identifier of the file management information table for the file to be preread, the frame number (F0) to be preread first, the number of frames to be preread (NF), the number of skips (S) indicating the intervals of the frame numbers to be preread and the preread direction (D), and issues an auto read command to the disk apparatus 31 as a command parameter.

In what is called the "fast forward playback" for displaying video data at predetermined frame intervals, the preread operation is executed by setting the number S of skips to a predetermined value. The data preread is read and displayed at time intervals similar to the case of recording the data. The preread direction D is set to "0" when prereading in the order of recording, while it is set to "1" for prereading in reverse order.

In response to the auto read command, the disk apparatus 31 issues sequential read commands with a data recorded position as a parameter corresponding to each frame. The data preread by the buffer RAM 3 is output from the disk apparatus 31 to the video processing apparatus 32.

Figure 20:
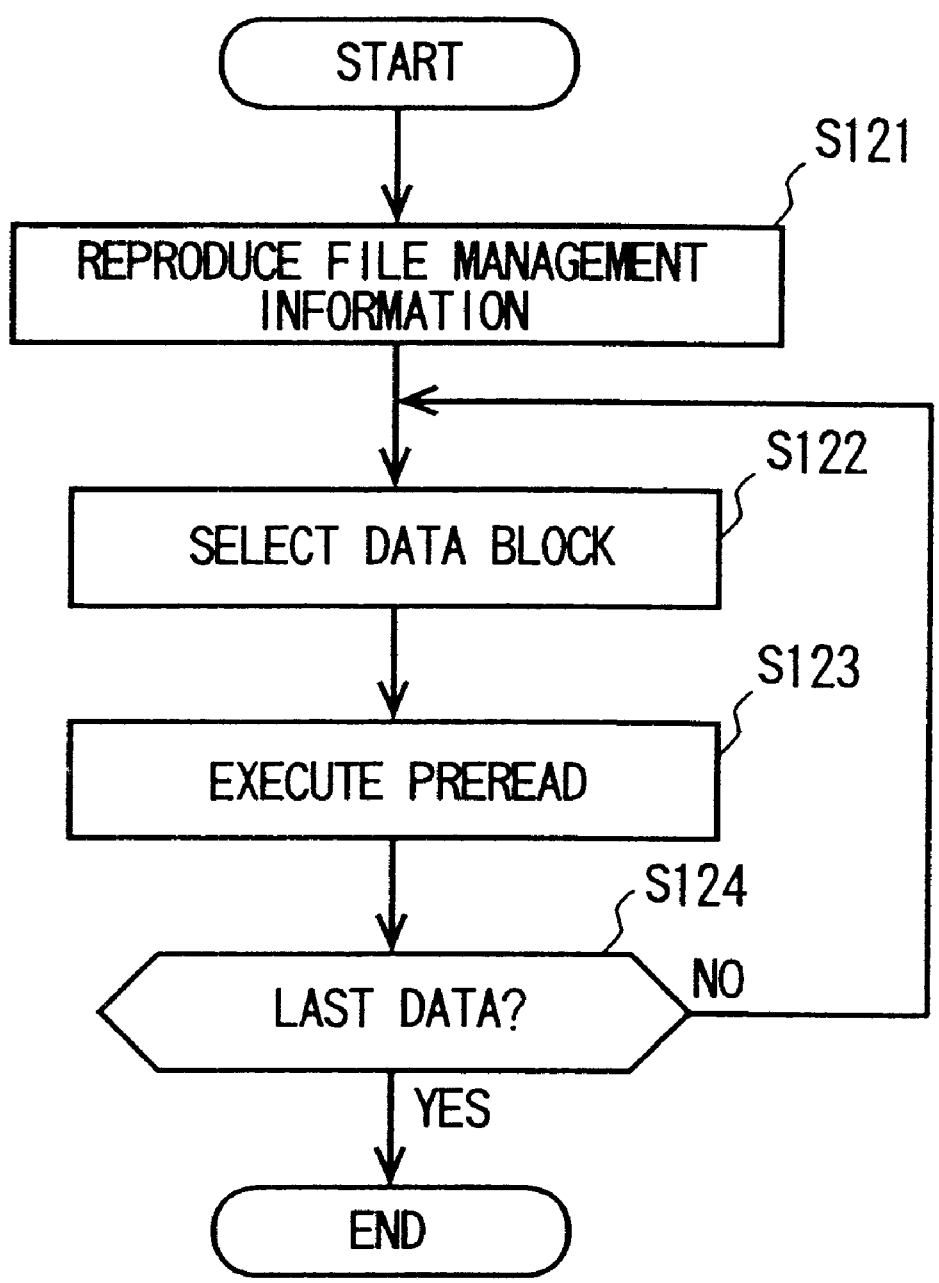
FIG. 20 is a flowchart for explaining the auto read operation of a storage apparatus according to the fourth embodiment.

Now, in the disk apparatus, the operation of processing the auto read command supplied from the video processing apparatus 32 will be explained with reference to FIG. 20. FIG. 20 is a flowchart showing the operation of processing the auto read command in the disk apparatus 31.

First, step S121 reproduces the file management information from the file management information table on the disk 1. In step S122, a frame to be preread is selected based on the file management information reproduced, thereby reading the data amount and the start address corresponding to the selected frame. The frame number (FP) to be preread is determined by the following equation;

$$FP=F0+(-1)D \times S \times (N-1),$$

where N is the number of processing times in step S122. D is the preread direction which is "0" when prereading in the order of recording and "1" when reading in the reverse order.

In step S123, the data block corresponding to the selected frame is reproduced and stored in the buffer RAM 3.

Next, step S124 compares the number N of processing times with the number NF of the frames to be preread and determines whether the preread operation is complete. In the case where the preread operation is incomplete, the above-mentioned process is continued. In the case where the preread operation is complete, in contrast, the above-mentioned process is completed.

If the data are preread by the buffer RAM 3, like in the preread command described above, the HDD control circuit 9 changes the amount of continuously readable data in accordance with the amount of preread data. The HDD control circuit 9 then informs the external system in response to the transfer data size request from the video processing apparatus 32.

As described above, according to the I/O control method of the fourth embodiment, the video processing apparatus 32 receives the amount of continuously transferable data from the disk apparatus and controls the transfer based on the received amount of continuously transferable data. As a result, the I/O control method according to the fourth embodiment permits data to be continuously transferred always between the video processing apparatus 32 and the disk apparatus 31. In this way, the predicted execution time can be accurately predicted and managed, while at the same time reducing the processing load of the video processing apparatus.

Further, in the disk apparatus according to the fourth embodiment, the auto preread operation is executed based on the file management information of the image file stored in the disk apparatus 31. As a result, the preread operation suitable for the image can executed with the disk apparatus alone, thereby realizing a reduced load on the video processing apparatus and the efficient operation of the buffer memory.

Furthermore, in the disk apparatus according to the fourth embodiment, the preread data can be directly designated and accessed using the command ID. Therefore, the process of retrieving the preread data can be eliminated in the disk apparatus, resulting in a reduced processing load of the disk apparatus for the preread processing on the one hand and an efficient use of the buffer memory on the other hand.

Although the fourth embodiment concerns the case in which the file management table for video data is prepared by the video processing apparatus and notified to the disk apparatus, the file management information can alternatively be produced in the disk apparatus by designating a file identifier in the process of writing the video data.

According to the fourth embodiment, the data blocks selected are sequentially preread in response to an auto read command, and are output sequentially to the video processing apparatus in response to a read command. As an alternative, the selected data blocks can be output directly to the video processing apparatus in response to an auto read command.

Embodiment 5

Now, a disk apparatus according to a fifth embodiment of the present invention will be explained. The video processing apparatus according to the fifth embodiment has a substantially similar configuration to the video processing apparatus shown in FIG. 12, and the disk apparatus has a substantially similar configuration to the disk apparatus shown in FIG. 1. The fifth embodiment is different from other embodiments in that the video processing apparatus 32 issues six types of I/O commands in accordance with the type of data and in that the disk apparatus performs the processing operation in accordance with the type of each I/O command.

The video processing apparatus 32 according to the fifth embodiment issues, for a sequential data, a sequential write command making up a write request, a sequential preread command making up a preread request, and a sequential read command making up a read request. Further, the video processing apparatus 32 according to the fifth embodiment issues for random data, a random write command making up a write request, a random preread command making up a preread request and a random read command making up a read request.

Figure 21:
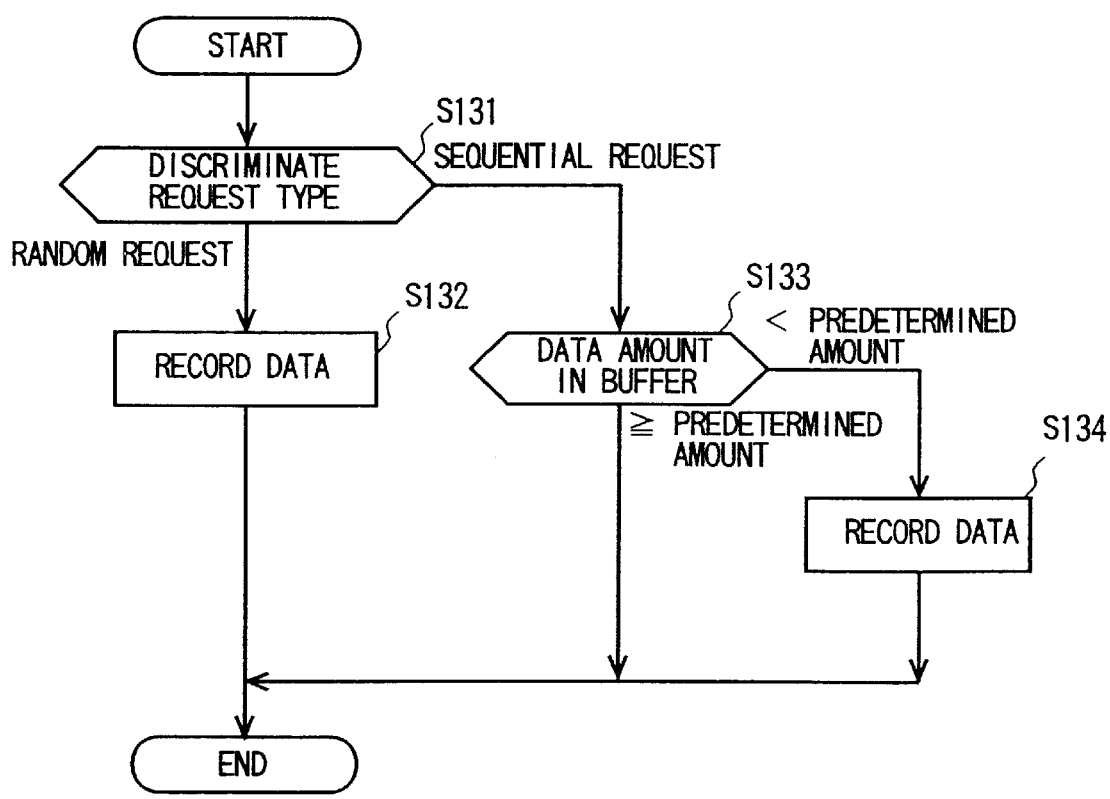
FIG. 21 is a flowchart for explaining the recording operation of a storage apparatus according to a fifth embodiment.

The operation of the disk apparatus 31 corresponding to each of the above-mentioned commands will be explained with reference to FIG. 21. FIG. 21 is a flowchart for each command issued to the disk apparatus 31.

First, explanation will be made about the operation corresponding to the sequential write command or the random write command.

In step S131, the type of the command is determined. In the case of a random write command, step S132 performs the recording operation in a procedure similar to the first embodiment described above, while in the case of a sequential write command, the process proceeds to step S133.

Step S133 determines whether the data amount stored in the buffer RAM 3 is larger than the maximum amount of data that can be accumulated. In the case where the determination is affirmative, step S134 is executed. Otherwise, the process is immediately terminated. The maximum data amount capable of being accumulated can be set based on the data amount storable in the buffer RAM 3, etc. in accordance with the sequential write command to be issued next.

In step S134, the data stored in the buffer RAM 3 are continuously recorded in the disk 1. In view of the fact that the sequential data stored in the buffer RAM 3 are recorded in substantially successive regions on the disk 1, a large amount of data can be recorded within a short time without any overhead time, such as required for the seek operation and the rotational latency time.

Figure 22:
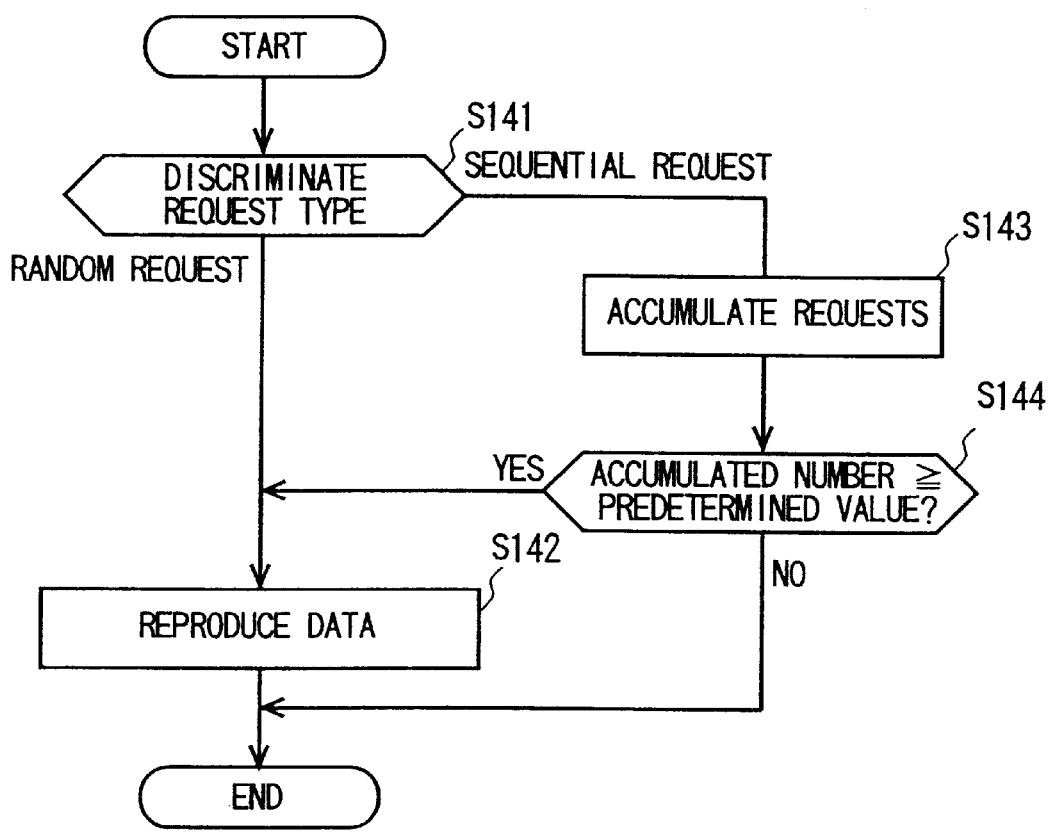
FIG. 22 is a flowchart for explaining the reproducing operation of a storage apparatus according to the fifth embodiment.

Now, the operation corresponding to a sequential preread command or a random preread command will be explained with reference to FIG. 22. FIG. 22 is a flowchart showing the operation associated with the sequential preread command or the random preread command.

First, step S141 identifies the command type. In the case of a random preread command, step S142 performs a preread operation in a procedure similar to the first embodiment described above. In the case of a sequential preread command, on the other hand, the process proceeds to step S143.

In step S143, the sequential preread commands are accumulated.

Step S144 determines whether the sequential preread commands thus accumulated are greater than or equal to the maximum number of commands that can be accumulated. In the case where the condition is fulfilled that the accumulated sequential preread commands are greater than or equal to the maximum number of commands that can be accumulated, then step S142 continuously reproduces the data corresponding to a plurality of the accumulated commands. In the case where the above-mentioned condition fails to be met, on the other hand, the process is terminated.

The disk apparatus 31 according to the fifth embodiment also performs the prefetch operation as an internal process.

The prefetch operation is for reproducing and storing in the buffer RAM 3 the data around the recording positions of the data corresponding to the commands. According to the fifth embodiment, a parameter indicating the advisability of the prefetch operation is transmitted to the disk apparatus 31 at the time of issuing each command.

Figure 23:
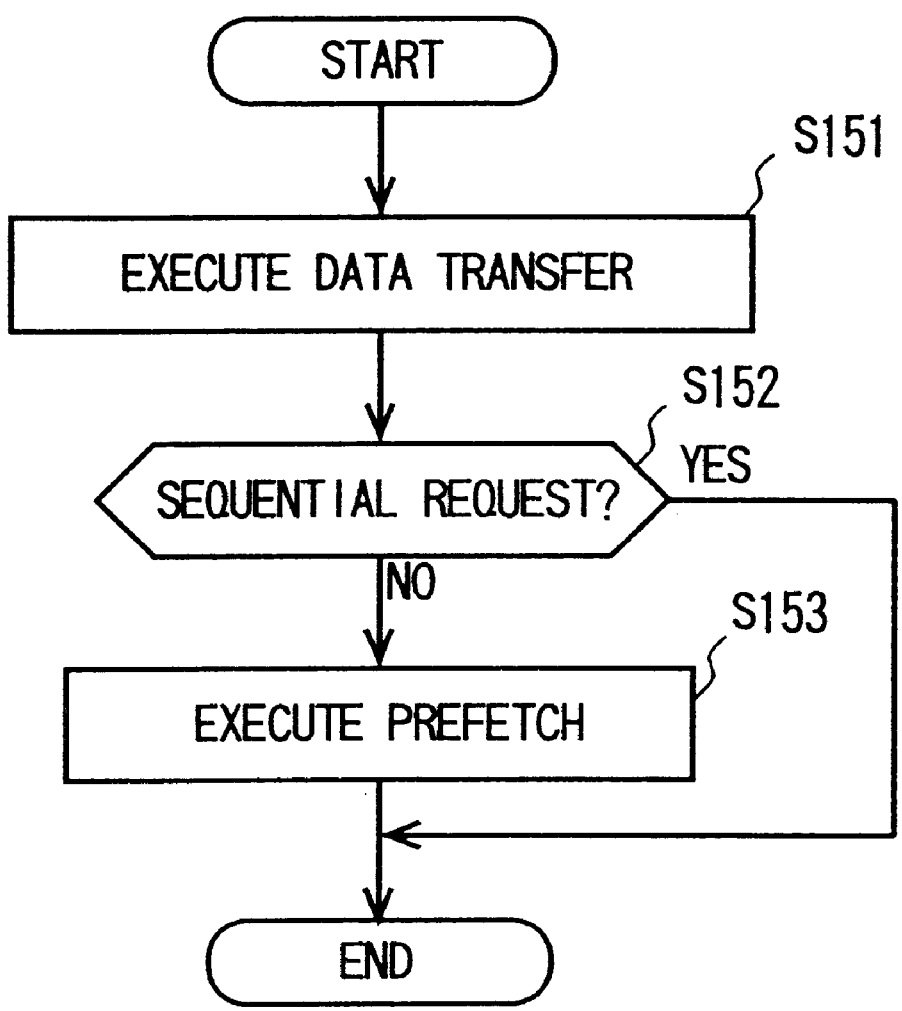
FIG. 23 is a flowchart for explaining the prefetch operation of a storage apparatus according to the fifth embodiment.

The selection procedure in the prefetch operation by the disk apparatus 31 will be explained with reference to FIG. 23. FIG. 23 is a flowchart showing the prefetch operation in the disk apparatus 31.

First, step S151 executes the operation of prereading the data corresponding to the random preread command or the sequential preread command in a procedure similar to that of the first embodiment described above Step S152 determines the advisability of the prefetch operation based on the parameters notified from the video processing apparatus 32. In the case where the prefetch operation is permitted in step S152, the prefetch operation is executed in step S153. In the case where the prefetch operation is not permitted, in contrast, the process is terminated immediately. Especially in the case of game play of video data by the video processing apparatus 32, a plurality of data stored on the disk 1 are often reproduced sequentially. In such a case, the prefetch operation often degrades the response to each command.

In the case where a random preread command is issued after the prefetch operation, on the other hand, the first process executed is to check whether or not the corresponding prefetched data is the buffer RAM 3 or not. If the data has been prefetched, the possibility of reading the data is transmitted to the video processing apparatus 32.

As described above, the disk apparatus according to the fifth embodiment can switch the size of data recorded continuously in the disk or the number of commands continuously read, in accordance with the command type. For this reason, the disk apparatus according to the fifth embodiment can improve the processing performance of the image data while at the same time making it possible to use the buffer memory efficiently.

Also, the disk apparatus according to the fifth embodiment can select the prefetch operation according to the command type, and therefore can use the buffer memory efficiently. Further, the disk apparatus according to the fifth embodiment can improve the response to a random data I/O request, can prevent the delayed response due to the unrequired prefetch operation in response to a sequential data I/O request, and thus can improve the processing efficiency of the disk apparatus as a whole.

Embodiment 6

Explanation will be made below about a disk apparatus according to a sixth embodiment of the present invention. The video processing apparatus according to the sixth embodiment has a configuration substantially similar to that of the video processing apparatus shown in FIG. 12, and the disk apparatus is also substantially similar in configuration to the disk apparatus shown in FIG. 1. The sixth embodiment is different from other embodiments in that the video processing apparatus issues a sequential write command with a time limit and a sequential preread command with a time limit (both commands are hereinafter referred to collectively as the sequential data I/O request) and in that the disk apparatus performs the processing corresponding to each of these commands.

The random write command and the random preread command (hereinafter referred to collectively as the random data I/O request), on the other hand, are normal I/O commands free of a time limit.

Figure 24:
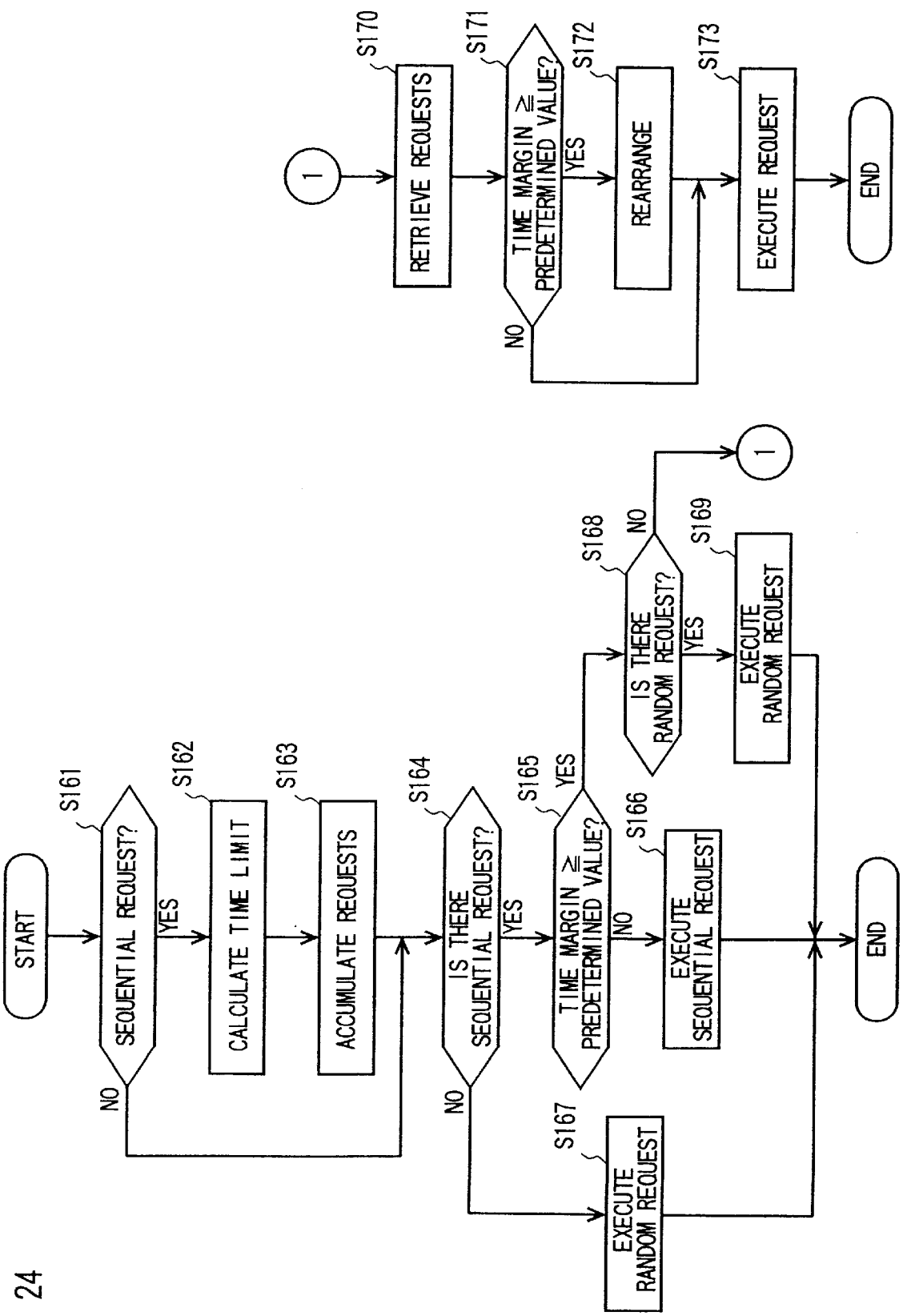
FIG. 24 is a flowchart for explaining the recording and reproducing operation of a storage apparatus according to a sixth embodiment.

The operation of the disk apparatus 31 in response to the above-mentioned commands sill be explained with reference to FIG. 24. FIG. 24 is a flowchart showing the operation of processing the commands supplied from the video processing apparatus 32 in the disk apparatus 31.

First, step S161 identifies the command type. In the case where the command represents a sequential data I/O request in step S161, the process proceeds to step S162, while in the case where the command is a random data I/O request, on the other hand, the process proceeds to step S164.

In step S162, the time limit transmitted from the video processing apparatus 32 is extended in accordance with the available capacity of the buffer RAM 3. The extension time can be appropriately selected in accordance with the data amount of the data block corresponding to the sequential data I/O request or in accordance with the sequential data I/O request.

In step S163, the command is accumulated on a request accumulation queue shown in FIG. 25. FIG. 25 is a diagram for explaining the sequential request accumulation queue (a) and a random request accumulation queue (b). Columns C1 and D1 represent storage areas at the recording positions (LBA) on the disk 1, and the columns C2 and D2 represent the storage areas of the data amount. The column C3 stores time margins based on the time limit calculated in step S162. This time margin is calculated as a remaining time usable for the processing. In the sequential data I/O request accumulation queue, commands are arranged in an ascending order of time margin from the first row (No. 1). In the random data I/O request accumulation queue, on the other hand, commands are arranged in the order of issue.

In step S164, it is determined whether requests have been accumulated in the sequential data I/O requests accumulation queue. In the case where requests have been accumulated, the process proceeds to step S165. In the case where requests are not accumulated, step S167 executes the request on the first row of the random data I/O request accumulation queue.

In step S165, the first request in the sequential data I/O request accumulation queue is selected and it is determined whether the time margin is larger than a command select reference time. In the case where the time margin is greater than or equal to a predetermined value, the process proceeds to step S168, while in the case where the time margin is smaller than a predetermined value, step S166 executes the request on the first row of the sequential data I/O request accumulation queue. The command select reference time can be set appropriately on the basis of the time predicted in advance as a time required for processing a sequential data I/O request.

In step S168, it is determined whether commands have been accumulated in the random data I/O request accumulation queue. In the case where commands are not so accumulated, the process proceeds to step S170. In the case where commands have been accumulated, step S169 executes the processing corresponding to the first-row command of the random data I/O request accumulation queue.

In step S170, the command on the first row of the sequential data I/O request accumulation queue is selected as a command to be executed. While the head is moving from the present position to a physical position corresponding to the command to be executed, a command that can be recorded and reproduced is retrieved, and the retrieved command is interpreted as a command to be selected. In step S171, the scheduled execution time is compared with the time margin of the command to be executed on the assumption that a command to be selected is processed before a commands to be executed, and determination is made as to whether the command to be executed can be completely processed within the time margin. In the case where the command to be executed can be processed, step S172 inserts the command to be selected on the first row of the sequential data I/O request accumulation queue, followed by execution of step S173. In the case where the command to be executed is impossible to process in step S171, the process immediately proceeds to step S173.

Step S173 executes the process in response to the request accumulated on the first row of the accumulation queue.

As described above, in the disk apparatus according to the sixth embodiment, the order of storage process is selected in accordance with the time limit and the available capacity of the buffer RAM 3. As a result, the disk apparatus according to the sixth embodiment can increase the speed of a response to a random data I/O request while at the same time guaranteeing a real-time response to a high-priority sequential data I/O request, thereby improving the processing efficiency of the disk apparatus. Thus, it is possible to solve the problem of a considerably delayed response to random data I/O requests.

Also, in the disk apparatus according to the sixth embodiment, the order of processing a request is selected in accordance with the time limit and the physical address on the disk. Therefore, the real-time response to a request is guaranteed and the time required for head seek operation is reduced. Thus the processing efficiency of the disk apparatus is improved. Further, according to the sixth embodiment, the order of processing accumulated requests is determined based on the physical address, and therefore it is possible to predict and manage the execution time of each request accurately.

Embodiment 7

Now, a disk apparatus according to a seventh embodiment of the present invention will be described.

Figure 26:
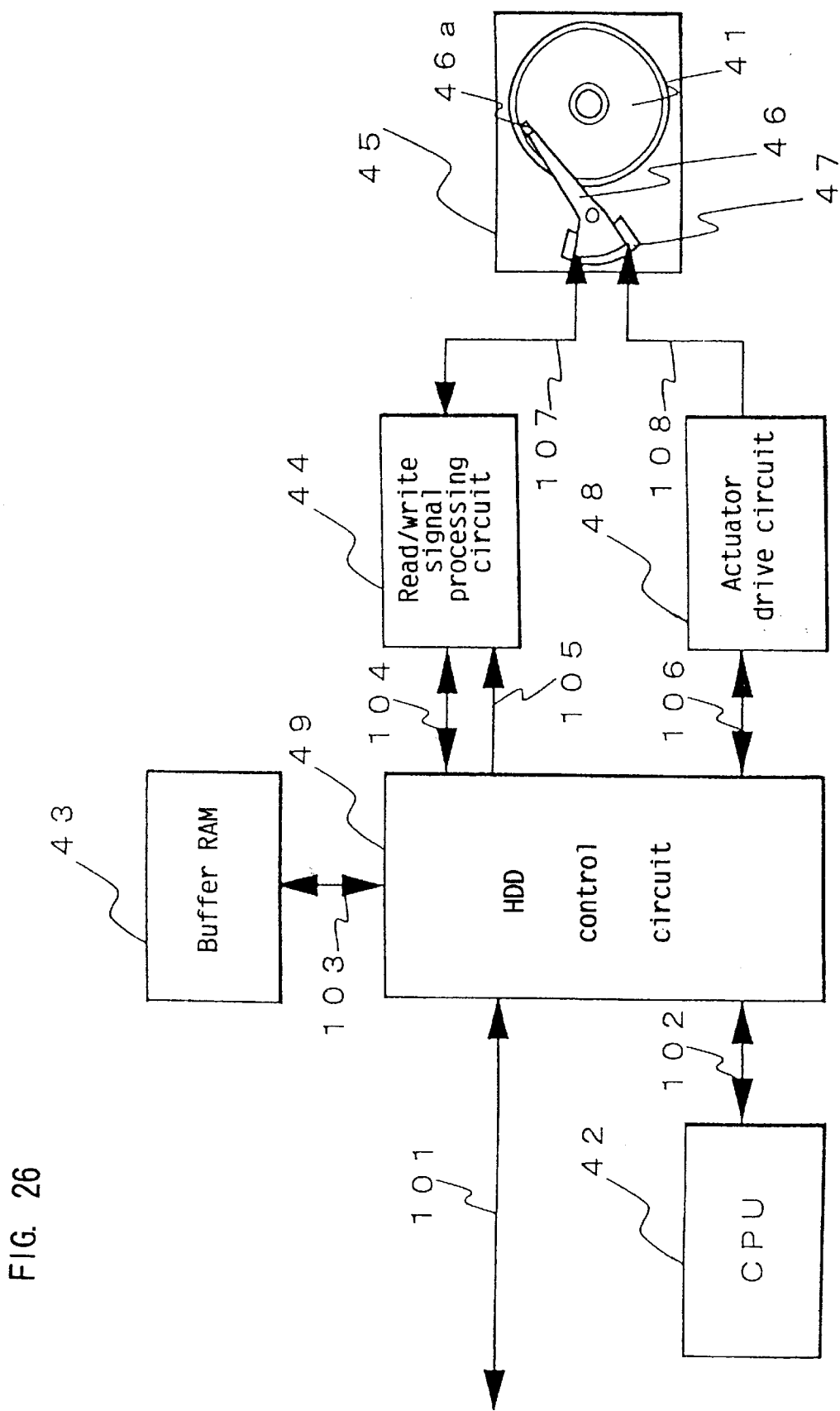
FIG. 26 is a block diagram showing a configuration of a disk apparatus according to a seventh embodiment of the invention.

FIG. 26 is a block diagram showing a configuration of a disk apparatus according to the seventh embodiment.

As shown in FIG. 26, the disk apparatus according to the seventh embodiment is connected to an external system (not shown) such as a host computer through a host I/O bus 101. The disk apparatus according to the seventh embodiment comprises a CPU 42 for controlling each circuit, a buffer RAM 43 constituting a memory circuit for storing data temporarily, a read/write signal processing circuit 44 for encoding and decoding the data, a head-disk assembly 45, an actuator drive circuit 48 and a HDD control circuit 49.

The head-disk assembly 45 includes a disk 41, a head assembly 46 and an actuator 47. The actuator 47 is driven by the actuator drive circuit 48. The CPU 42 controls the buffer RAM 43, the read/write signal processing circuit 44 and the actuator drive circuit 48 through the HDD control circuit 49.

Figure 27:
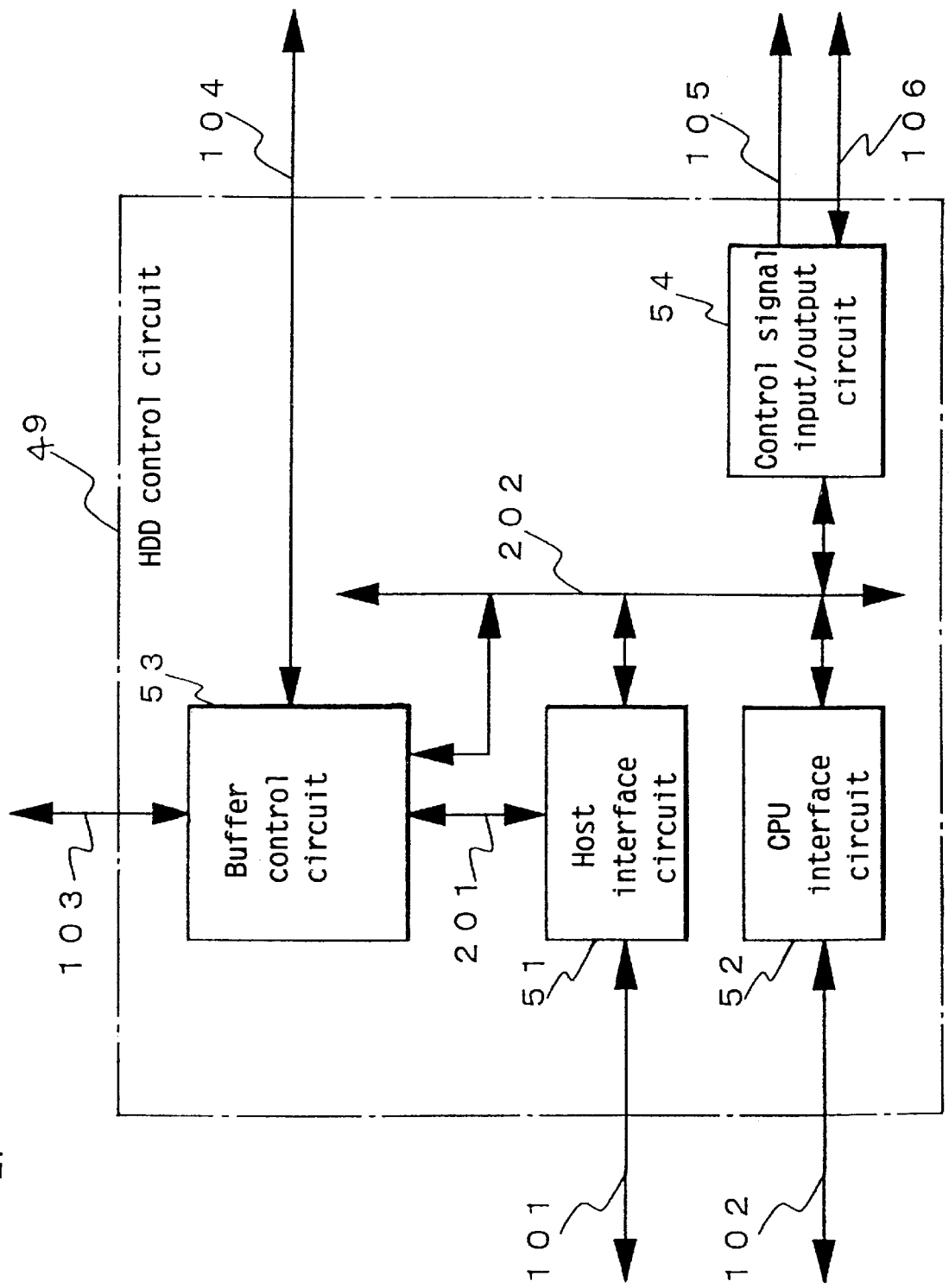
FIG. 27 is a block diagram showing a configuration of a HDD control circuit according to the seventh embodiment.

FIG. 27 is a block diagram showing a configuration of the HDD control circuit 49.

As shown in FIG. 27, the HDD control circuit 49 includes a host interface circuit 51 constituting an interface circuit with the external system, a CPU interface circuit 52 making up an interface circuit with the CPU 42, a buffer control circuit 53 for controlling the buffer RAM 43, and a control signal I/O circuit 54 for applying or supplied with a control signal to or from the read/write signal processing circuit 44 and the actuator drive signal 48 of the disk apparatus.

Figure 28:
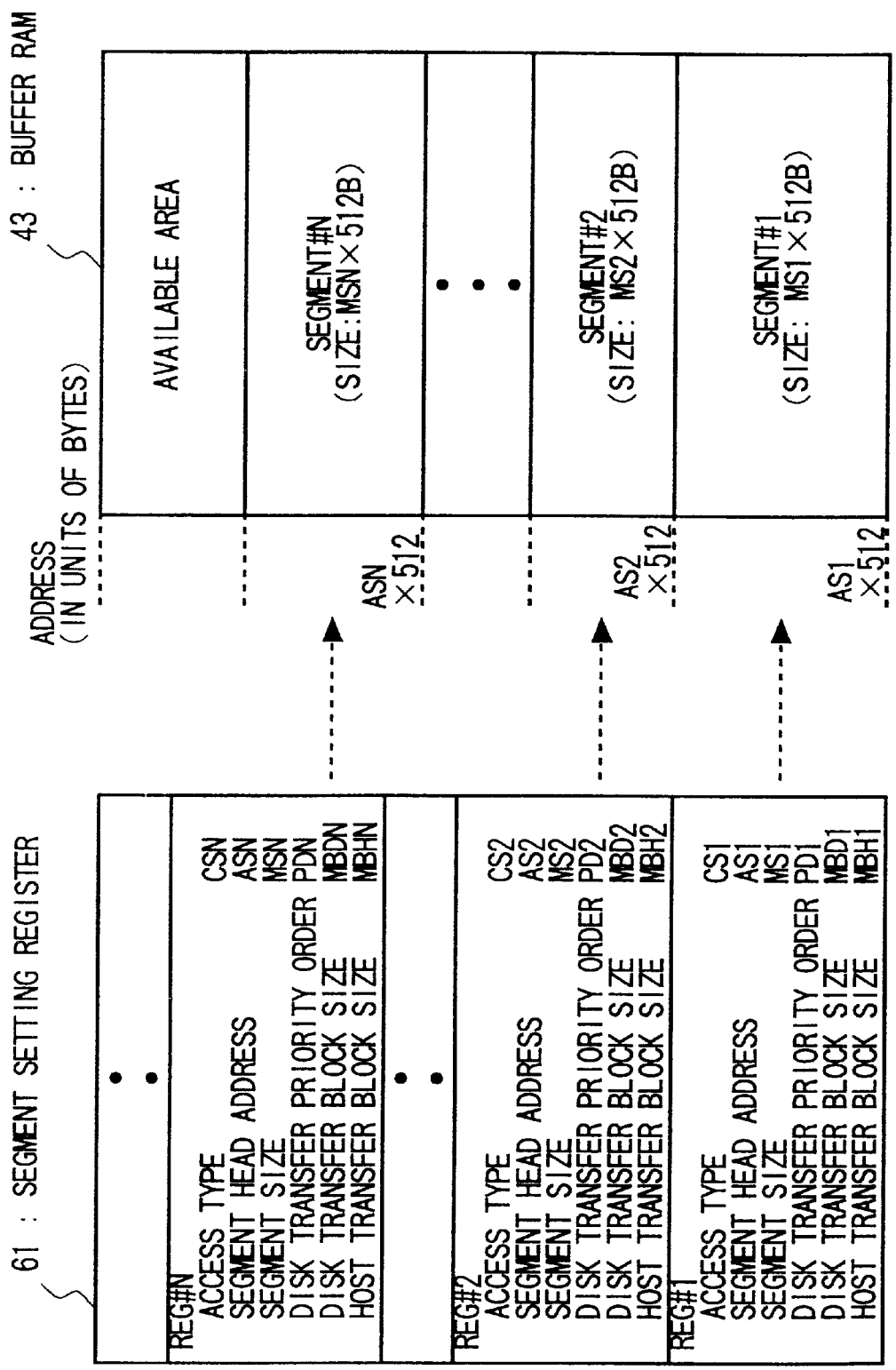
FIG. 28 is a diagram showing the correspondence between the segment setting register of a buffer control circuit and each segment of a buffer RAM.

FIG. 28 is a diagram showing the correspondence between the segment setting register 61 in the buffer control circuit 53 and each segment of the buffer RAM 43 of the disk apparatus.

As shown in FIG. 28, the buffer RAM 43 is divided into N segments #1 to #N. Each segment of the buffer RAM 43 corresponds to the registers REG#1 to REG#N of the segment setting register 61. Each of the registers REG#1 to REG#N has set therein values including an access type CSN, a segment start address ASN, a segment size MSN, a disk transfer priority order PDN, a disk transfer block size MBD and a host transfer block size MBN. The number N of segments is the total number of the segments and is invariable.

The access type CSN is the number for setting the access type to the associated segment from the external system and is divided into three different types including: (1) write-only, (2) read-only and (3) read-write. The segment start address ASN is the start address of a given segment in the buffer RAM 43, and the segment size MSN is the size of a given segment. Both ASN and MSN are expressed in terms of sectors. One sector represents 512 bytes.

The disk transfer priority order PDN, the disk transfer block size MBDN and the host transfer block size MBHN are values for setting the conditions for starting/stopping the host transfer between the external system and each segment and the disk transfer between the segments and the disk, respectively.

The disk transfer priority order PDN indicates the order of priority in which data are transferred between each segment and the disk. PDN is set in values of 1 to N. The disk transfer block size MBDN gives a unit of data transfer, by sector, between each segment and the disk. The host transfer block size MBHN represents a unit of data transfer, in terms of sectors, between each segment and the host.

Now, the operation of each part of the disk apparatus will be explained with reference to FIGS. 26, 27 and 28.

The host interface circuit 51 of the HDD control circuit 49 is supplied with data, commands and parameters from an external system through the host I/O bus 101. In the host interface circuit 51, data are output to the buffer control circuit 53 through an internal bus 201, and commands and parameters are applied to the internal bus 202. The host interface circuit 51 is supplied with the data read from the buffer RAM 43 through the buffer control circuit 53 and the internal bus 201. A command response from the CPU 42 is applied to the host interface circuit 51 through the CPU interface circuit 52 and the internal bus 202. The read data and the responses to commands are output to the external system through the host I/O bus 101.

The buffer control circuit 53 is connected to the buffer RAM 43 through the RAM I/O bus 103, and controls the data input and output to and from the buffer RAM 43 in accordance to each value set in the segment setting register 61. The data input to and output from the buffer RAM 43 include those input to and output from the external system through the host interface circuit 51, those input to and output from the CPU 42 through the CPU interface circuit 52, and those input to and output from the read/write signal processing circuit 44 through the read/write I/O bus 104. The segment setting register 61 of the buffer control circuit 53 is set by the CPU 42.

The read/write signal processing circuit 44 (FIG. 26) receives and encodes the write data from the buffer RAM 43 through the buffer control circuit 53 of the HDD control circuit 49. The write data thus encoded is output to a head 46a as a write signal through a signal line 107. Also, the read/write signal processing circuit 44 receives and decodes the read signal read out by the head 46a from the disk 41 through the signal line 107. The read signal thus decoded is applied to the buffer RAM 43 as a read data through the buffer control circuit 53.

The actuator drive circuit 48 outputs a drive signal 108 to the actuator 47 on the basis of an actuator control signal 106 from the control signal I/O circuit 54 of the HDD control circuit 49. This drive signal drives the actuator 47 so that the head 46a is moved through the head assembly 46.

The CPU 42 receives commands and parameters from the external system through the host interface circuit 51 of the HDD control circuit 49 and the CPU interface circuit 52. The CPU 42 interprets the commands, controls the buffer control circuit 53, the read/write signal processing circuit 44 and the actuator drive circuit 48, and thus executes the data read/write operation. Also, the CPU 42 provides a response to a command, if required, to the external system through the CPU interface circuit 52 and the host interface circuit 51.

The command processing in the disk apparatus configured as described above will be explained below with reference to the drawings.

[Segment Setting Command]

Parameters for the segment setting command include the segment number, the access type, the segment size, the disk transfer priority order, the disk transfer block size and the host transfer block size. The segment number is an identification number of each segment and is given as K where K=1 to N. The access type, the segment size, the disk transfer priority order, the disk transfer block size and the host transfer block size, respectively, correspond to each set value of the segment setting register.

Figure 29:
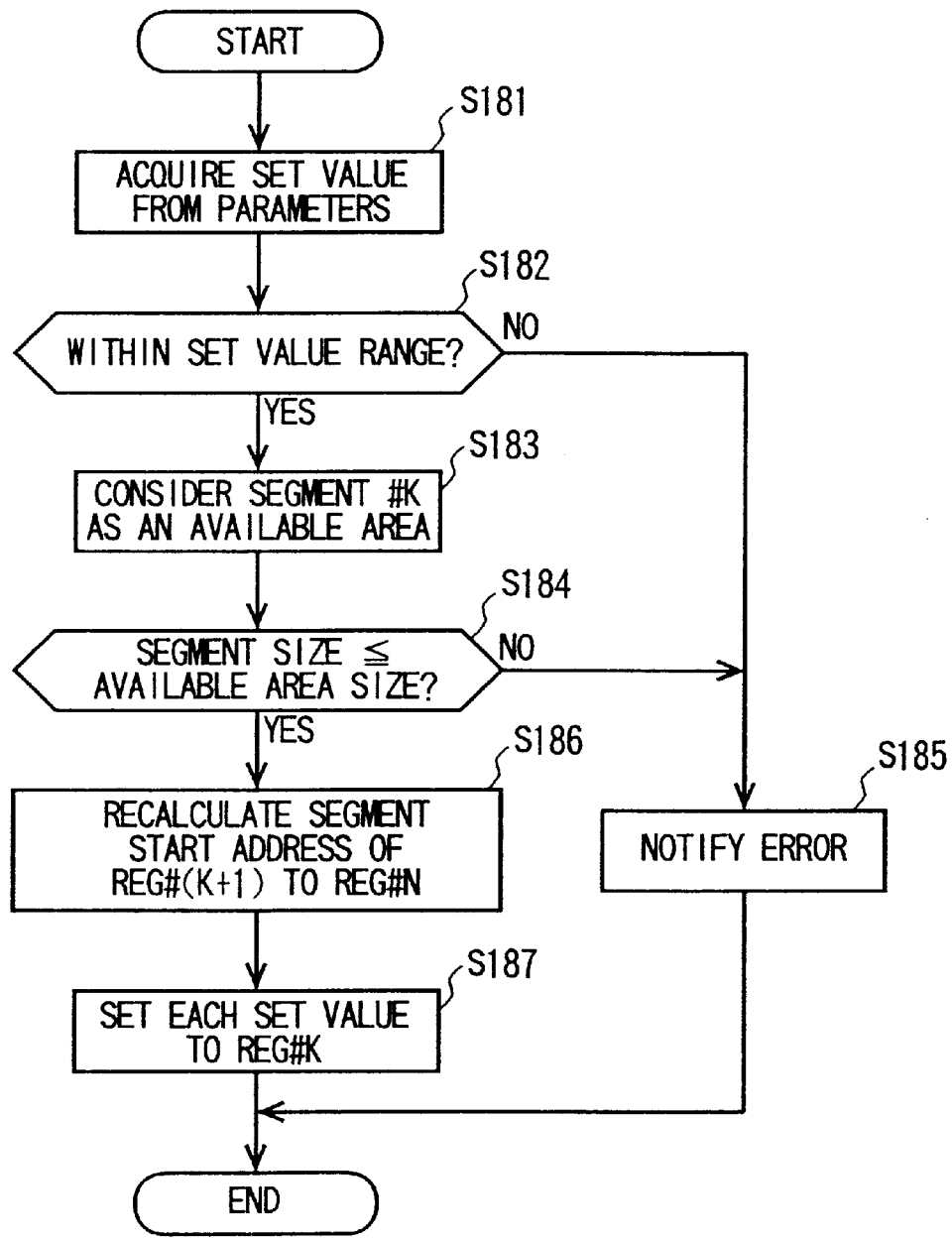
FIG. 29 is a flowchart showing the operation of processing a segment setting command in the disk apparatus according to the seventh embodiment.

FIG. 29 is a flowchart showing the processing of the segment setting command by the disk apparatus according to the seventh embodiment.

As shown in FIG. 29, upon application of a segment setting command from the external system thereto, the CPU 42 (FIG. 26) acquires each set value from the parameters of the applied segment setting command (step S181), and checks whether the acquired set value is included in a predetermined range (step S182). In the case where the set value is out of the predetermined range, an error is notified to the external system (step S185).

In the case where a set value is within the predetermined range, the CPU 42 considers the segment #K as an available area(step S183), and compares the secure segment size with the summed size of available areas not assigned as a segment (step S184). In the case where the segment is larger than the available area in size, an error message is transmitted to the external system (step S185). In the case where the segment is smaller than the available area in size, on the other hand, the segment start address of REG#(K+1) to REG#N is recalculated and set in each register (step S186), and each value is set in REG#K (step S187).

FIG. 30 diagrams an example of changing the segment setting according to a segment setting command. The example shown in FIG. 30 concerns the case in which the size of the buffer RAM 43 is set to 128 kB (kB: 1024 bytes), the total number N of segments is set to 4 and the size of the segment #3 is changed from 16 kB to 32 kB. FIG. 30 shows the state before command execution, and FIG. 30 shows the state after command execution.

When the segment #3 is considered as an available area, the total size of the available areas is 48 kB. Since the total size of the available areas is not less than 32 kB that is the segment size to be set, the segment start address of the segment #4 is recalculated, and the start address 4000 H is changed to 5000 H thus ending the setting.

[Segment State Request Command]

Upon application of a segment state request command to the CPU 42 from the external system, the CPU 42 checks the segment setting registers REG#1 to REG#N sequentially, and outputs the set value of each register and the size of an available area not assigned as a segment to the external system.

[Write Command]

Parameters for the write command include the identification number, the disk start address and the write size. The identification number corresponds to the segment number set by the segment setting command. In the case under consideration, the identification number is assumed to be M where M=1 to N. The disk start address corresponds to the write start address on the disk, and the write size corresponds to the size of the data written, each being set in terms of sectors.

Upon application of a write command to the CPU 42 from the external system, the CPU 42 acquires the identification number M from the parameters of the input command, and reads the value set in the segment setting register REG#M.

Then, the CPU 42 controls the host interface circuit 51 and the buffer control circuit 53 thereby executing the processing of the host transfer in which data are transferred from the external system to the segment #M. Concurrently with the host transfer processing, the CPU 42 controls the buffer control circuit 53, the read/write signal processing circuit 44 and the actuator drive circuit 48 thereby to execute the disk transfer processing in which data are transferred from the segment #M to the disk 41.

Figure 31:
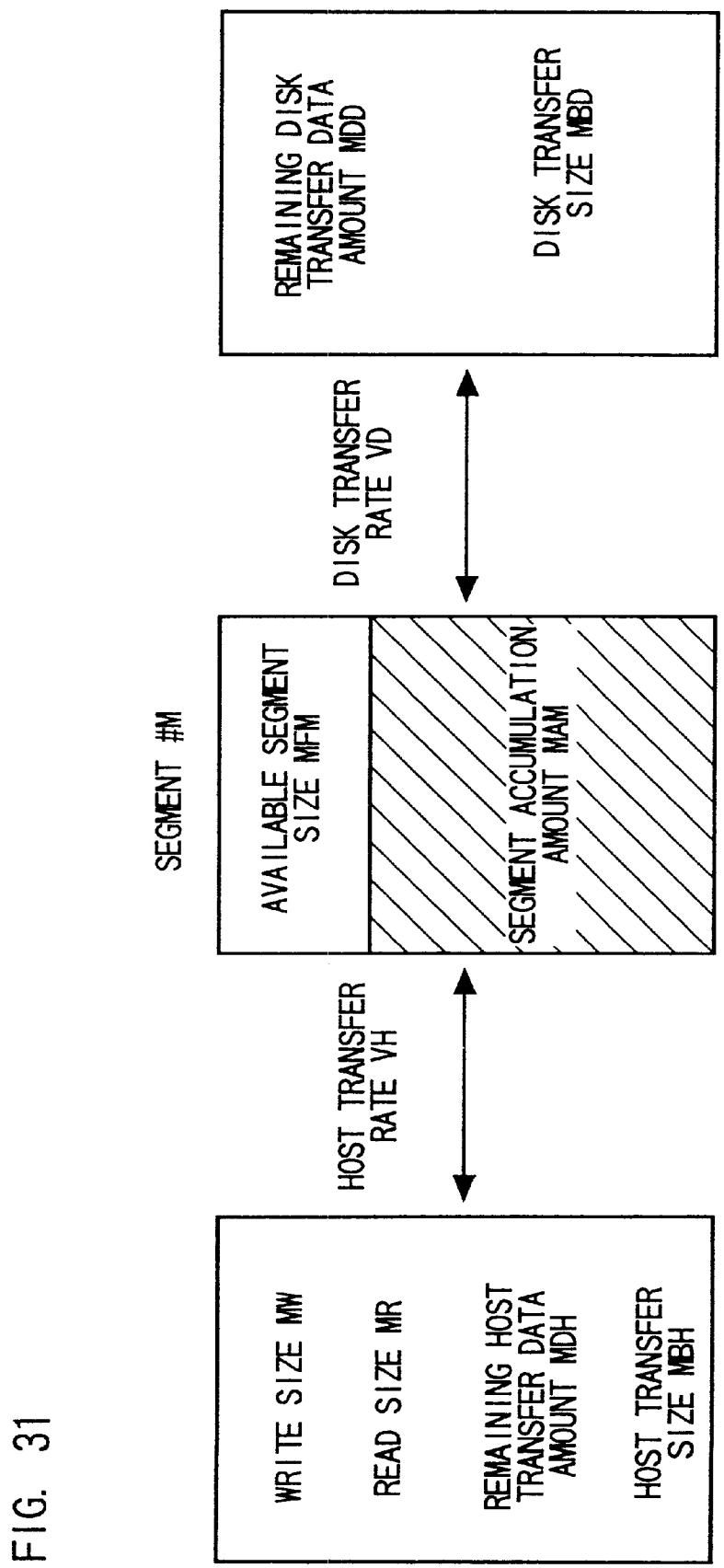
FIG. 31 is a diagram showing various parameters associated with the segment accumulation, the host transfer (meaning data transfer to or from the host) and the disk transfer (meaning data transfer to or from the disk) according to the seventh embodiment.

FIG. 31 is a diagram showing parameters associated with the accumulation of the segment #M, the host transfer and the disk transfer. The parameters for the segment #M, the host transfer processing and the disk transfer processing are defined as follows.

Specifically, the segment size is defined as MSM, the segment accumulation amount as MAM, the available segment size as MFM, the write size as MW, the read size as MR, the remaining host transfer data amount as MDH and the remaining disk transfer data amount as MDD (in units of bytes). Also, the disk transfer rate is defined as VD (in units of MB/s).

Now, the process of a host transfer for processing the write command will be explained in detail with reference to FIG. 32. The host transfer from the external system to the segment #M is executed while monitoring the available segment size MFM of the segment #M based on the host transfer block size MBHM set in REG #M.

Figure 32:
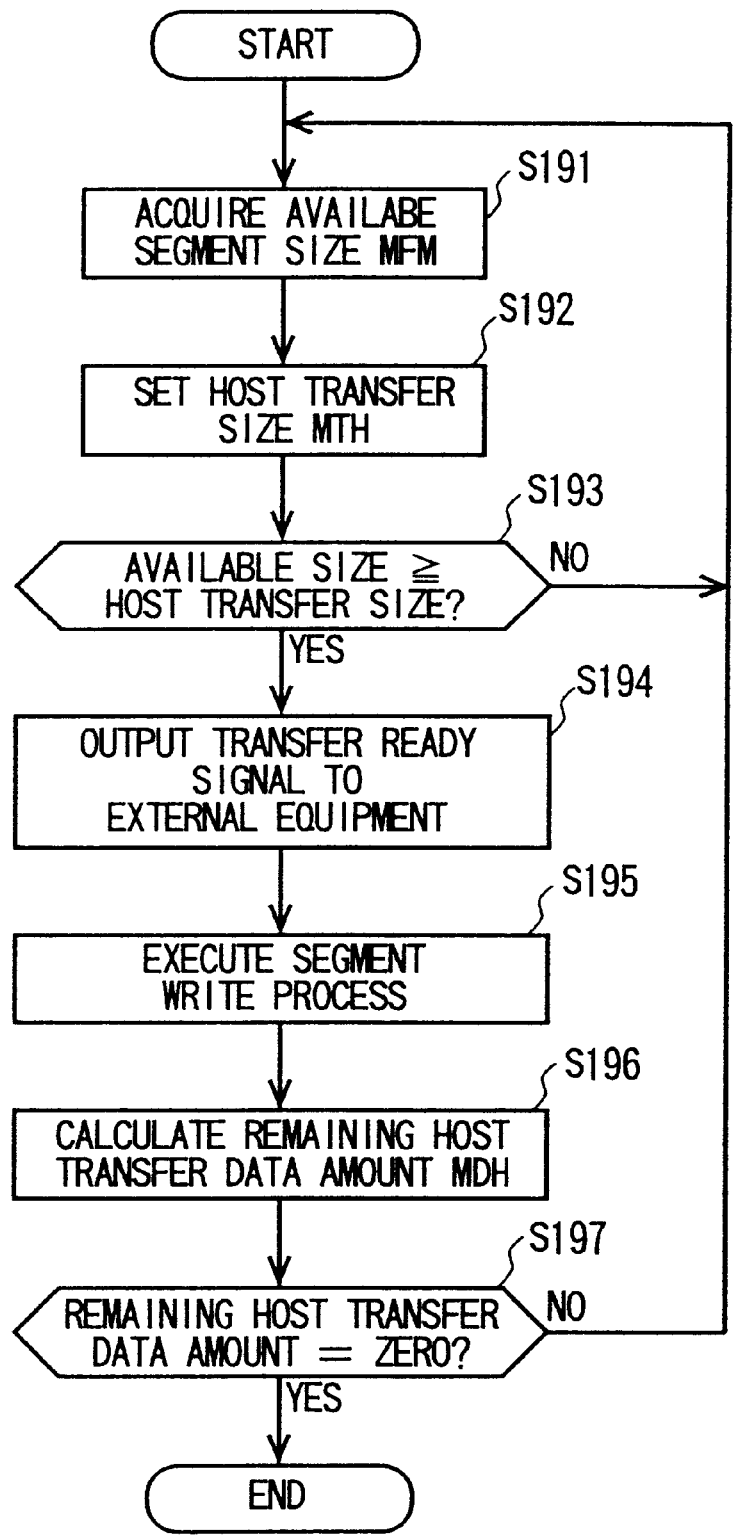
FIG. 32 is a flowchart showing the process of data transfer from an external system such as a host to a segment according to the seventh embodiment.

FIG. 32 is a flowchart showing the processing of host transfer from the external system to the segment #M. As shown in FIG. 32, with the activation of the host transfer processing, the CPU 42 acquires the available size MFM of the segment #M from the buffer control circuit 53 (step S191), and sets the host transfer size MTH (step S192). The host transfer size is the minimum value of the host transfer block size (MBHM þ 512) or the minimum value of the remaining host transfer data amount MDH.

Then, the CPU 42 compares the available segment size MFM with the host transfer size MTH (step S193), and repeats this process until the available segment size reaches or exceeds the host transfer size (S191 to S193). When the available segment size reaches or exceeds the host transfer size, a transfer ready signal is output to the external system (step S194), and the data equivalent to the host transfer size MTH input from the external system is written in the segment (step S195).

After complete process of writing in the segment, the CPU 42 calculates the remaining host transfer data amount (step S196) and checks whether the remaining host transfer data is zero or not (step S197). In the case where the remaining host transfer data amount is larger than zero, the host transfer process is repeatedly executed. In the case where the remaining host transfer data amount is zero, the host transfer process is terminated.

Figure 33:
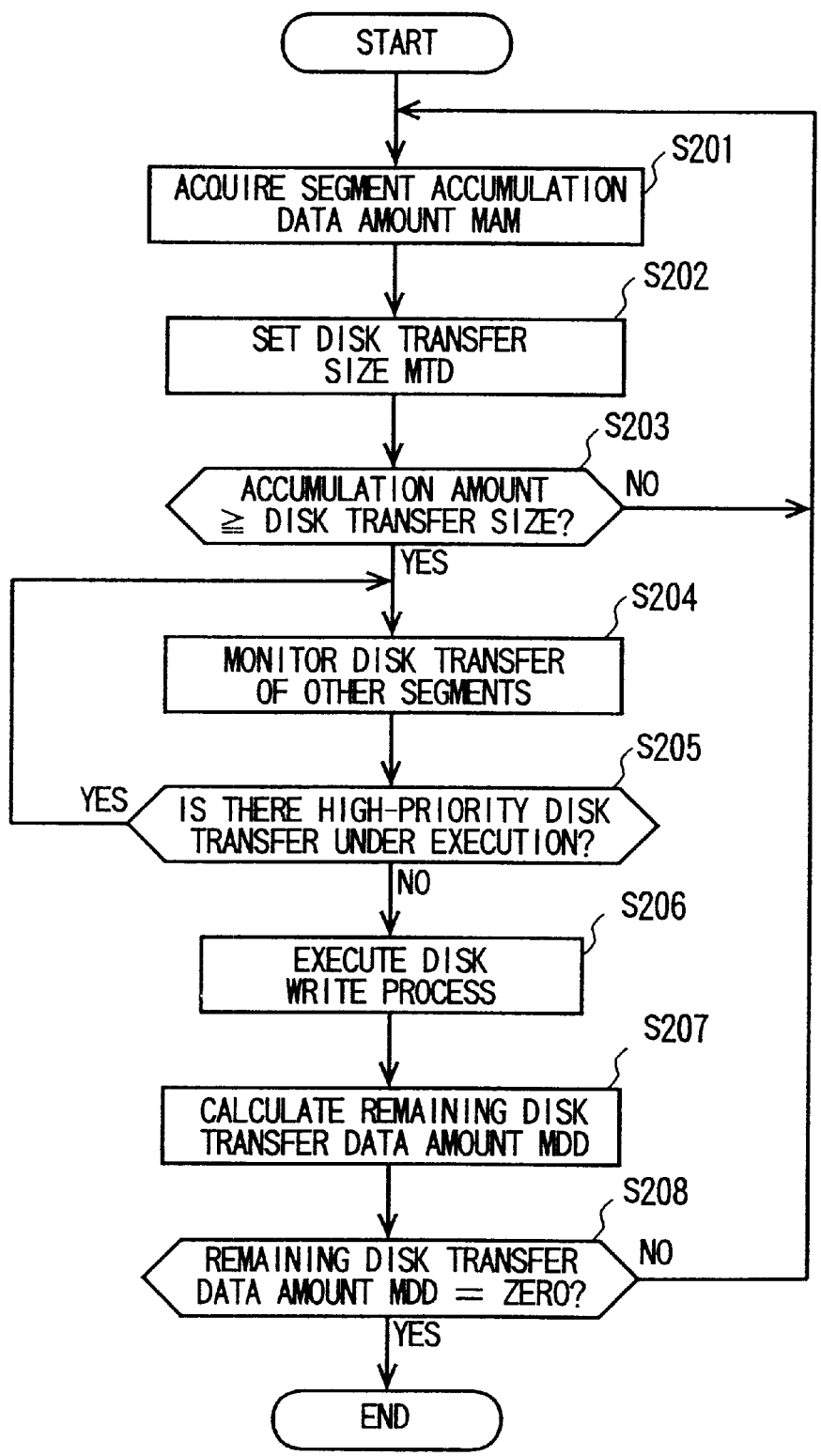
FIG. 33 is a flowchart showing the host transfer process from a segment to a disk according to the seventh embodiment.

Now, the disk transfer processing in which data are transferred from the segment #M to the disk 41 will be explained with reference to the flowchart of FIG. 33. The disk transfer in which data are transferred to the disk 41 is executed while monitoring the segment accumulation amount MAM of the segment #M and the disk transfer for other segments based on the disk transfer block size MBDM set in the REG#M and the disk transfer priority order PDM. FIG. 33 is a flowchart showing the processing of disk transfer from the segment #M to the disk 1.

As shown in FIG. 33, upon activation of the disk transfer processing, the CPU 42 acquires the segment accumulation amount MAM of the segment #M from the buffer control circuit 53 (step S201), and sets the disk transfer size MTD (step S202). The disk transfer size is the minimum value of the disk transfer block size (MBDM×512) or the minimum value of the remaining disk transfer data amount MDD.

Then, the CPU 42 compares the segment accumulation amount MAM with the disk transfer size MTD (step S203), and repeats this process until the segment accumulation amount reaches or exceeds the disk transfer size (S201 to S203). When the segment accumulation amount reaches or exceeds the disk transfer size, the CPU 42 monitors the disk transfer of other segments (step S204) and checks whether the disk transfer, higher in priority than the disk transfer of the segment #M, is under execution (step S205). When such a disk transfer is under execution, the above-mentioned process is repeated until the disk transfer higher in priority order is complete (S204 to S205). When no disk transfer higher in priority order is under execution, on the other hand, the processing for writing the data equivalent to the disk transfer size into the disk 41 is executed (step S206).

After complete process of writing in the disk, the CPU 42 calculates the remaining disk transfer data amount MDD (step S207), and checks whether the remaining disk transfer data amount is zero or not (step S208). When the remaining disk transfer data amount is larger than zero, the disk transfer processing is executed repeatedly (S201 to S208). When the remaining disk transfer data amount is zero, the disk transfer processing is complete.

[Read Command]

Parameters for the read command include the identification number, the disk start address and the read size.

Upon application of a read command from the external system to the CPU 42, the CPU 42 acquires the identification number L from the parameters of the input command and reads each parameter set in the segment setting register REG#L.

Then, the CPU 42 controls the buffer control circuit 53, the read/write signal processing circuit 44 and the actuator drive circuit 48. Thus, the processing of a disk transfer is executed from the disk 41 to the segment #L. Concurrently with the disk transfer processing, the CPU 42 executes the processing of the host transfer from the segment #L to the external system by controlling the host interface circuit 51 and the buffer control circuit 53.

The processing of a disk transfer from the disk 41 to the segment #L is executed while monitoring the available segment size MFL of the segment #L and the disk transfer of other segments based on the disk transfer block size MBDL set in the REG #L and the disk transfer priority order PDL.

Figure 34:
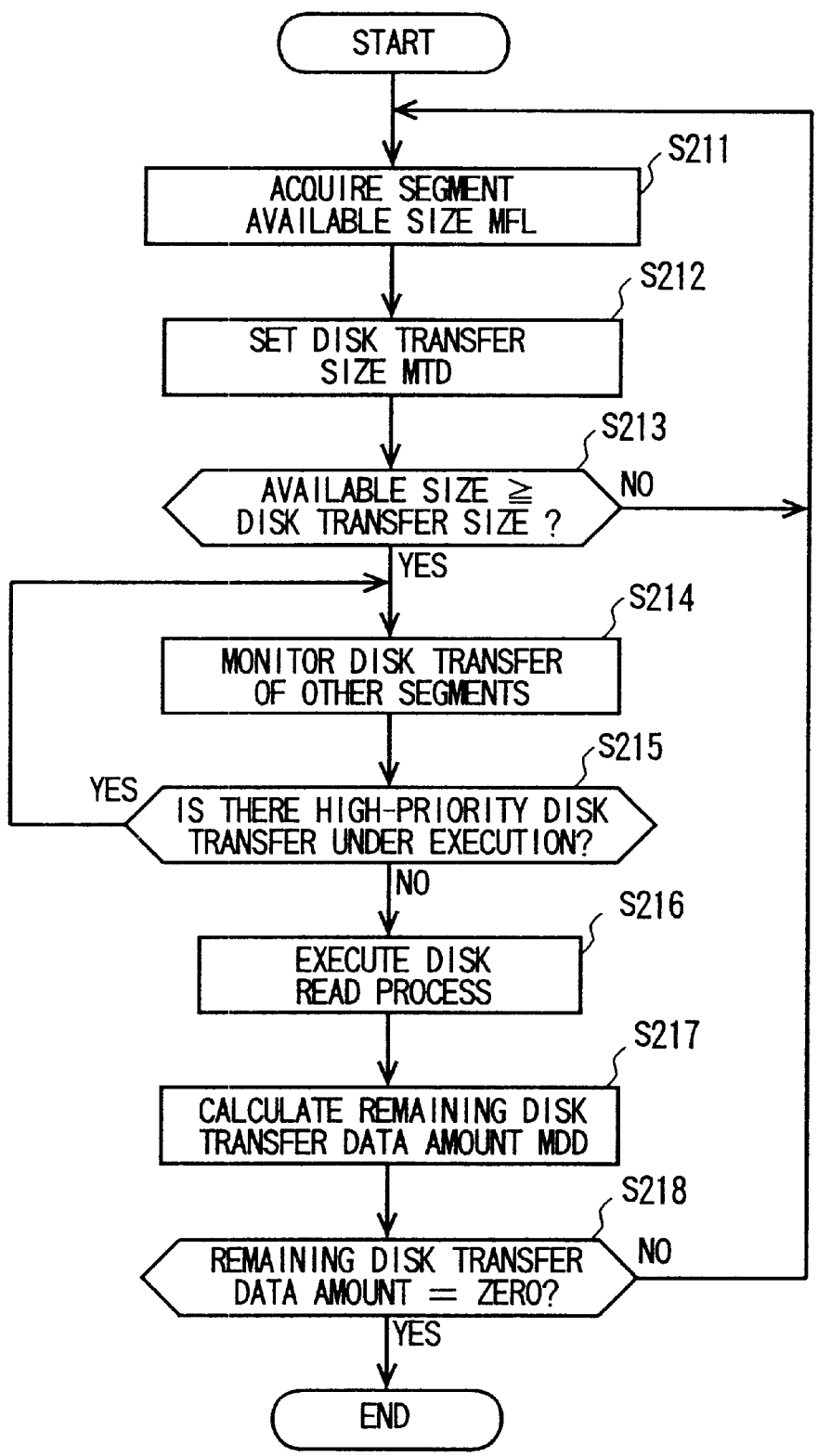
FIG. 34 is a flowchart showing the host transfer process from a disk to another segment according to the seventh embodiment.

FIG. 34 is a flowchart showing the processing of the disk transfer from the disk 41 to the segment #L.

As shown in FIG. 34, upon activation of the disk transfer processing, the CPU 42 acquires the available segment size MFL of the segment #L from the buffer control circuit 53 (step S211), and sets the disk transfer size MTD (step S212). The disk transfer size is the minimum value of the disk transfer block size (MBDM=512) or the minimum value of the remaining disk transfer data amount MDD.

Then, the CPU 42 compares the available segment size MFL with the disk transfer size MTD (step S213), and repeats this process until the available segment size reaches or exceeds the disk transfer size (S211 to S23). When the available segment size reaches or exceeds the disk transfer size, the CPU 42 monitors the disk transfer of other segments (step S214) and checks whether a disk transfer higher in priority order than the disk transfer of the segment #L is under execution (step S215). If such a disk transfer is under execution, the above-mentioned process is repeated until the disk transfer higher in priority order is complete (steps S214 to S215). In the case where no disk transfer higher in priority order is under execution, on the other hand, the processing is executed for reading the data equivalent to the disk transfer size from the disk 41 (step S216).

Upon complete processing for reading the disk, the CPU 42 calculates the remaining disk transfer data amount (step S217), and checks whether the remaining disk transfer amount is zero or not (step S218). In the case where the remaining disk transfer amount is larger than zero, the disk transfer processing is repeatedly executed (steps S211 to S218). In the case where the remaining disk transfer data amount is zero, in contrast, the disk transfer processing is completed.

Figure 35:
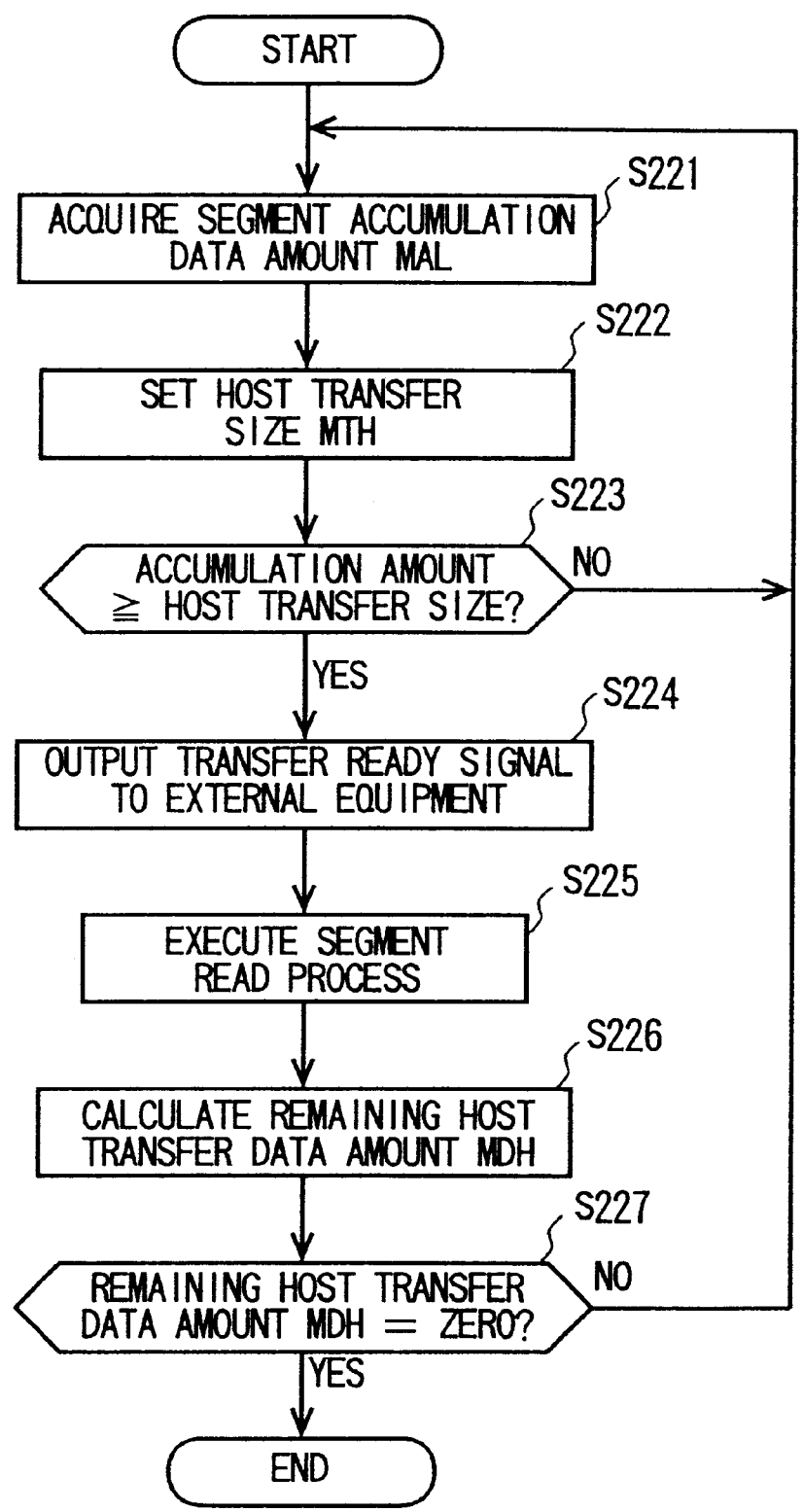
FIG. 35 is a flowchart showing the host transfer process from a segment to an external system according to the seventh embodiment.

Next, the processing of host transfer from the segment #L to the external system will be explained with reference to FIG. 35. FIG. 35 is a flowchart showing the processing of host transfer from the segment #L to the external system.

The processing of the host transfer from the segment #L to the external system is executed while monitoring the segment accumulation amount of the segment #L based on the host transfer block size MBHL set in the register REG#L.

As shown in FIG. 35, upon activation of the host transfer processing, the CPU 42 acquires the segment accumulation amount MAL of the segment #L from the buffer control circuit 53 (step S221) and sets the host transfer size MTH (step S222). The host transfer size is the minimum value of the host transfer block size (MBHMþ512) or the minimum value of the remaining host transfer data amount MDH.

Then, the CPU 42 compares the segment accumulation amount MAL with the host transfer size MTH (step S223), and repeats this process until the segment accumulation amount reaches or exceeds the host transfer size (S221 to S223). When the segment accumulation amount reaches or exceeds the host transfer size, the CPU 42 outputs a transfer ready signal to the external system (step S224), and the processing is executed for reading from the segment the data equivalent to the host transfer size MTH input from the external system (step S225).

After complete segment read processing, the CPU 42 calculates the remaining host transfer data amount (step S226), and checks whether the remaining host transfer data amount is zero or not (step S227). When the remaining host transfer data amount is larger than zero, the CPU 42 repeatedly executes the host transfer processing. When the remaining host data amount is zero, on the other hand, the host transfer processing is terminated.

As described above, according to the seventh embodiment, the external system can set the segment size, the transfer block size and the conditions for starting or stopping the transfer in the order of priority of the disk transfer size corresponding to each channel of multi-channel data into the disk apparatus by use of the segment setting command and the segment state request command in advance of the recording/reproducing operation.

A write command or a read command carrying an identification number corresponding to each channel of multi-channel data is issued during the recording or reproduction. In this way, the disk apparatus according to the seventh embodiment can record or reproduce, each data in accordance with the segment size, the transfer block size and the disk transfer priority order thus set.

As described above, in the disk apparatus according to the seventh embodiment, the segment size, the transfer block size and the disk transfer priority order are set by segment based on the segment setting command from the external system, and the host transfer processing and the disk transfer processing are controlled by a preset control method. In this way, the memory size and the control method corresponding to each channel can be set at the time of multi-channel recording and reproduction operation.

According to the seventh embodiment, a segment is set by the segment setting command. The storage apparatus according to the present invention, however, can alternatively be configured in such a manner that the write data with the segment setting information attached thereto is transferred to the disk apparatus, and the disk apparatus detects the segment setting information contained in the write data or read data thereby to set a segment.

According to the seventh embodiment, the priority order of disk transfer, the disk transfer block size and the host transfer block size are determined as the transfer-starting conditions set for each segment. The storage apparatus according to the present invention, however, can alternatively be configured in such a manner as to control the start and stop of the disk transfer and the host transfer using or adding other parameters.

According to the seventh embodiment, each segment is set by executing the segment setting command by segment. The storage apparatus according to the present invention, however, can alternatively be configured in such a manner as to provide a segment-setting command for setting all the segments collectively.

According to the seventh embodiment, the identification information of each command is set as a parameter of each command. The storage apparatus according to the seventh embodiment, however, can alternatively be configured in such a manner as to provide a dedicated information setting command executed before issue of a write command/read command.

Embodiment 8

Now, a disk apparatus according to an eighth embodiment of the present invention will be explained. The configuration of the disk apparatus according to the eighth embodiment is substantially similar to that of the disk apparatuses shown in FIGS. 26, 27 and 28. The disk apparatus according to the eighth embodiment processes a command for setting the data transfer rate.

Explanation will be made about the operation of processing the transfer rate setting command for the disk apparatus according to the eighth embodiment.

Parameters for the transfer rate setting command includes the identification number, the access type and the transfer rate. The transfer rate, VCH, is the one guaranteed for the recording and reproduction of a corresponding channel data, and expressed in units of sectors per second.

Figure 36:
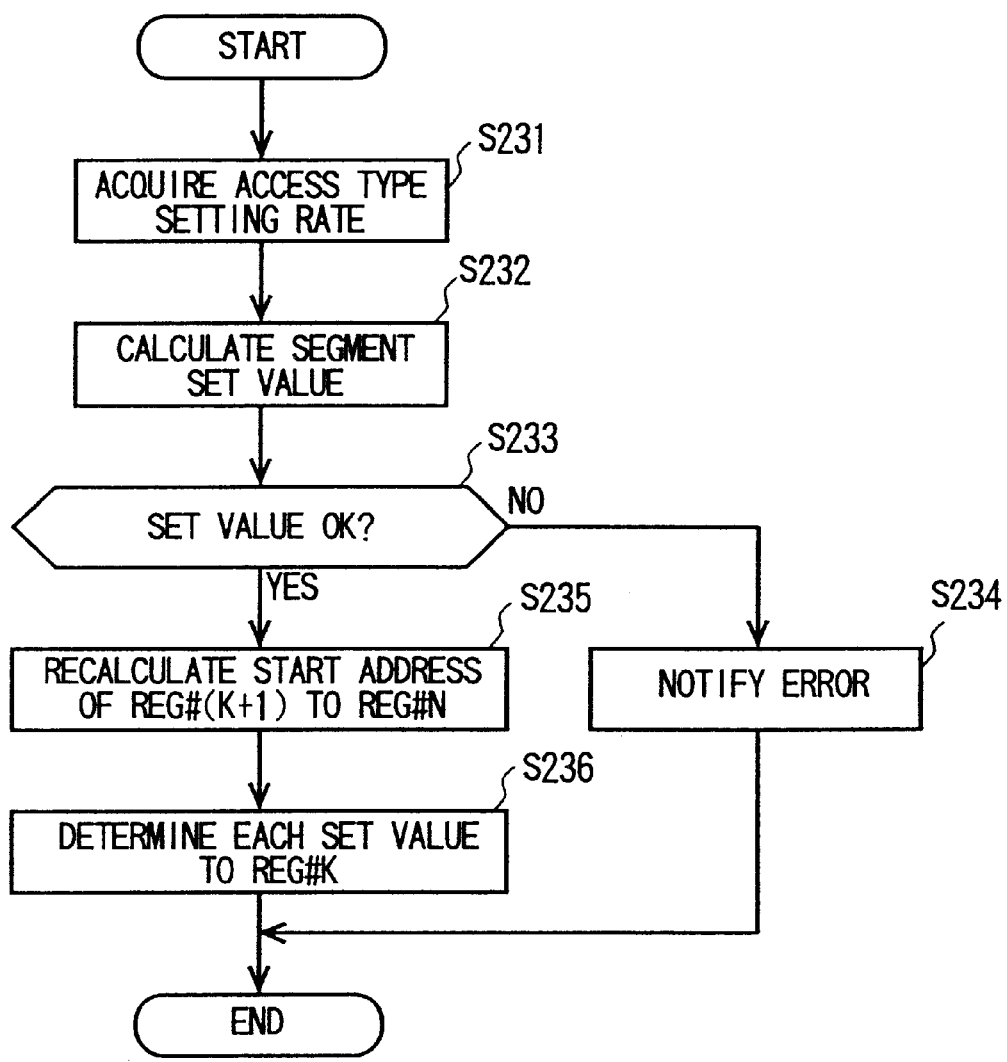
FIG. 36 is a flowchart of processing a transfer rate setting command according to an eighth embodiment.

FIG. 36 is a flowchart showing the operation of processing the transfer rate setting command according to the eighth embodiment.

As shown in FIG. 36, upon application of a transfer rate setting command from the external system to the CPU 42, the CPU 42 acquires each set value from the parameters of the input command (step S231). The values of the access type, the segment size, the disk transfer priority order, the disk transfer block size and the host transfer block size are set for each segment in the segment setting register 61 from the set access type, the transfer rate and the performance values (step S232). The set values including the available segment size are checked (step S233). In the case where a set value is incorrect, an error message is transmitted to the external system (step S234). In the case where the set value is correct, the segment start addresses of REG#(K+1) to REG#N are recalculated and set in each register (step S235), thus setting each set value in REG#K (step S236).

For the data transfer rate to be guaranteed, it is necessary to set the disk transfer block size and the segment size correctly. A setting method according to the eighth embodiment will be described below.

According to the eighth embodiment, the performance values of the access performance and the disk transfer performance of the disk apparatus are expressed by the following parameters. Specifically, the maximum seek time is defined as TFS, the maximum rotational latency time as TR (in units of ms), the channel setting rate as VCH and the disk transfer rate as VD (in sectors per second).

The maximum storage time TRW (in units of seconds) required for recording the disk transfer block size MBDK (in units of sectors) in the disk 41 or for reproducing it from the disk 41 is given as the sum of the maximum access time and the data transfer time, and expressed by equation (32) below.

$$TRW = TFS + TR + MBDK/VD \qquad (32)$$

Thus the worst value VRW (in sectors per second) of the average disk transfer rate including the access time is calculated from equation (33).

$$VRW = MBDK/(TFS + TR + MBDK/VD) \qquad (33)$$

If MBDK is set to secure the relation VCH≥VRW for a set channel transfer rate VCH, the transfer at a rate not less than the channel transfer rate VCH can be guaranteed. Thus, equation (34) is derived from equations (32) and (33).

$$MBDK \geq VCH \times (TFS + TR)/(1 - VCH/VD) \qquad (34)$$

The disk transfer block size MBDK satisfies equation (34) and is set to the minimum integral multiple of eight sectors (4 kB). Other parameters including the segment size MSK, the host transfer block size MBHK and the priority order of disk transfer are set by the setting method described below.

The segment size MSK (in units of sectors) is set to a minimum integral multiple of eight sectors (4 kB) within a range meeting the relation MSK≧2×MBDK and not exceeding the size of the available area.

The host transfer block size MBHK (in units of sectors), on the other hand, is set equal to MSK.

The priority order of disk transfer is set in the descending order of the channel transfer rate. For the same transfer rate, a higher priority is set to the segment of access type called "write".

Explanation will be made about an example of determining a segment set value specifically by the above-mentioned setting method:
VD=14000 (sectors per second), TFS=0.02 (seconds), TR=0.01 (seconds)

With the number of channels as four, the transfer rate for each channel is set in the following manner:

VCH1=1000 (sectors per second), VCH2=2000 (sectors per second), VCH3=1400 (sectors per second), and VCH4=2400 (sectors per second).

In the process, the following calculations are made by equation (34) (figures below the decimal point rounded-up):

MBD1≧1000×(0.02+0.01)/(1−1000/14000)=33

MBD2≧2000×(0.02+0.01)/(1−2000/14000)=70

MBD3≧1400×(0.02+0.01)/(1−1400/14000)=47

MBD4≧2400×(0.02+0.01)/(1−2400/14000)=87

From these equations, each parameter can be calculated. Disk transfer block size MBDK (K=1 to 4):

MBD1=40 (sectors), MBD2=72 (sectors),

MBD3=48 (sectors), MBD4=88 (sectors)

Segment size MSK (K=1 to 4):

MS1=80 (sectors), MS2=144 (sectors)

MS3=96 (sectors), MS4=176 (sectors)

Host transfer block size MBHK (K=1 to 4):

MBH1=80 (sectors), MBH2=144 (sectors)

MBH3=96 (sectors), MBH4=176 (sectors)

Disk transfer priority order PDK (K=1 to 4):

PD1=4, PD2=2, PD3=3, PD4=1

As described above, the external system sets the transfer rate of each channel in the disk apparatus. As a result, the disk apparatus according to the eighth embodiment can calculate and set the disk transfer block size required for guaranteeing the transfer rate on the basis of the seek performance and the disk transfer rate of the apparatus.

In this way, the disk apparatus according to the eighth embodiment can guarantee the required data transfer rate by setting the segment size and the transfer method for each segment on the basis of the data transfer rate of each channel supplied from the external system.

According to the eighth embodiment, each segment is set by the transfer rate setting command. The storage apparatus according to the present invention, however can alternatively be configured in such a manner that the data with write data transfer setting information attached thereto is transferred to the disk apparatus, which in turn detects the transfer rate setting information included in the write data/read data to set a segment.

According to the eighth embodiment, the priority order of disk transfer, the disk transfer block size and the host transfer block size are set as the transfer starting conditions set by segment. The storage apparatus according to the present invention, however, can alternatively be configured in such a manner as to control the start and stop of disk transfer and the host transfer by using or adding another parameter.

According to the eight embodiment, the transfer rate itself is set as the transfer rate information from an external system. The storage apparatus according to the present invention, however, can alternatively be configured in such a manner as to set the image data format information as related to a preset speed type number and a preset transfer rate.

The eighth embodiment shows an example in which each set value of the segment setting register is determined from the transfer rate information. The setting method for the storage apparatus according to the present invention, however, is not limited to such a method.

According to the eighth embodiment, the setting command can be executed by segment thereby to set each segment. The storage apparatus according to the present invention, however, can alternatively be configured to include setting commands for setting all the segments collectively.

According to the eighth embodiment, the identification information for each command is set in the parameters of the particular command. The storage apparatus according to the present invention, however, can alternatively be configured in such a manner as to include a dedicated identification information setting command executed before issue of a write command/read command.

Embodiment 9

Now, explanation will be made about a disk apparatus according to a ninth embodiment of the present invention. The configuration of the disk apparatus according to the ninth embodiment is substantially similar to that of the disk apparatuses shown in FIGS. 26 and 27 except for the segment setting register of the buffer control circuit 53.

Figure 37:
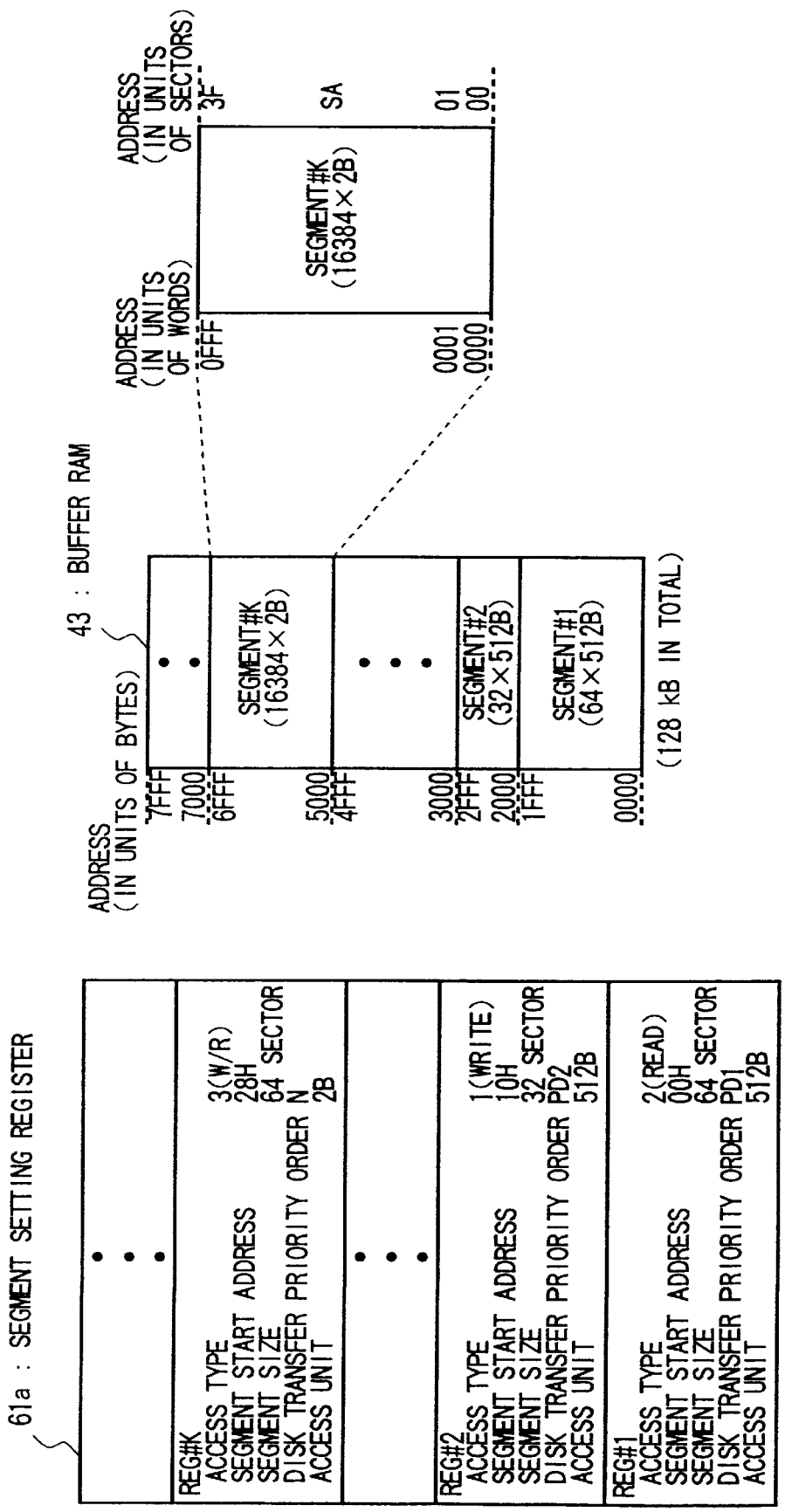
FIG. 37 is a diagram showing the correspondence between the segmentation of the buffer RAM and the segment setting register according to a ninth embodiment.

FIG. 37 is a diagram showing the correspondence between the segmentation of the buffer RAM 43 and the segment setting register 61a according to the ninth embodiment.

As shown in FIG. 37, the segment setting register 61a according to the ninth embodiment can set the access unit ACK making up a unit of data transfer from the external system. Thus, data can be written into or read from the segment by the access unit ACK set by the segment setting register 61a. This access unit ACK is given in bytes and selected from the values of power of 2 not more than 512.

The operation of processing the commands for the disk apparatus according to the ninth embodiment of the present invention will be described below.

[Segment Setting Command]

Parameters of the segment setting command include the segment number, the access type, the access unit, the segment size and the priority order of disk transfer. The segment designated in the case under consideration is K.

Upon application of a segment setting command from the external system to the CPU 42, the CPU 42 checks the parameters and then recalculates and sets the segment start address of each segment in the register thereby to set other values in REG#K.

[Write command/read Command]

The write command and the read command are similar to those described above in the first embodiment. The start address, the write size and the read size are set in units of sector.

[Segment Write Command]

Parameters of the segment write command include the identification number, the segment address and the write size. The identification number corresponds to the segment number set by the segment setting command. Let the identification number be K (K=1 to N). The segment address is the write address in the segment, and is set with the start address of the segment as zero using the access unit set by the segment setting command as a unit. The write size is also set using the access unit set by the segment setting command as a unit.

Upon application of a segment write command from an external system to the CPU 42, the CPU 42 causes the execution of the host transfer from an external system to the segment #K in accordance with the set segment size and the set write size.

Further, the CPU 42 calculates the write destination address (DA+SA) on the disk 41 from the start address DA (in units of sectors) on the disk set by the latest write command or the latest read command executed for the segment #M and from the sector address SA (in unit of sectors, with the first sector as zero) of the sector to be written in the segment #K. The CPU 42 then executes the disk transfer for transferring the updated data to the disk 41 in accordance with the set order of disk transfer.

[Segment Read Command]

Parameters of the segment read command include the identification number, the segment address and the read size. The segment address and the read size are set in the access unit set by the segment setting command.

Upon application of a segment read command from the external system to the CPU 42, the CPU 42 executes the host transfer from the segment #M to the external system in accordance with the set segment address and the set write size.

Now, explanation will be made about a method of using this command.

First, the external system issues a segment setting command and sets the segment setting register 61a as shown in FIG. 37. For the segment #K to which access is desired, in units of words, the access type CSN is set to 3 (both for read and write operation) and the access unit ACK is set to 2.

Then, the segment #K is designated to execute the write command or the read command, so that the write data or the read data, as the case may be, is set in the segment #K. After that, the data stored in the segment #K is read by issuing a segment read command, and the stored data is changed by issuing a segment write command. The data written in the segment #K by the segment write command is written in the corresponding area on the disk 41 by the processing in the disk apparatus, thus securing an identity between the data in the segment #K and the data on the disk.

The segment #K thus set has stored therein, by reading with a read command, information such as the FAT (file allocation table) information which is frequently accessed and frequently rewritten in small units. As a result, subsequent random access, in units of words, to the buffer memory becomes possible. At the same time, the wait time due to disk access is eliminated, thereby improving the rewrite processing rate.

As described above, the disk apparatus according to the ninth embodiment permits the external system to directly randomly access the segments of the buffer RAM of the disk apparatus with the access unit set as above. As a result, the disk apparatus according to the ninth embodiment can improve the random access efficiency.

According to the ninth embodiment, the segment is set by the segment setting command. The storage apparatus according to the present invention, however, can alternatively be configured in such a manner that the write data, with the segment setting information attached thereto, is transferred to the disk apparatus, which sets the segment by detecting the segment setting information included in the write data/read data.

The segment setting register according to the ninth embodiment is so configured as to set neither the disk transfer block size nor the host transfer block size. The storage apparatus according to the present invention, however, can alternatively be configured in such a manner that such set values are added to the above-mentioned set values.

According to the ninth embodiment, each segment is set by executing the segment setting command for each segment. The storage apparatus according to the present invention, however, can alternatively be configured in such a manner as to include a segment setting command for setting all the segments collectively.

According to the ninth embodiment, the identification information of each command is set the parameters of each command. The storage apparatus according to the present invention, however, can alternatively be configured to provide a dedicated identification information setting command executed before the write command/write command.

Embodiment 10

Now, explanation will be made about a disk apparatus according to a tenth embodiment of the present invention. The configuration of the disk apparatus according to the tenth embodiment is substantially similar to that of the disk apparatuses shown in FIGS. 26 and 27 except for the segment setting register of the buffer control circuit 53.

Figure 38:
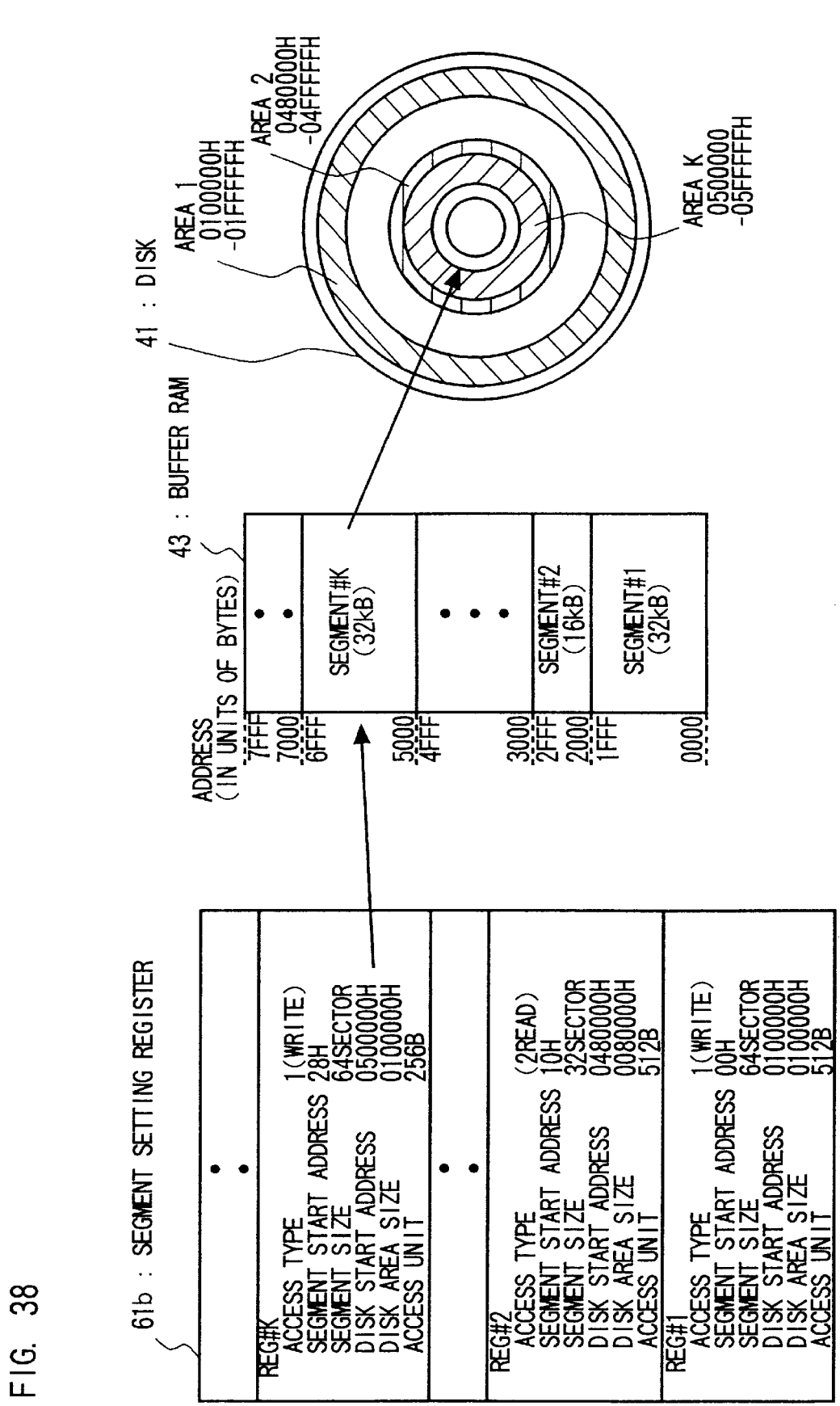
FIG. 38 is a diagram showing the correspondence between the segment setting register of the buffer control circuit, the segmentation of the buffer RAM and each area on the disk according to a tenth embodiment.
Figure 39:
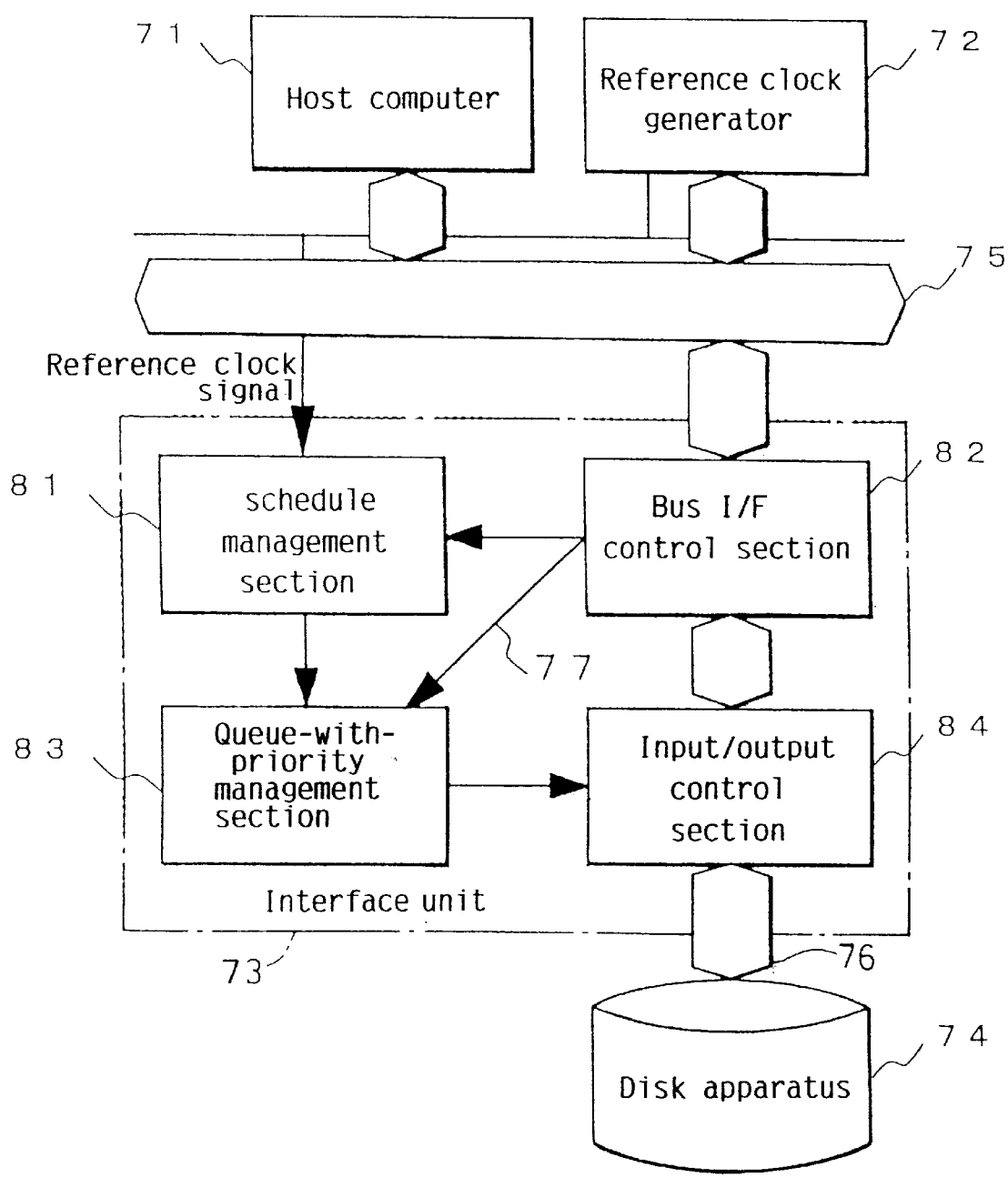
FIG. 39 is the block diagram showing a system configuration of a conventional storage apparatus.
Figure 40:
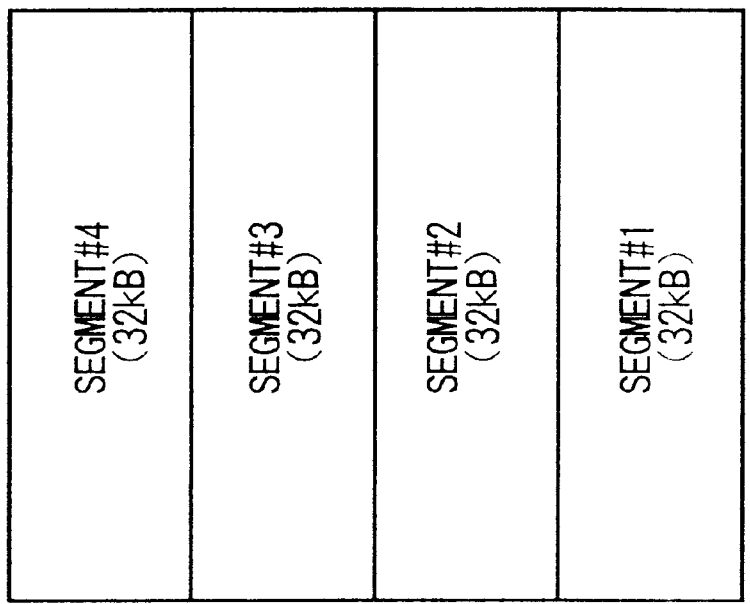
FIG. 40 is the diagram showing the method of controlling the segmentation of the buffer memory of the conventional disk apparatus constituting a storage apparatus.
Figure 40:
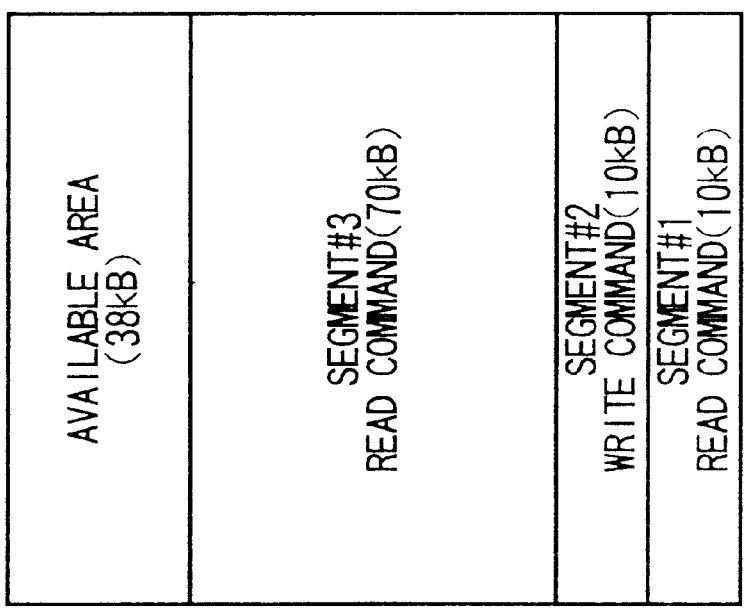

FIG. 38 is a diagram showing the correspondence between the segment setting register 61b of the buffer control circuit 53, the segmentation of the buffer RAM 43 and each area on the disk 41.

As shown in FIG. 38, the segment setting register 61b has set therein the access type, the segment start address, the segment size, the disk start address, the disk area size and the access unit. According to each set value, segment #1 of the buffer RAM 43 corresponds to area 1 on the disk 41, segment #2 corresponds to area 2 on the disk 2, and segment #K corresponds to area K on the disk 41. Also, it is possible to set the access unit ACK providing a unit of data transfer from the external system, and the operation of writing or reading data into or from the disk apparatus can be performed in the access unit ACK thus set. The access unit ACK is given in bytes and selected from a power of 2 not more than 512. In the case under consideration, the access unit for the segment #K is 256 bytes.

Explanation will be made about the operation of processing the commands for the disk apparatus according to the tenth embodiment.

[Segment Setting Command]

Parameters of the segment setting command include the segment number, the access type, the disk start address, the disk area size, the access unit and the segment size. Assume that a segment number K is designated. The disk start address and the disk area size designate the range of the areas on the disk 41 in units of sectors, and this range of areas is associated with the segment #K.

[Write Command]

Parameters of the write command include the identification number, the write address and the write size. The identification number corresponds to the segment number set by the segment setting command. Assume that the identification number is K. The write address and the write size are set in the access unit set by the segment setting command. The write address is a write destination address with an area start address of zero in the above-mentioned access unit within the area K on the disk.

Upon application of a write command from the external system to the CPU 42, the CPU 42 executes the host transfer from the external system to the segment #K. Further, the CPU 42 calculates a write destination address (DA+DW) on the disk 41 from the write address DW and the start address DA of the area K on the disk 41 set by the segment setting register. Then, the CPU 42 executes the disk transfer for transferring data to the disk 41.

[Read Command]

Parameters of the read command include the identification number, the read address and the read size. The read address and the read size are set in the access unit set by the segment setting command. The read address is a read destination address expressed in the above-mentioned access unit within the area K on the disk, and the area start address is assumed to be zero.

Upon application of a read command from the external system thereto, the CPU 42 calculates the read destination address (DA+DR) on the disk 41 from the read address DR and the start address DA on the disk 41 set by the segment setting register, and executes the disk transfer for transferring the data from the disk 41 to the segment #K. Further, the CPU 42 executes the host transfer from the segment #K to the external system.

As described above, the external system can set the access units for access to different storage areas on the disk for each segment by the segment setting command in the disk apparatus. The external system can also issue a write command or a read command for a segment designated by the identification number, and can thus record or reproduce data in different areas on the disk by different access units.

As described above, the disk apparatus according to the tenth embodiment, different storage areas are set for different segments based on the setting information supplied from the external system. In this way, the storage areas and the segments can establish a one-to-one correspondence, thus easily guaranteeing the identity between the data in each segment and the data on the disk.

The access unit providing the size of the data transferred between the external system and the disk apparatus can be set individually, and therefore can be set according to the type of the data to be recorded or to be reproduced.

The segment setting register according to the tenth embodiment is configured in a way not to set the disk transfer block size or the host transfer block size. The storage apparatus according to the present invention, however, can alternatively be configured to add these set values to other set values.

According to the tenth embodiment, the identification information of each command is set in the parameters of each command. The storage apparatus according to the tenth embodiment, however, can alternatively be configured in such a manner as to set a dedicated identification information setting command executed before the write command/read command is issued.

According to the tenth embodiment, each segment is set by executing the segment setting command. The storage apparatus according to the present invention, however, can alternatively be configured in such a manner as to provide a segment setting command for setting all the segments collectively.

According to the tenth embodiment, a segment is set by the segment setting command. The storage apparatus according to the present invention, however, can alternatively be configured in such a manner that the segment setting information is added to the write data and transferred to the disk apparatus, which in turn detects the segment setting information included in the write data/read data thereby to set a segment.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A storage apparatus comprising:
    an input means for inputting an input/output (I/O) request and an input/output (I/O) execution time prediction request transmitted from an external system;
    a determining means for predicting an execution time of said I/O request in response to receiving said I/O execution time prediction request; and
    a temporary memory divisible into a plurality of segments according to the type of said I/O request, wherein said determining means predicts the execution time of said I/O request on the basis of the result of: (1) a prediction of a current access time for a recording medium, (2) a prediction of an actual disk write time or read time for the recording medium and (3) a detection of a segment accumulation amount and a size of the corresponding segment, in response to said I/O execution time prediction request from said external system.

2. A storage apparatus comprising:
    a determining means for predicting the execution time of an I/O request from an external system and also for determining whether said I/O request can be executed within a time limit set by said external system in response to said I/O request from said external system based on said predicted execution time;
    an I/O request processing means for executing said I/O request when said determining means determines that said I/O request can be executed and for terminating the execution of said I/O request when said determining means determines that said I/O request is not executable; and
    a temporary memory divisible into a plurality of segments according to the type of an I/O request,
    wherein said determining means predicts the execution time of said I/O request on the basis of the result of: (1) a prediction of a current access time for a recording medium, (2) a prediction of an actual disk write time or read time for the recording medium, and (3) a detection of a segment accumulation amount and a segment size of the corresponding segment, and said I/O request processing means provides a response to said external system in accordance with the result of said determination by said determining means.

3. A storage apparatus comprising:

a determining means for responding to an I/O data transfer amount request from an external system with a data size that can be input or output within a time limit set by said external system;

a temporary memory circuit divisible into a plurality of segments according to the type of an I/O request;

wherein said determining means predicts a data size that can be input or output within said time limit based on the result of: (1) a prediction of a current access time for a recording medium, (2) a prediction of an actual disk write time or read time for the recording medium, and (3) detection of a segment accumulation amount and a size of the corresponding segment in response to an I/O execution time prediction request from said external system.

4. A storage apparatus according to claim 3, wherein said determining means notifies said external system of the data size that can be input or output within the time limit set by said external system based on the result of: (1) the prediction of a current access time for the recording medium; (2) the prediction of an actual disk write time or read time for the recording medium, and (3) the detection of a segment accumulation amount and the size of the corresponding segment in response to the I/O data transfer amount request from said external system.

5. A storage apparatus according to claim 3, wherein said determining means responds to the write size request from said external system with an available size of the corresponding segment as a writable data size.

* * * * *